US010553897B2

(12) United States Patent
Udovic

(10) Patent No.: US 10,553,897 B2
(45) Date of Patent: Feb. 4, 2020

(54) AMBIENT TEMPERATURE SUPERIONIC CONDUCTING SALT INCLUDING METAL CATION AND BORATE ANION OR CARBORATE ANION AND PROCESS FOR MAKING AMBIENT TEMPERATURE SUPERIONIC CONDUCTING SALT

(71) Applicant: NATIONAL INSTITUTE OF STANDARDS AND TECHNOLOGY, Gaithersburg, MD (US)

(72) Inventor: Terrence John Udovic, Washington, DC (US)

(73) Assignee: GOVERNEMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 173 days.

(21) Appl. No.: 15/172,641

(22) Filed: Jun. 3, 2016

(65) Prior Publication Data
US 2016/0372786 A1    Dec. 22, 2016

Related U.S. Application Data

(60) Provisional application No. 62/180,216, filed on Jun. 16, 2015.

(51) Int. Cl.
*C01B 35/02*     (2006.01)
*H01M 10/052*   (2010.01)
(Continued)

(52) U.S. Cl.
CPC ....... *H01M 10/0562* (2013.01); *C01B 35/026* (2013.01); *H01M 10/052* (2013.01);
(Continued)

(58) Field of Classification Search
CPC ........................ H01M 10/0562; C01B 35/026
(Continued)

(56) References Cited

U.S. PATENT DOCUMENTS

2013/0040208 A1*   2/2013   Kanno ................... C01B 17/20
429/319

OTHER PUBLICATIONS

Hayashi et al., Superionic glass-ceramic electrolytes for room-temperature rechargeable sodium batteries, Nature Communications, 3, 856, 2012, doi: 10.1038/ncomms1843 (Year: 2012).*

(Continued)

*Primary Examiner* — Sean P Cullen
(74) *Attorney, Agent, or Firm* — Office of Chief Counsel for National Institute of Standards and Technology

(57) ABSTRACT

A process for making a superionic conducting salt includes: combining a primary salt and an impact member, the primary salt including an ordered phase and being an ionic conductor; impacting the primary salt with the impact member; and converting the primary salt to the superionic conducting salt in response to impacting the primary salt with the impact member at a conversion temperature to make the superionic conducting salt, the conversion temperature optionally being less than a thermally activated transition temperature that thermally converts the primary salt to the superionic conducting salt in an absence of the impacting the primary salt, and the superionic conducting salt including a superionic conductive phase in a solid state at less than the thermally activated transition temperature.

22 Claims, 41 Drawing Sheets

(51) Int. Cl.
*H01M 10/054* (2010.01)
*H01M 10/0562* (2010.01)

(52) U.S. Cl.
CPC .. *H01M 10/054* (2013.01); *H01M 2300/0068* (2013.01); *H01M 2300/0091* (2013.01)

(58) Field of Classification Search
USPC ........................................................ 429/322
See application file for complete search history.

(56) References Cited

OTHER PUBLICATIONS

Paskevicius et al., First-order phase transition in the $Li_2B_{12}H_{12}$ system, Aug. 20, 2013, Physical Chemistry Chemical Physics, 15, 15825-15828 (Year: 2013).*

Teprovich, Jr. et al., Bi-functional $Li_2B_{12}H_{12}$ for energy storage and conversion applications: solid-state electrolyte and luminescent down-conversion dye, Oct. 8, 2015, Journal of Materials Chemistry A, 3, 22853-22859 (Year: 2015).*

He et al., Synthesis of a Bimetallic Dodecaboarate $LiNaB_{12}H_{12}$ with Outstanding Superionic Conductivity, Aug. 7, 2015, Chemistry of Materials, 27, 5483-5486 (Year: 2015).*

He et al., Facile Solvent-Free Synthesis of Anhydrous Alkali Metal Dodecaborate $M_2B_{12}H_{12}$ (M=Li, Na, K), Feb. 28, 2014, Journal of Physical Chemistry C, 118, 6084-6089 (Year: 2014).*

Wan Si Tang, et al., "Stabilizing lithium and sodium fast-ion conduction in solid polyhedral-borate salts at device-relevant temperatures", Energy Storage Materials, Mar. 31, 2016, 79-83, 4.

Wan Si Tang, et al., "Unparalleled lithium and sodium superionic conduction in solid electrolytes with large monovalent cage-like anions", Energy and Enviromental Science, Oct. 8, 2015, 3637-3645, 8.

Wan Si Tang, et al., "Liquid-like ionic conduction in solid lithium and sodium monocarba-closo-decaborates near or a room temperature", Advanced Energy Materials, Dec. 15, 2015.

Terrence Udovic, et al., "Exceptional superionic conductivity in disordered sodium decahydro-closo-decaborate", Advanced Material, Oct. 13, 2014, 7622-7626, 26.

Terrence Udovic. et al., "Sodium superionic conduction in Na2B12H12", Chem Comm, Feb. 20, 2014, 3750-3752, 50.

* cited by examiner

Panel a

Panel b

AMBIENT TEMPERATURE SUPERIONIC CONDUCTING SALT INCLUDING METAL CATION AND BORATE ANION OR CARBORATE ANION AND PROCESS FOR MAKING AMBIENT TEMPERATURE SUPERIONIC CONDUCTING SALT

CROSS REFERENCE TO RELATED APPLICATIONS

This application claims the benefit of U.S. Provisional Patent Application Ser. No. 62/180,216, filed Jun. 16, 2015, the disclosure of which is incorporated herein by reference in its entirety.

STATEMENT REGARDING FEDERALLY SPONSORED RESEARCH

This invention was made with United States Government support from the National Institute of Standards and Technology. The Government has certain rights in the invention.

BRIEF DESCRIPTION

Disclosed is a superionic conducting salt comprising: a plurality of salt cations; a plurality of salt anions; and a superionic conductive phase that is present in a solid state at ambient temperature.

Also disclosed is a battery comprising: an electrolyte composition comprising: a superionic conducting salt that comprises: a plurality of salt cations; a plurality of salt anions; and a superionic conductive phase that is present in a solid state at ambient temperature; and optionally, a binder in which the superionic conducting salt is disposed; a first electrode; and a second electrode separated from the first electrode by interposition of the electrolyte composition.

Further disclosed is a process for making a superionic conducting salt, the process comprising: combining a primary salt and an impact member, the primary salt comprising an ordered phase and being an ionic conductor; impacting the primary salt with the impact member; and converting the primary salt to the superionic conducting salt in response to impacting the primary salt with the impact member at a conversion temperature to make the superionic conducting salt, the conversion temperature being less than a thermally activated transition temperature that thermally converts the primary salt to the superionic conducting salt in an absence of the impacting the primary salt, and the superionic conducting salt comprising a superionic conductive phase in a solid state at less than the thermally activated transition temperature.

Additionally disclosed is a process for making a superionic conducting salt, the process comprising: combining a primary salt and a secondary salt to form a drying composition that is a fluid and that comprises the primary salt and the secondary salt, the primary salt comprising an ordered phase and being an ionic conductor; drying the drying composition; and converting the primary salt to the superionic conducting salt in response to drying the drying composition at a conversion temperature to make the superionic conducting salt, the conversion temperature being less than a thermally activated transition temperature that thermally converts the primary salt to the superionic conducting salt in an absence of the secondary salt, and the superionic conducting salt comprising a superionic conducting phase in a solid state at less than the thermally activated transition temperature.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
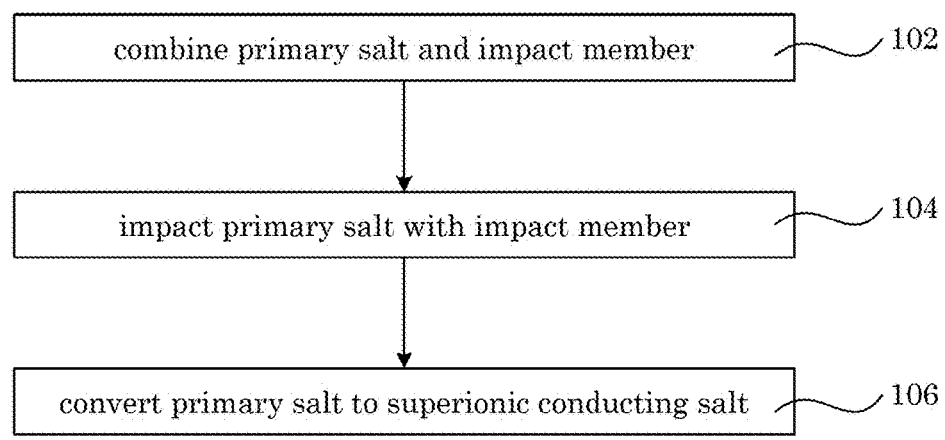
FIG. 1 shows a flow chart for a process for making a superionic conducting salt.

A detailed description of one or more embodiments is presented herein by way of exemplification and not limitation.

It has been discovered that a superionic conducting salt herein includes a disordered phase and is a superionic conductor at an ambient temperature. Unexpectedly and advantageously, the superionic conducting salt maintains the disordered phase in response to being cooled or heated from the ambient temperature. The superionic conducting salt has a cation mobility at the ambient temperature that ordinarily is only obtainable by subjecting a primary salt to a high temperature but which is absent in the primary salt at the ambient temperature. Beneficially, the superionic conducting salt can be included in an electrolyte composition that is a solid, e.g., in a rechargeable battery.

A process herein provides milling of a primary salt below a thermally activated transition temperature to produce a superionic conducting salt that is a superionic conductor at ambient temperature. Superionic conducting salt has crystallite size and disordered phase produced by such milling that stabilizes the superionic conducting salt at room temperature.

In an embodiment, a superionic conducting salt includes a salt cation and a salt anion that are arranged as a disordered state in a superionic conductive phase, wherein the superionic conductive phase of the superionic conductor salt is present at an ambient temperature such that the superionic conductor salt is a superionic conductor at the ambient temperature. The superionic conducting salt is formed from a primary salt. The primary salt includes a primary cation and a primary anion arranged as an ordered phase that is an ionic conductive phase, wherein the primary salt is an ionic conductor at ambient temperature. As used herein, the phrase "ambient temperature" refers to a temperature from −40° C. to less than 60° C. at standard pressure.

The superionic conducting salt includes a plurality of salt cations, a plurality of salt anions dispersed among the salt cations to obtain charge neutrality of the salt cations, and a superionic conductive phase that is present in a solid state at ambient temperature. In an embodiment, the superionic conducting salt has formula (1):

$$M_x A_y \qquad (1),$$

wherein M is the salt cation; A is the salt anion; and x and y are integers whose relative values provide charge neutrality of the superionic conducting salt. A ratio of x to y (i.e., x:y) can be from 4:1 to 1:4, inclusive of every ratio in this range, and the like.

Salt cation M can be selected to balance a negative charge of salt anions A in the superionic conducting salt. The plurality of salt cations M can be all a same species of salt cation M, or a combination of different species of salt cation M (e.g., first salt cation M1, second salt cation M2, and the like) can be included in the superionic conducting salt. A positive charge of salt cation M can be, e.g., +1, +2, +3, +4 or a combination thereof (e.g., when different species of salt cations M are present). Salt cation M can include a cation of an alkali metal (e.g., Li, Na, K, Rb, Cs, and the like from Group 1 of the periodic table), alkaline earth metal (e.g., Mg, Ca, Sr, Ba, and the like from Group 2 of the periodic table), Group 3 metal (e.g., Sc, Y, Lu, and the like), transition metal (e.g., Cu, Ni, Co, Fe, Ag, and the like from the d-block elements of the periodic table), rare-earth metal (e.g., La, Ce, Pr, and the like from the f-block elements of the periodic table), and the like; a polyatomic cation (e.g., ammonium or substituted ammonium (e.g., tetraalkylammonium), or imidazolium, and the like); or a combination thereof.

The plurality of salt anions A can be all the same species of salt anion A, or a combination of different species of salt anion A (e.g., first salt anion A1, second salt anion A2, and the like) can be included in the superionic conducting salt. A negative charge of salt anion A can be, e.g., −1, −2, −3, −4, or a combination thereof (e.g., when different species of salt anion A are present). Salt anion A can include an anion of a polyborate. The polyborate can be a polyhedral, cage-like borate, carborate, dicarborate, ammonioborate, substituted species thereof, and the like. In substituted species of the polyborate, a substituent can include an amine, cyano, hydroxyl, thiol, carbonyl, carboxylate, carboxylic acid, halogen, epoxide, ester, amide, ether, and the like. A structure and degree of unsaturation of the polyborate can be described as "closo," "nido," "arachno," "hypho" (which respectively mean "cage," "nest," "web," and "net"), "hemicloso," "heminido," "hemiarachno," or "hemihypho." An etymology of these terms relates to the structure of the polyborate labeled as such. However, no intention is made herein to limit the meaning of these terms by the structure they supposedly represent. Rather, these terms are a function of a number of skeletal electron pairs and empirical formulae. (See Olah, G. A. et al. (1991) *Electron Deficient Boron and Carbon*, New York: John Wiley & Sons, which is incorporated herein by reference in its entirety).

In an embodiment, the borate anion includes a structure wherein each vertex of the cage is a boron atom. The carborate anion has vertex atoms in the cage that include a carbon atom and a boron atom. The ammonioborate anion has a nitrogen atom bonded to one of the vertex boron atoms in the cage. Exemplary salt anions A that are polyborates include closo-borate, carborate, and the like. Moreover, salt anion A is substantially stable. The term "substantially stable" as applied to salt anion A (or salt cation M) means that salt anion A can be isolated and stored indefinitely in a salt (e.g., in the primary salt, secondary salt, or superionic conducting salt).

In an embodiment, salt anion A includes a closo-borate anion of formula $B_n H_{(n-z)} R_z^{2-}$, wherein n is an integer greater than or equal to 10 (e.g., from 10 to 12); z is an integer from 0 to n; and each R independently is a hydrocarbon substituent, halogenated-hydrocarbon substituent, halogen (e.g., F, Cl, Br, I), amine, cyano, hydroxyl, thiol, carbonyl, carboxylate, carboxylic acid, epoxide, ester, amide, ether, and the like.

In an embodiment, salt anion A includes a closo-carborate anion of the formula $CB_nH_{(n+1)-z}R_z^{1-}$, wherein n is an integer greater than or equal to 9 (e.g., from 9 to 11); z is an integer from 0 to n; and each R independently is a hydrocarbon substituent, halogenated-hydrocarbon substituent, halogen (e.g., F, Cl, Br, I), amine, cyano, hydroxyl, thiol, carbonyl, carboxylate, carboxylic acid, epoxide, ester, amide, ether, and the like.

In an embodiment, salt anion A includes a closo-dicarborate anion of the formula $C_2B_nH_{(n+3)-z}R_z^{1-}$ (e.g., $C_2B_9H_{12}^-$), wherein n is an integer greater than or equal to 9 (e.g., from 9 to 11); z is an integer from 0 to n; and each R independently is a hydrocarbon substituent, halogenated-hydrocarbon substituent, halogen (e.g., F, Cl, Br, I), amine, cyano, hydroxyl, thiol, carbonyl, carboxylate, carboxylic acid, epoxide, ester, amide, ether, and the like.

In an embodiment, salt anion A includes the carborate anion of the formula $CB_nH_{(n+3)-z}R_z^{1-}$ (e.g., $CB_9H_{12}^-$), wherein n is an integer greater than or equal to 9 (e.g., from 9 to 10); z is an integer from 0 to n; and each R independently is a hydrocarbon substituent, halogenated-hydrocarbon substituent, halogen (e.g., F, Cl, Br, I), amine, cyano, hydroxyl, thiol, carbonyl, carboxylate, carboxylic acid, epoxide, ester, amide, ether, and the like.

In an embodiment, salt anion A includes the borate of the formula $B_{11}H_{(14-z)}R_z^{1-}$, wherein z is an integer from 0 to 11; and each R independently is a hydrocarbon substituent, halogenated-hydrocarbon substituent, halogen (e.g., F, Cl, Br, I), amine, cyano, hydroxyl, thiol, carbonyl, carboxylate, carboxylic acid, epoxide, ester, amide, ether, and the like.

In an embodiment, salt anion A includes a closo-ammonioborate anion of formula: $((R'R''R''')NB_nZ_{n-1})^{1-}$, wherein n is an integer greater than or equal to 10 (e.g., from 10 to 12); N is bonded to B; and R', R'', R''', and Z independently are a hydrogen, hydrocarbon substituent, halogenated-hydrocarbon substituent, halogen (e.g., F, Cl, Br, I), amine, cyano, hydroxyl, thiol, carbonyl, carboxylate, carboxylic acid, epoxide, ester, amide, ether, or the like.

As used herein, "hydrocarbon substituent" refers to a linear alkyl, branched alkyl, linear alkoxy group (e.g., *—O-alkyl, wherein * is a point of attachment), branched alkoxy group (e.g., *—O-branched alkyl), linear alkenyl, branched alkenyl, linear alkynyl, or branched alkynyl, wherein there can be a combination of double bonds or triple bonds.

As used herein, "halogenated-hydrocarbon substituent" refers to a halogenated-linear alkyl, halogenated-branched alkyl, halogenated-linear alkenyl, halogenated-branched alkenyl, halogenated-linear alkynyl, halogenated-branched alkynyl, wherein there can be a combination of double bonds or triple bonds. Halogenated hydrocarbon substituents can include perhalogenated hydrocarbons such as perfluorinated hydrocarbons.

Moreover, the hydrocarbon or halogenated-hydrocarbon substituent can be derivatized with an organic functional group that includes amine, cyano, hydroxyl, thiol, carbonyl, carboxylate, carboxylic acid, epoxide, ester, amide, ether, and the like.

Exemplary salt anions A include $B_{10}H_{10}^{2-}$, $B_{12}H_{12}^{2-}$, $CB_{11}H_{12}^-$, $CB_9H_{10}^-$, $CB_9H_{12}^-$, $CB_{10}H_{13}^-$, $C_2B_9H_{12}^-$, $B_{12}Cl_{12}^{2-}$, $B_{12}Br_{12}^{2-}$, $B_{12}I_{12}^{2-}$, $CB_9Cl_{10}^-$, $CB_{11}H_6Cl_6^-$, $B_{12}(OH)_{12}^{2-}$, $NH_3B_{12}H_{11}^-$, $B_{11}H_{14}^-$, and the like.

The superionic conducting salt can be hydrated (e.g., with $H_2O$) or solvated with a nonaqueous solvate compound (e.g., acetonitrile, acetone, tetrahydrofuran, and the like). The superionic conducting salt can be a polycrystalline powder. According to an embodiment, the superionic conducting salt is a metal polyborate. The metal polyborate can include a metal borate, metal carborate, metal dicarborate, metal ammonioborate, and the like. Exemplary superionic conducting salts include $Na_2B_{10}H_{10}$, $Na_2B_{12}H_{12}$, $NaCB_{11}H_{12}$, $NaCB_9H_{10}$, $Na_4(B_{12}H_{12})(B_{10}H_{10})$, $NaCB_9H_{12}$, $NaCB_{10}H_{13}$, $NaC_2B_9H_{12}$, $Na_2B_{12}Cl_{12}$, $Na_2B_{12}Br_{12}$, $Na_2B_{12}I_{12}$, $NaCB_9Cl_{10}$, $NaCB_{11}H_6Cl_6$, $Na_2B_{12}(OH)_{12}$, $NaCB_{11}F_{11}H$, $NaB_{11}H_{14}$, $NaNH_3B_{12}H_{11}$, $Na_2(CB_{11}H_{12})(CB_9H_{10})$, $Na_2(CB_{11}F_{11}H)(CB_9F_8H_2)$, $Li_2B_{10}H_{10}$, $Li_2B_{12}H_{12}$, $LiCB_{11}H_{12}$, $LiCB_9H_{10}$, $Li_4(B_{12}H_{12})(B_{10}H_{10})$, $LiCB_9H_{12}$, $LiCB_{10}H_{13}$, $LiC_2B_9H_{12}$, $Li_2B_{12}Cl_{12}$, $Li_2B_{12}Br_{12}$, $Li_2B_{12}I_{12}$, $LiCB_9Cl_{10}$, $LiCB_{11}H_6Cl_6$, $Li_2B_{12}(OH)_{12}$, $LiCB_{11}F_{11}H$, $LiB_{11}H_{14}$, $LiNH_3B_{12}H_{11}$, $Li_2(CB_{11}H_{12})(CB_9H_{10})$, $Li_2(CB_{11}F_{11}H)(CB_9F_8H_2)$, $Li_2B_{10}Cl_{10}$, $Li_2B_{10}Cl_5(OR)_5$, $Li_2B_{10}H_2Cl_8$, $Li_2B_{10}H_7(OCH_3)_3$, $Li_2B_{10}C_{18}(OH)_2$, $Li_2B_{10}Br_{10}$, $Na_2B_{10}Cl_{10}$, $Na_2B_{10}(OH)_5C_{15}$, $Na_2B_{10}Cl_5(OR)_5$, $Na_2B_{10}H_2Cl$, $Na_2B_{10}H_7(OCH_3)_3$, $Na_2B_{10}Cl_8(OH)_2$, $Na_2B_{10}Br_{10}$, $NaLiB_{10}H_2Cl_8$, $MgB_{12}H_{12}$, $MgB_{10}H_{10}$, $MgB_{12}F_{12}$, $MgB_{10}F_{10}$, $MgB_{10}Cl_{10}$, $Mg(B_{11}H_{14})_2$, $Mg(C_2B_9H_{12})_2Mg(CB_{11}H_{12})_2$, $Mg(CB_9H_{10})_2$, $Mg(CB_{11}F_{11}H)_2$, $Mg(CB_9F_8H_2)_2$, $Mg_2(B_{12}H_{12})(B_{10}H_{10})$, $Mg(CB_{11}H_{12})(CB_9H_{10})$, $Mg(CB_{11}F_{11}H)(CB_9F_8H_2)$, $K_2B_{12}I_{12}$, $Cs_2B_{12}Cl_{12}$, and the like.

The superionic conducting salt is formed from the primary salt. The primary salt includes the primary cation and the primary anion arranged as the ordered phase that is the ionic conductive phase, wherein the primary salt is the ionic conductor at ambient temperature. In an embodiment, the primary salt has formula (2):

$$M^p{}_xQ_y \qquad (2),$$

wherein $M^p$ is the primary cation; Q is the primary anion; and x and y are integers whose relative values provide charge neutrality of the primary salt. A ratio of x to y (i.e., x:y) can be from 4:1 to 1:4, inclusive of every ratio in this range, and the like.

Primary cation $M^p$ can be selected to balance a negative charge of primary anions Q in the primary salt. The plurality of primary cations $M^p$ can be all a same species of primary cation $M^p$, or a combination of different species of primary cation $M^p$ (e.g., first primary cation $M^p1$, second salt cation $M^p2$, and the like) can be included in primary salt $M^p{}_xQ_y$. A positive charge of primary cation $M^p$ can be, e.g., +1, +2, +3, +4, or a combination thereof (e.g., when different species of primary cations $M^p$ are present). Primary cation $M^p$ can include a cation of an alkali metal (e.g., Li, Na, K, Rb, Cs, and the like from Group 1 of the periodic table), alkaline earth metal (e.g., Mg, Ca, Sr, Ba, and the like from Group 2 of the periodic table), Group 3 metal (e.g., Sc, Y, Lu, and the like), transition metal (e.g., Cu, Ni, Co, Fe, Ag, and the like from the d-block elements of the periodic table), rare-earth metal (e.g., La, Ce, Pr, and the like from the f-block elements of the periodic table), and the like, an element with a +4 valence (e.g., Sn, Pb, Ti, Mn), a polyatomic cation (e.g., ammonium or substituted ammonium (e.g., tetraalkylammonium), or imidazolium, and the like), or a combination thereof.

The plurality of primary anions Q can be all a same species of primary anion Q, or a combination of different species of primary anion Q (e.g., first primary anion Q1, second primary anion Q2, and the like) can be included in the primary salt. A negative charge of primary anion Q can be, e.g., −1, −2, −3, −4, or a combination thereof (e.g., when different species of primary anion Q are present). Primary anion Q can include an anion of the polyborate as above described.

Exemplary primary anions Q that are polyborates include closo-borate, carborate, dicarborate, and the like. Moreover, primary anion Q is substantially stable.

In an embodiment, primary anion Q includes the closo-borate anion of formula $B_nH_{(n-z)}R_z^{2-}$, wherein n, z, and R are as above described.

In an embodiment, primary anion Q includes the closo-carborate anion of formula $CB_nH_{(n+1)-z}R_z^{1-}$, wherein n, z, and R are as above described.

In an embodiment, primary anion Q includes the closo-dicarborate anion of the formula $C_2B_nH_{(n+3)-z}R_z^{1-}$ (e.g., $C_2B_9H_{12}^-$), wherein n, z, and R are as above described.

In an embodiment, primary anion Q includes the carborate anion of the formula $CB_nH_{(n+3)-z}R_z^{1-}$ (e.g., $CB_9H_{12}^-$), wherein n, z, and R are as above described.

In an embodiment, primary anion Q includes the borate of the formula $B_{11}H_{(14-z)}R_z^{1-}$, wherein z is as above described.

In an embodiment, primary anion Q includes the closo-ammonioborate anion of the formula $((R'R''R''')NB_nZ_{n-1})^{1-}$, wherein N is bonded to B, and R', R'', R''', and Z are as above described.

Exemplary primary anions Q include $B_{10}H_{10}^{2-}$, $B_{12}H_{12}^{2-}$, $CB_{11}H_{12}^-$, $CB_9H_{10}^-$, $CB_9H_{12}^-$, $CB_{10}H_{13}^-$, $C_2B_9H_{12}^-$, $B_{12}Cl_{12}^{2-}$, $B_{12}Br_{12}^{2-}$, $B_{12}I_{12}^{2-}$, $CB_9Cl_{10}^-$, $CB_{11}H_6Cl_6^-$, $B_{12}(OH)_{12}^{2-}$, $NH_3B_{12}H_{11}^-$, $B_{11}H_{14}^-$, and the like.

The primary salt can be hydrated (e.g., with $H_2O$) or solvated with a nonaqueous solvate compound (e.g., acetonitrile, acetone, tetrahydrofuran, and the like). The primary salt can be a polycrystalline powder. According to an embodiment, the primary salt is a metal polyborate. The metal polyborate can include a metal borate, metal carborate, metal dicarborate, metal ammonioborate, and the like. Exemplary primary salts include $Na_2B_{10}H_{10}$, $Na_2B_{12}H_{12}$, $NaCB_{11}H_{12}$, $NaCB_9H_{10}$, $Na_4(B_{12}H_{12})(B_{10}H_{10})$, $NaCB_9H_{12}$, $NaCB_{10}H_{13}$, $NaC_2B_9H_{12}$, $Na_2B_{12}Cl_{12}$, $Na_2B_{12}Br_{12}$, $Na_2B_{12}I_{12}$, $NaCB_9Cl_{10}$, $NaCB_{11}H_6Cl_6$, $Na_2B_{12}(OH)_{12}$, $NaCB_{11}F_{11}H$, $NaB_{11}H_{14}$, $NaNH_3B_{12}H_{11}$, $Na_2(CB_{11}H_{12})(CB_9H_{10})$, $Na_2(CB_{11}F_{11}H)(CB_9F_8H_2)$, $Li_2B_{10}H_{10}$, $Li_2B_{12}H_{12}$, $LiCB_{11}H_{12}$, $LiCB_9H_{10}$, $Li_4(B_{12}H_{12})(B_{10}H_{10})$, $LiCB_9H_{12}$, $LiCB_{10}H_{13}$, $LiC_2B_9H_{12}$, $Li_2B_{12}Cl_{12}$, $Li_2B_{12}Br_{12}$, $Li_2B_{12}I_{12}$, $LiCB_9Cl_{10}$, $LiCB_{11}H_{60}Cl_6$, $Li_2B_{12}(OH)_{12}$, $LiCB_{11}F_{11}H$, $LiB_{11}H_{14}$, $LiNH_3B_{12}H_{11}$, $Li_2(CB_{11}H_{12})(CB_9H_{10})$, $Li_2(CB_{11}F_{11}H)(CB_9F_8H_2)$, $Li_2B_{10}Cl_{10}$, $Li_2B_{10}Cl_5(OR)_5$, $Li_2B_{10}H_2Cl_8$, $Li_2B_{10}H_7(OCH_3)_3$, $Li_2B_{10}Cl_5(OH)_2$, $Li_2B_{10}Br_{10}$, $Na_2B_{10}Cl_{10}$, $Na_2B_{10}(OH)_5C_{15}$, $Na_2B_{10}C_{15}(OR)_5$, $Na_2B_{10}H_2Cl_8$, $Na_2B_{10}H(OCH_3)_3$, $Na_2B_{10}Cl_8(OH)_2$, $Na_2B_{10}Br_{10}$, $NaLiB_{10}H_2Cl_8$, $MgB_{12}H_{12}$, $MgB_{10}H_{10}$, $MgB_{12}F_{12}$, $MgB_{10}F_{10}$, $MgB_{10}Cl_{10}$, $Mg(B_{11}H_{14})_2$, $Mg(C_2B_9H_{12})_2Mg(CB_{11}H_{12})_2$, $Mg(CB_9H_{10})_2$, $Mg(CB_{11}F_{11}H)_2$, $Mg(CB_9F_8H_2)_2$, $Mg_2(B_{12}H_{12})(B_{10}H_{10})$, $Mg(CB_{11}H_{12})(CB_9H_{10})$, $Mg(CB_{11}F_{11}H)(CB_9F_8H_2)$, $K_2B_{12}I_{12}$, $Cs_2B_{12}Cl_{12}$, and the like.

According to an embodiment, primary cation $M^p$ of the primary salt is identical to salt cation M of the superionic conducting salt, i.e., $M=M^p$. In a certain embodiment, the superionic conducting salt includes all or a portion of the plurality of salt cations M that are different from primary cation $M^p$ of the primary salt.

According to an embodiment, primary anion Q of the primary salt is identical to salt anion A of the superionic conducting salt, i.e., A=Q. In a certain embodiment, the superionic conducting salt includes all or a portion of the plurality of salt anions A that are different from primary anion Q of the primary salt.

The superionic conducting salt can include a plurality of different salt anions A, e.g., first salt anion A1 and second salt anion A2. In a certain embodiment, the primary salt includes primary anion Q, and the superionic conducting salt includes first salt anion A1 and second salt anion A2, wherein primary anion Q is the same as first salt anion A1 but different from second salt anion A2, i.e., Q=A1 but Q≠A2. In a particular embodiment, all salt anions A in the superionic conducting salt are different from primary anion Q of the primary salt such that first salt anion A1 and second salt anion A2 are different from primary anion Q.

The superionic conducting salt can be made by impacting the primary salt with an impact member and converting the primary salt to the superionic conducting salt in response to impacting the primary salt with the impact member. Exemplary impact members include a ball for a ball mill, a secondary salt, or a combination thereof.

The ball can be a combination of solid spheres with different diameters (e.g., 1 mm to 10 mm) and can include balls having different materials (e.g., stainless steel, tungsten carbide, and the like).

A ball mill is provided to convert the primary salt to the superionic conducting salt. The ball mill can include a container in which the primary salt and the impact member are disposed. Thereafter, the primary salt is subject to impact with the impact member due to motion of the container. The motion can be, e.g., rotational around its own cylindrical axis combined with simultaneous planetary rotations around a separate axis.

In an embodiment, the secondary salt that includes a plurality of secondary cations and a plurality of secondary anions arranged among the secondary cations. According to an embodiment, the secondary salt has formula (3):

$$M^s_xG_y \quad (3),$$

wherein $M^s$ is the secondary cation; G is the secondary anion; and x and y are integers whose relative values provide charge neutrality of the secondary salt. A ratio of x to y (i.e., x:y) can be from 4:1 to 1:4, inclusive of every ratio in this range, and the like.

Secondary cation $M^s$ can be selected to balance a negative charge of secondary anions G in the secondary salt. The plurality of secondary cations $M^s$ can be all a same species of secondary cation $M^s$, or a combination of different species of secondary cation $M^s$ (e.g., first secondary cation $M^s1$, second secondary cation $M^s2$, and the like) can be included in secondary salt $M^s_xG_y$. A positive charge of secondary cation $M^s$ can be, e.g., +1, +2, +3, +4, or a combination thereof (e.g., when different species of secondary cations $M^s$ are present). Secondary cation $M^s$ can include a cation of an alkali metal, alkaline earth metal, transition metal, rare-earth metal, and the like; a polyatomic cation (e.g., as described above such as $NH_4^+$, $(CH_3)_3N^+$, and the like); or a combination thereof.

The plurality of secondary anions G can be all a same species of secondary anion G, or a combination of different species of secondary anion G (e.g., first secondary anion G1, second secondary anion G2, and the like) can be included in the secondary salt. A negative charge of secondary anion G can be, e.g., −1, −2, −3, −4, or a combination thereof (e.g., when different species of secondary anion G are present). Secondary anion G can include an anion of the polyborate as above described, monoatomic anion (e.g., $S^{2-}$, $O^{2-}$, $H^-$, and the like), a polyatomic anion (e.g., $SiS_4^{4-}$, $PS_4^{3-}$, $SO_4^{2-}$, $CO_3^{2-}$, $BH_4^-$, $B_3H_8^-$, $NH_2^-$, and the like), a monovalent halide anion (e.g., $I^-$, $Br^-$ $Cl^-$, $F^-$, and the like), or a combination thereof.

Exemplary secondary anions G that are polyborates include closo-borate, carborate, dicarborate, ammonioborate, and the like. Moreover, secondary anion G is substantially stable.

In an embodiment, secondary anion G includes the closo-borate anion of formula $B_nH_{(n-z)}R_z^{2-}$, wherein n, z, and R are as above described. In an embodiment, secondary anion G includes the closo-carborate anion of formula $CB_nH_{(n+1)-z}R_z^-$, wherein n, z, and R are as above described.

In an embodiment, secondary anion G includes the closo-dicarborate anion of the formula $C_2B_nH_{(n+3)-z}R_z^{1-}$ (e.g., $C_2B_9H_{12}^-$), wherein n, z, and R are as above described.

In an embodiment, secondary anion G includes the carborate anion of the formula $CB_nH_{(n+3)-z}R_z^{1-}$ (e.g., $CB_9H_{12}^-$), wherein n, z, and R are as above described.

In an embodiment, secondary anion G includes the borate of the formula $B_{11}H_{(14-z)}R_z^{1-}$, wherein z is as above described.

In an embodiment, secondary anion G includes the closo-ammonioborate anion of the formula $((R'R''R''')NB_nZ_{n-1})^-$, wherein N is bonded to B, and R', R", R"', and Z are as above described.

Exemplary secondary anions G include $B_{10}H_{10}^{2-}$, $B_{12}H_{12}^{2-}$, $CB_{11}H_{12}^-$, $CB_9H_{10}^-$, $CB_9H_{12}^-$ $CB_{10}H_{13}^-$, $C_2B_9H_{12}^-$, $B_{12}Cl_{12}^{2-}$, $B_{12}Br_{12}^{2-}$, $B_{12}I_{12}^{2-}$, $CB_9Cl_{10}^-$, $CB_{11}H_6Cl_6^-$, $B_{12}(OH)_{12}^{2-}$, $NH_3B_{12}H_{11}^-$ $B_{11}H_{14}^-$, and the like.

The secondary salt can be hydrated (e.g., with $H_2O$) or solvated with a nonaqueous solvate compound (e.g., acetonitrile, acetone, tetrahydrofuran, and the like). The secondary salt can be a polycrystalline powder. According to an embodiment, the secondary salt is a metal polyborate, inorganic salt (e.g., $Na_2CO_3$, $Na_2SO_4$, and the like), and the like. The metal polyborate can include a metal borate, metal carborate, metal dicarborate, metal ammonioborate, and the like. Exemplary secondary salts include $Na_2B_{10}H_{10}$, $Na_2B_{12}H_{12}$, $NaCB_{11}H_{12}$, $NaCB_9H_{10}$, $Na_4(B_{12}H_{12})(B_{10}H_{10})$, $NaCB_9H_{12}$, $NaCB_{10}H_{13}$, $NaC_2B_9H_{12}$, $Na_2B_{12}Cl_{12}$, $Na_2B_{12}Br_{12}$, $Na_2B_{12}I_{12}$, $NaCB_9Cl_{10}$, $NaCB_{11}H_6Cl_6$, $Na_2B_{12}(OH)_{12}$, $NaCB_{11}F_{11}H$, $NaB_{11}H_{14}$, $NaNH_3B_{12}H_{11}$, $Na_2(CB_{11}H_{12})(CB_9H_{10})$, $Na_2(CB_{11}F_{11}H)(CB_9F_8H_2)$, $Li_2B_{10}H_{10}$, $Li_2B_{12}H_{12}$, $LiCB_{11}H_{12}$, $LiCB_9H_{10}$, $Li_4(B_{12}H_{12})(B_{10}H_{10})$, $LiCB_9H_{12}$, $LiCB_{10}H_{13}$, $LiC_2B_9H_{12}$, $Li_2B_{12}Cl_{12}$, $Li_2B_{12}Br_{12}$, $Li_2B_{12}I_{12}$, $LiCB_9Cl_{10}$, $LiCB_{11}H_6Cl_6$, $Li_2B_{12}(OH)_{12}$, $LiCB_{11}F_{11}H$, $LiB_{11}H_{14}$, $LiNH_3B_{12}H_{11}$, $Li_2(CB_{11}H_{12})(CB_9H_{10})$, $Li_2(CB_{11}F_{11}H)(CB_9F_8H_2)$, $Li_2B_{10}Cl_{10}$, $Li_2B_{10}Cl_5(OR)_5$, $Li_2B_{10}H_2Cl_8$, $Li_2B_{10}H_7(OCH_3)_3$, $Li_2B_{10}Cl_5(OH)_2$, $Li_2B_{10}Br_{10}$, $Na_2B_{10}Cl_{10}$, $Na_2B_{10}(OH)_5Cl_5$, $Na_2B_{10}Cl_5(OR)_5$, $Na_2B_{10}H_2Cl$, $Na_2B_{10}H(OCH_3)_3$, $Na_2B_{10}Cl_8(OH)_2$, $Na_2B_{10}Br_{10}$, $NaLiB_{10}H_2Cl$, $MgB_{12}H_{12}$, $MgB_{10}H_{10}$, $MgB_{12}F_{12}$, $MgB_{10}F_{10}$, $MgB_{10}Cl_{10}$, $Mg(B_{11}H_{14})_2$, $Mg(C_2B_9H_{12})_2Mg(CB_{11}H_{12})_2$, $Mg(CB_9H_{10})_2$, $Mg(CB_{11}F_{11}H)_2$, $Mg(CB_9F_8H_2)_2$, $Mg_2(B_{12}H_{12})(B_{10}H_{10})$, $Mg(CB_{11}H_{12})(CB_9H_{10})$, $Mg(CB_{11}F_{11}H)(CB_9F_8H_2)$, $K_2B_{12}I_{12}$, $Cs_2B_{12}Cl_{12}$, and the like.

In an embodiment, a portion of primary anions Q of the primary salt are substituted by secondary anions G during impacting the primary salt with the secondary salt as the impact member, e.g., during ball milling, wherein the superionic conducting salt includes salt anions A that include primary anion Q and secondary anion G. In some embodiments, a portion of primary anions Q of the primary salt are substituted by secondary anions G during impacting the primary salt with the secondary salt as the impact member, e.g., during ball milling, wherein the superionic conducting salt includes salt anions A that include primary anion Q and secondary anion G.

According to an embodiment, secondary anion G of the secondary salt is identical to primary anion Q of the primary salt, i.e., G=Q such that salt anions A of the superionic conducting salt include primary anion Q.

According to an embodiment, secondary anions G of the secondary salt are different from primary anions Q of the primary salt, i.e., G≠A. Salt anions A of the superionic conducting salt can include primary anions Q and secondary anions G. In some embodiments, salt anions A of the superionic conducting salt include substantially all primary anions A and substantially none of secondary anions G even though secondary anions G are different from primary anions Q.

The superionic conducting salt can be made in various ways. In an embodiment, with reference to FIG. 1, a process 100 for making the superionic conducting salt includes: combining the primary salt and the impact member (step 102), wherein the primary salt includes an ordered phase and is an ionic conductor. The process also includes impacting the primary salt with the impact member (step 104); and converting the primary salt to the superionic conducting salt in response to impacting the primary salt with the impact member (step 106) optionally at a conversion temperature that is less than a thermally activated transition temperature (TATT) at which the primary salt would be thermally converted to the superionic conducting salt in an absence of impacting the primary salt with the impact member. Here, the superionic conducting salt includes a superionic conductive phase in a solid state at less than the conversion temperature to make the superionic conducting salt. Additionally, the superionic conducting salt is substantially stable and maintains the superionic conductive phase in the solid state at a temperature less than the thermally activated transition temperature TATT such as at an ambient temperature and lower, e.g., at 35° C. and colder, at 5° C. and colder, at −10° C. colder, and the like. Impacting the primary salt with the impact member includes milling the primary salt with the impact member. It is contemplated that, during milling, a size of particles of the primary salt decreases in forming the superionic conducting salt.

In an embodiment, the impact member includes a plurality of balls for a ball mill, a secondary salt, or a combination thereof. In a certain embodiment, the impact member is the balls and impacting the primary salt includes ball milling the primary salt with the balls to make the superionic conducting salt. In a certain embodiment, the impact member is a combination of the balls and the secondary salt such that the primary salt is subjected to impacts with the balls and secondary salt to form the superionic conducting salt. In a particular embodiment, the impact member is the secondary salt, and the primary salt is subjected to impacts with the secondary salt to form the superionic conducting salt. As a result of milling, the ordered phase present in the primary salt is converted (via a phase transformation) to the disordered phase that is superionic conducting phase of the superionic conducting salt. In some embodiments, the process is accomplished at a temperature that is less than thermally activated transition temperature TATT that would thermally convert the primary salt to the superionic conducting salt in an absence of the impacting. In a certain embodiment, the process is performed below the melting point or the decomposition temperature of the primary salt.

Thermally activated transition temperature TATT depends on the species of primary salt and can be greater than or equal to the ambient temperature (e.g., −40° C.) to less than a melting temperature of the primary salt, specifically greater than or equal to 100° C. to less than a melting temperature of the primary salt, more specifically greater than or equal to 200° C. to less than a melting temperature of the primary salt, further specifically greater than or equal to 300° C. to less than a melting temperature of the primary salt, and yet more specifically greater than or equal to 500° C. to less than a melting temperature of the primary salt.

Subjecting the primary salt to impacts from the impact member produces the conversion temperature that depends on the species of primary salt and optionally is less than TATT, e.g., less than TATT to a cryogenic temperature, specifically less than TATT to −250° C., specifically less than TATT to −50° C., specifically less than TATT to −20° C., specifically less than TATT to 80° C., specifically less than TATT to 50° C., specifically less than 25° C., and specifically less than 10° C.

Figure 2:
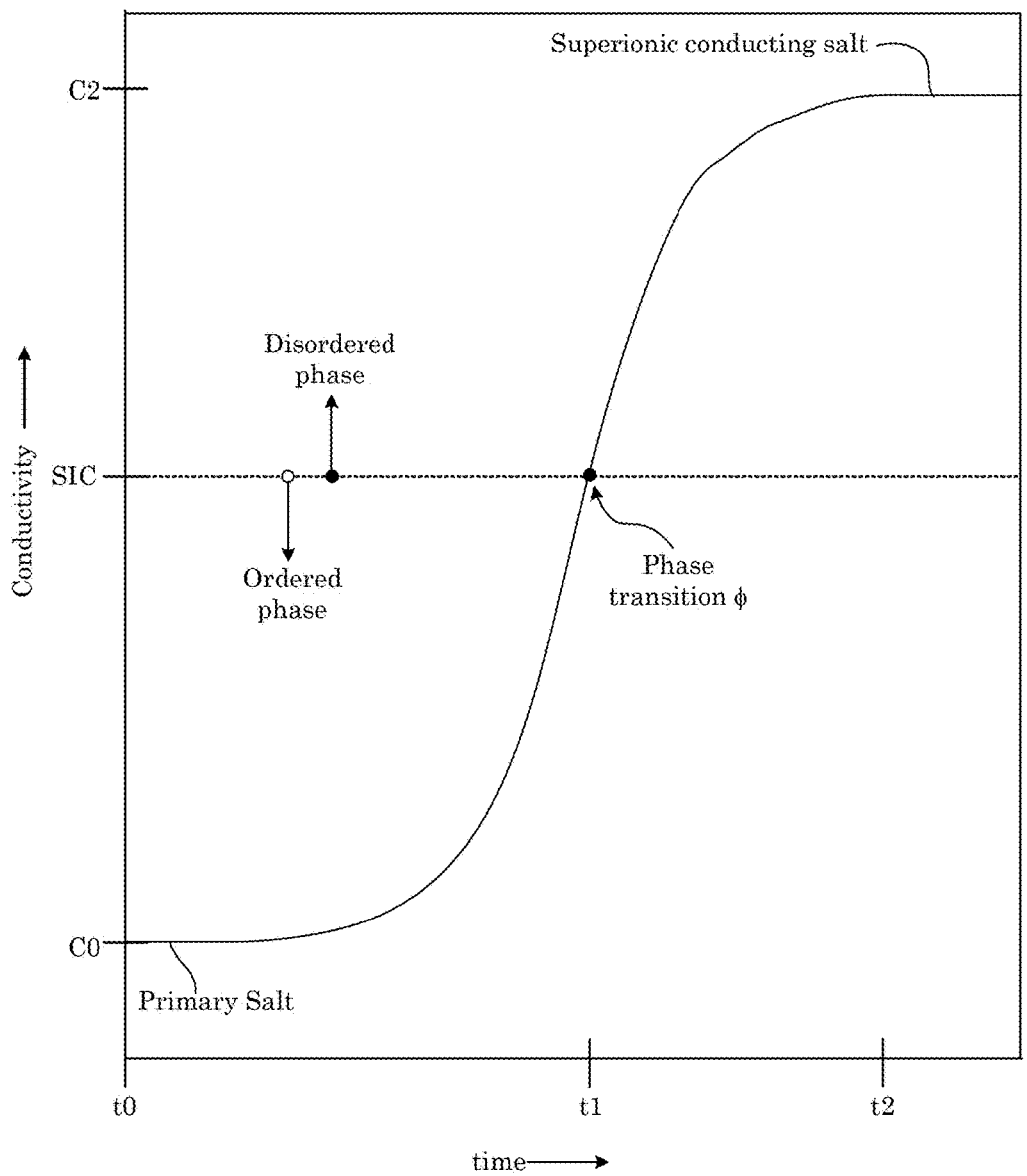
FIG. 2 shows a graph of conductivity versus time during impacting a primary salt with an impact member.

With reference to FIG. 2, which shows a graph of conductivity versus time during impacting a primary salt with an impact member, at time t0, the primary salt and impact member are combined in a container (e.g., a container for a ball mill). At time t0, the primary salt has first conductivity C0 in an ordered phase that is ionically conductive but not superionic conductive (as indicated by the dotted line labelled as superionic conductivity SIC in FIG. 2) such that the primary salt is an ionic conductor but not a superionic conductor. The ordered phase of the primary salt is a result of the periodic arrangement of primary anions in the crystal lattice of the primary salt with respect to primary cations. Moreover, as indicated by the open circle and downward arrow, the ordered phase of the primary salt is present at a conductivity that is less than superionic conductivity SIC. In contrast, as indicated by the filled circle and upward arrow, the disordered phase of the superionic conducting salt is present at a conductivity that is greater than or equal to superionic conductivity SIC. Here, the open circle indicates the conductivity of the ordered phase does not include superionic conductivity SIC. Also, the closed circle indicates the conductivity of the disordered phase includes superionic conductivity SIC.

Between time t0 and time t1, the impact member impacts the primary salt, and the conductivity of the primary salt increases. However, the conductivity of the primary salt at time less than t1 remains less than superionic conductive SIC due to a presence of the ordered phase of the primary salt. It should be appreciated that temperature is not a factor in increasing the conductivity of the primary salt. Rather, the increase in conductivity of the primary salt is due to impacts between the primary salt and the impact member. At time t1, phase transition $\phi$ occurs the impact member continues to impact the primary salt, wherein the ordered phase of the primary salt is converted to the disordered phase of the superionic conducting salt to convert the primary salt to the superionic conducting salt. Without wishing to be bound by theory, it is believed that primary anions of the primary salt in the ordered phase are re-arranged in the disordered phase of the superionic conducting salt during phase transition $\phi$. Between time t1 and time t2, the impact member continues to impact the primary salt, and the conductivity of the superionic conducting salt increases to a second conductivity C2. It should be appreciated that the conductivity increases in the following order C0<SIC<C2.

Figure 3:
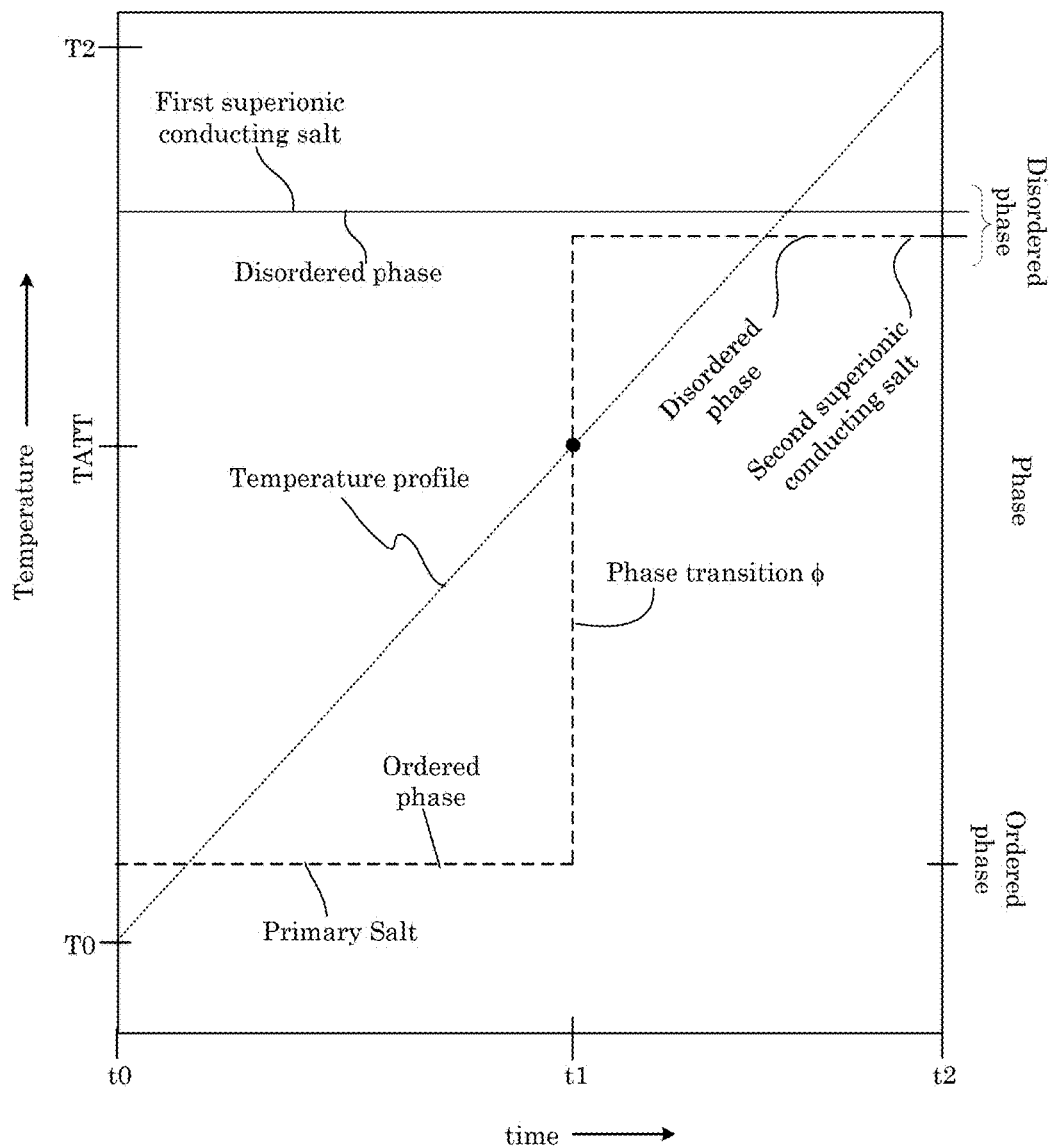
FIG. 3 shows a graph of temperature and phase versus time for a primary salt and first superionic conducting salt.

With reference to FIG. 3, which shows a graph of temperature (left-hand axis) and phase (right-hand axis) versus time for a primary salt and first superionic conducting salt, a temperature profile (corresponding to left-hand axis) is shown that increases from time t0 to time t2. The first superionic conducting salt (that has a superionic conducting disordered phase) is formed by impact of a primary salt (an ordered phase, which is not superionic conducting) with an impact member as above-described. Here, a primary salt and a first superionic conducting salt are subjected to increasing temperature from temperature T0 at time t0 to temperature T2 at time t2, and a phase profile (corresponding to right-hand axis) for the primary salt and a phase profile (also corresponding to the right-hand axis) for the first superionic conducting salt are shown as the temperature increases over time. The first superionic conducting salt has the disordered phase at time t0 and temperature T0 that is constant upon heating to temperature T2 at time t2 such that a conductivity of the first superionic conducting salt remains constant that is at least superionic conductivity SIC. The primary salt has the ordered phase at time t0 and temperature T0 but undergoes phase transition $\phi$ at time t1 due to the temperature being at thermally activated transition temperature TATT for converting ordered phase to the disordered phase such that the primary salt is converted at time t1 at TATT to the second superionic conducting salt having a disordered phase that is present at a temperature greater than or equal to thermally activated transition temperature TATT. As a result, the second superionic conducting salt has a conductivity that is at least superionic conductivity SIC at time t1 and greater. However, upon decreasing the temperature below thermally activated transition temperature TATT, the second superionic conducting salt converts back to the primary salt, but the first superionic conducting salt maintains the disordered phase in superionic conductivity SIC at all these temperatures and does not undergo a phase transition to create an ordered phase in the first superionic conducting salt. It should be noted that temperature T2 is less than a melting temperature of the first superionic conducting salt, second superionic conducting salt, and primary salt. Accordingly, although a primary salt can convert to a superionic conducting salt above a thermally activated transition temperature TATT. Such a superionic conducting salt will revert back to the primary salt below the thermally activated transition temperature TATT, but a superionic conducting salt formed by impacting a primary salt with an impact member optionally at a temperature below the thermally activated transition temperature TATT will maintain its superionic conductivity irregardless of temperature and will not convert back to the primary salt.

Figure 4:
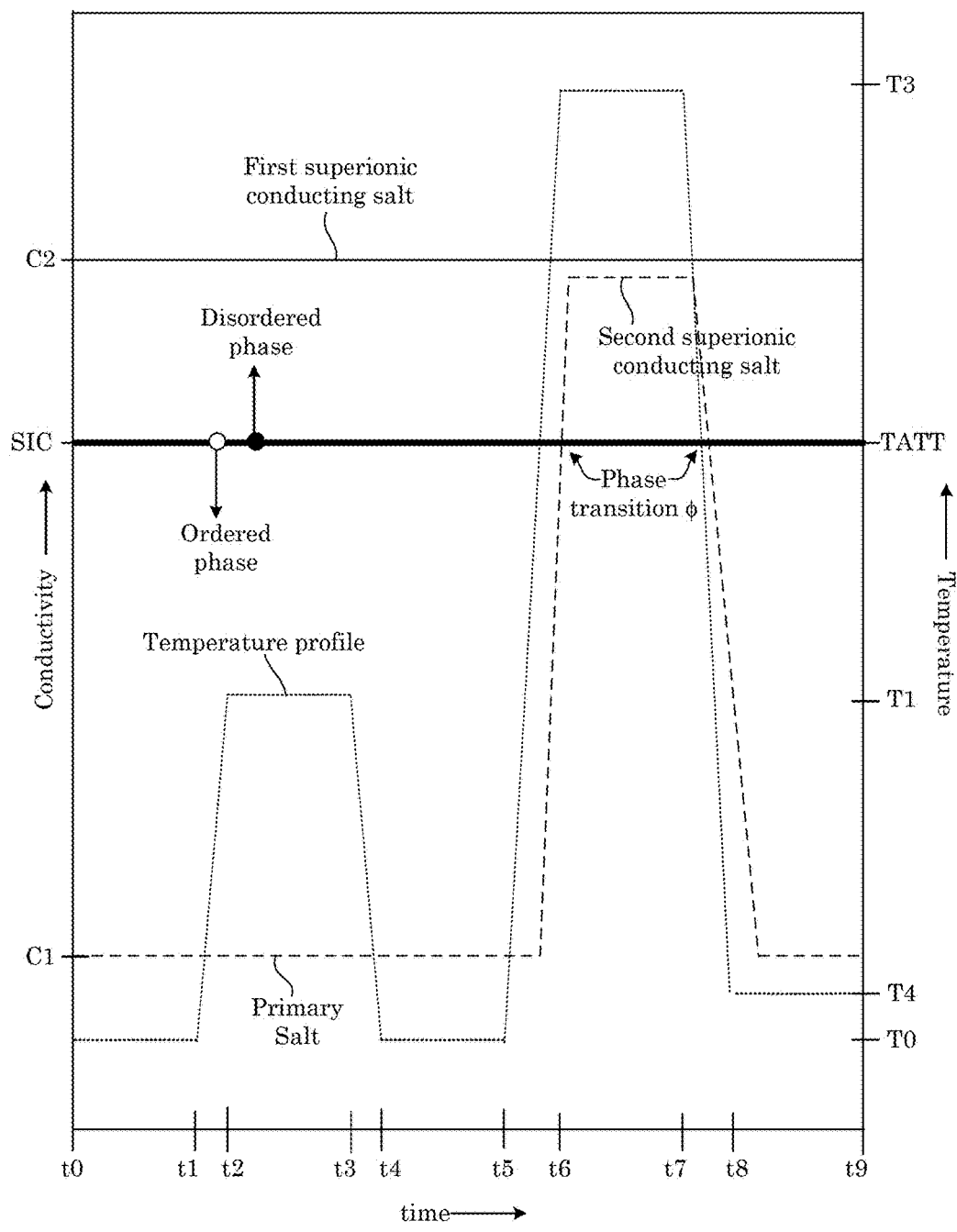
FIG. 4 shows a graph of conductivity and temperature versus time.

With reference to FIG. 4, which shows a graph of conductivity and temperature versus time. Here, a first superionic conducting salt (top solid line) and a primary salt (dashed curve) are subjected to a temperature profile (dotted curve) that changes over time. The first superionic conducting salt includes the disordered phase and is formed by impact of a primary salt (that has an ordered phase) with an impact member as above-described. From time t0 to time t1, the temperature profile has temperature T0; the primary salt has conductivity C1, and the first superionic conducting salt has conductivity C2, which is greater than superionic conductivity SIC (indicated by the bold black line in to FIG. 4). From time t1 to time t2, the temperature profile increases from temperature T0 to temperature T1; the primary salt has conductivity C1, and the first superionic conducting salt has conductivity C2. From time t2 to time t3, the temperature profile remains at temperature T1; the primary salt has conductivity C1, and the first superionic conducting salt has conductivity C2. From time t3 to time t4, the temperature profile decreases from temperature T1 to temperature T0; the primary salt has conductivity C1, and the first superionic conducting salt has conductivity C2. From time t4 to time t5, the temperature profile remains at temperature T0; the primary salt has conductivity C1, and the first superionic conducting salt has conductivity C2. Thereafter, from time t5 to time t6, the temperature profile increases from temperature T0 to temperature T3, and the conductivity of the first superionic conducting salt remains at conductivity C2. During this time the primary salt undergoes phase transition ϕ and converts to the second superionic conducting salt, wherein the conductivity increases from C1 at time t5 to near C2 at time t6, attaining superonic conductivity SIC at thermally activated transition temperature TATT.

From time t6 to time t7, the temperature profile remains at temperature T3; the first superionic conducting salt maintains conductivity C2, and the second superionic conducting salt maintains conductivity near C2. Thereafter, from time t7 to time t8, the temperature profile decreases from temperature T3 to temperature T4, and the conductivity of the first superionic conducting salt remains at conductivity C2. During this time the second superionic conducting salt undergoes phase transition ϕ and converts back to the primary salt below TATT, wherein conductivity decreases from near C2 at time t7 to C1 at time t8, less than superionic conductivity SIC, and after time t8 is time t9 at which the temperature profile is shown as being constant from time t8 to time t9. It should be appreciated that primary salt converts to the second superionic conducting salt at TATT and the second superionic conducting salt converts back to the primary salt below TATT because the primary salt has not undergone impacts with the impact member so that phase transition ϕ occurs at TATT for the primary salt and second superionic salt thermally formed therefrom. In contrast, the first superionic conducting salt was formed by impacts with the impact member to form a superionic conductor optionally below TATT so that the conductivity of the first superionic conducting salt has SIC regardless of temperature. Once formed by impacts between the primary salt and the impact member, the superionic conducting salt is a superionic conductor, and its superionic conductivity is not lost due to changing a temperature of the superionic conducting salt to ambient temperature.

According to an embodiment, the superionic conducting salt has superionic conductivity (also referred to as fast-ion conductivity) at and below room temperature. The superionic conducting salt can be made by combining one or more metal polyborates (primary salts) with an accumulative amount of one or more secondary salts from 0 mole % to 100 mole % in a variety of ways. This can be accomplished by directly combining different component powders of the primary salt and the secondary salt into a powder mixture. Optionally, the powder mixture can be introduced into a solvent and made into an aqueous or non-aqueous solution, followed by full or partial desolvation with heat or vacuum.

In an embodiment, mixing the powder components can be done by first making an aqueous or non-aqueous solution of each of the primary salt and the secondary salt and then mixing the solutions, followed by full or partial desolvation of the mixed solution with heat or vacuum. Mixing the components can be done by adding some of the powder components to other components already in solution, followed by full or partial desolvation of the mixed solution with heat or vacuum. After combining, the resulting solution can be milled using optimized parameters depending on the type of mill such as a Spex high-energy ball-mill, planetary ball-mill, or a dry or wet micronizing mill, or the material can be dissolved into a solution and micronized, e.g., by spray drying, e.g., ultrasonic spray pyrolysis, to form the superionic conducting salt. The superionic conducting salt optionally further can be dried by application of heat or vacuum.

Moreover, further annealing of the superionic conducting salt using a tailored combination of temperature ramping and isothermal treatment in contact with a gas, liquid, or in vacuum, can occur to select a value of conductivity of the superionic conducting salt for fast-ion conductivity. The superionic conducting salt having superionic conductivity can be formed by spray-drying in combination with or in an absence of further drying before ball-milling the primary salt. This resulting superionic conducting salt can include identical cations or anions as the primary salt or can include chemical modification of the primary cations or primary anions of the primary salt to include, e.g., salt cations or salt anions that also include some of the secondary cations or secondary anions. As compared to the primary salt, the superionic conducting salt has increased nanocrystallinity and increased structural disorder at room temperature. Without wishing to be bound by theory, it is believed that the room temperature disorder of the disordered phase of the superionic conducting salt may be similar, substantially similar, or identical to the disordered phase (that reverses to the ordered phase) of the primary salt above the thermally activated transition temperature TATT. Accordingly, the dry, solid superionic conducting salt includes highly mobile salt cations.

Figure 5:
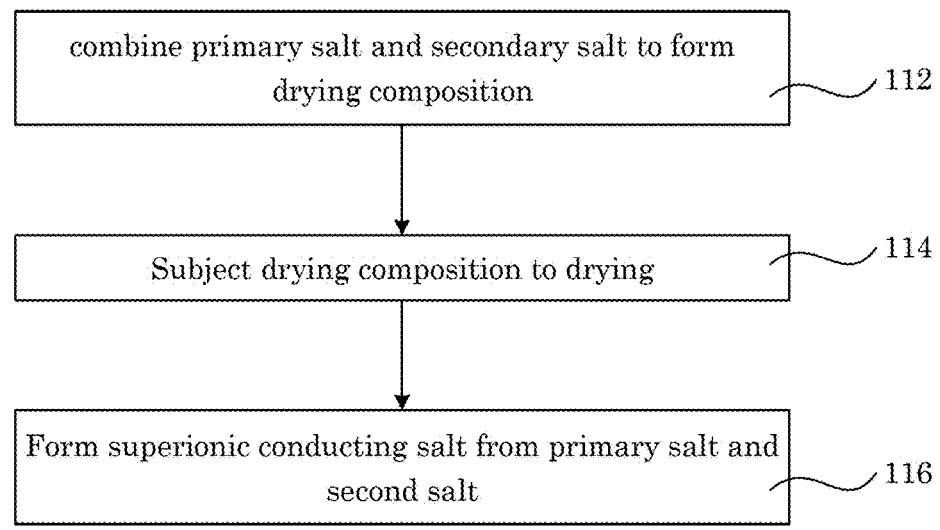
FIG. 5 shows a flow chart for a process for making a superionic conducting salt.

In an embodiment, with reference to FIG. 5, a process (110) for making the superionic conducting salt includes: combining the primary salt and the secondary salt to form a drying composition (step 112) that is a fluid (e.g., a liquid) and that includes the primary salt and the secondary salt, the primary salt including the ordered phase and being the ionic conductor; drying the drying composition (step 114); and converting the primary salt to the superionic conducting salt in response to drying the drying composition at a conversion temperature sufficiently high to remove solvent molecules to make the superionic conducting salt (step 116). Optionally, the conversion temperature can be less than thermally activated transition temperature TATT that thermally converts the primary salt to the superionic conducting salt in an absence of the secondary salt, and the superionic conducting salt including the superionic conducting phase in the solid state at less than thermally activated transition temperature TATT. Here, drying includes any appropriate method of heating (e.g., in a drying oven or tube furnace) and with the sample in the presence of air, inert gas, or vacuum. The drying composition can include a solvent such as water, acetonitrile, acetone, tetrahydrofuran, and the like, or a combination thereof, and combining the primary salt and the secondary salt can include disposing the primary salt and the secondary salt in the solvent.

An amount of the secondary salt in a presence of the primary salt can be from 99.9 wt % to 0 wt %, based on a total weight of the primary salt and the secondary salt. An amount of the additive (e.g., binder), when present, can be from 99.9 wt % to 0 wt %, based on a total weight of the primary salt and the additive. In a presence of the secondary salt and primary salt, an amount of the additive (e.g., binder), when present, can be from 99.9 wt % to 0 wt %, based on a total weight of the primary salt, the secondary salt, and the additive.

The superionic conducting salt has numerous beneficial uses, including as a component in an electrolyte composition of a battery. In an embodiment, a battery includes: an electrolyte composition that includes: a superionic conducting salt that includes a plurality of salt cations, a plurality of salt anions, and a superionic conductive phase that is present in a solid state at ambient temperature; and optionally a binder in which the superionic conducting salt is disposed; a first electrode; and a second electrode separated from the first electrode by interposition of the electrolyte composition.

As used herein, "battery" can be used interchangeably with "electrochemical cell" or "cell" although a battery can include one or more cells, e.g., hundreds or more cells. A cell can generate current by a chemical reaction. Additionally, the electrochemical cell can be used, e.g., in the battery, fuel cell, or ultracapacitor. The battery can be rechargeable and can produce a voltage. In a particular embodiment, the battery produces from 3 V to 5 V, e.g., 3.2 V.

The first electrode can be a cathode, and the second electrode can be an anode. After discharge, the battery can be recharged. Advantageously, the superionic conducting salt in the battery provides overcharging protection and resistance to degradation of components of the electrolyte composition, binder, anode, or cathode to prevent production of a significant amount of heat during recharge of the battery.

The anode can include non-graphitizing carbon, natural or artificial graphite carbon, graphite, meso-phase pitch graphized carbon fibers, activated carbon, carbon black, tin oxide, lithium, silicon, germanium compound, or a combination thereof. The cathode can include any known composition employed in cells. For a lithium or lithium-ion cell, typically, a lithium transition metal or main group metal composite oxide is used as the cathode. The cathode can include $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiFePO_4$, $LiMn_2O_4$, $LiFeO_2$, $LiMet_{0.5}Mn_{1.5}O_4$, $LiMnO_2$, $LiNiO_2$, $LiVO_2$, $LiTiO_2$, $LiCo_{0.88}Ni_{0.2}O_2$, $LiMn_2O_4$, $TiS_2$, $MoS_2$, $FeS_2$, and FeS, vanadium oxide, a combination thereof, wherein Met is Al, Mg, Ti, B, Ga, Si, Ni, or Co, and wherein $0<x<0.3$, $0<z<0.5$, $0<y<0.5$. In an embodiment, the cathode includes a spinel manganese oxide with a formula of $Li_{1+x}Mn_{2-z}Met_yO_{4-m}X_n$, wherein Met is Al, Mg, Ti, B, Ga, Si, Ni, Co, or a combination thereof, and X is S or F, and wherein $0<x<0.3$, $0<z<0.5$, $0<y<0.5$, $0<m<0.5$, and $0<n<0.5$.

In an embodiment, the cathode and the anode independently can be a foil or sheet of metal such as aluminum, nickel, titanium, copper, lithium, sodium, magnesium, or a combination thereof.

The binder of the electrolyte composition can be a material that does not adversely interact or decrease a superionic conductivity of the superionic conducting salt. An exemplary binder is polyvinylidene fluoride and the like.

The electrolyte composition is a solid interposed between the cathode and anode. The electrolyte composition also can be included in the cathode or the anode. It is contemplated that the binder can include a cross-linked network structure, including a semi-solid electrolyte, such as a gel electrolyte that includes, in combination with the cross-linked network structure, an additional binder, e.g., a polyacrylonitrile and the like.

In an embodiment, the superionic conducting salt is subjected to densification by uniaxial pressing to produce a solid electrolyte that has bulk superionic conductivity. It is contemplated that the superionic conducting salt can include an additive (e.g., binder) for incorporation of the solid electrolyte into a device to provide a solid superionic conductor in the device. A percentage (e.g., 50 weight percent (wt %), based on a total weight of additive and superionic conducting salt) of a solid additive may be used to bind the powder of the superionic conducting salt into a stable solid shape during densification. The additive can be a superionic conductor. In some embodiments, a plurality of different superionic conducting salts are included in as a composite for use in a solid-state device. The composite can include the additive.

Figure 6:
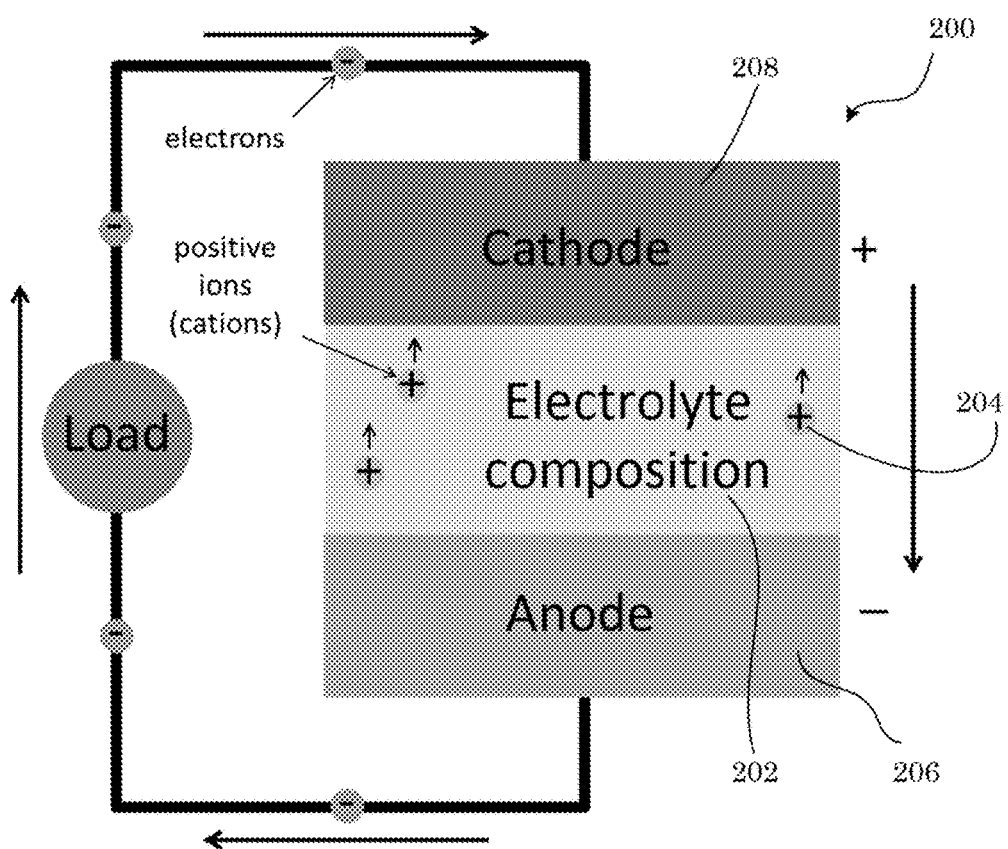
FIG. 6 shows a solid-state battery in an electrical circuit.

FIG. 6 shows solid-state battery 200 that includes solid electrolyte 202 (configured for migration of cations 204) interposed between anode 206 and cathode 208. Solid electrolyte 202 is used at a device relevant temperature (e.g., ambient temperature) and has unexpectedly high ionic conductivity (i.e., unexpectedly is a superionic conductor at the ambient temperature). Beneficially, solid electrolyte 202 that includes the superionic conducting salt replaces a liquid-based electrolyte and provides a solid-state battery, supercapacitor, or other energy-related device, as well as being used in any other application requiring fast-ion conductivity (i.e., superionic conductivity) with an electrolyte ionic mobility and stability effective for a real-world practical application such as in batteries for portable electronic devices.

The superionic conducting salt and processes for making the superionic conducting salt has beneficial and advantageous properties. The superionic conducting salt can be conformable or air-stable under ambient conditions.

The articles and processes herein are illustrated further by the following Examples, which are non-limiting.

EXAMPLES

Example 1. Superionic Conducting Salts

Here we report the superionic conducting salt that are room-temperature stabilized and formed by ball-milling a plurality of lithium and sodium closo-borate primary salts, namely: $Li_2B_{12}H_{12}$, $Li_2B_{10}H_{10}$, $LiCB_{11}H_{12}$, $Na_2B_{12}H_{12}$, $Na_2B_{10}H_{10}$, and $NaCB_{11}H_{12}$. AC impedance measurements for superionic conducting $Na_2B_{12}H_{12}$ and $Li_2B_{12}H_{12}$ confirmed dramatic increases in room-T superionic conductivities compared to the primary salt materials. In addition, ball-milling mixtures of primary salt lead to mixed-polyhedral-anion superionic conducting salts as well as room-temperature stabilization of their disordered phase. Morphological modification of the primary salts to form the superionic conducting salts with tailoring the salt anion (or salt cation) composition of the superionic conducting salt provided selection of superionic conducting properties of the superionic conducting salts.

Primary salts included $Li_2B_{12}H_{12}$, $LiCB_{11}H_{12}$, $Na_2B_{12}H_{12}$, $Na_2B_{10}H_{10}$, and $NaCB_{11}H_{12}$ and were obtained commercially from Katchem. Primary salt $Li_2B_{10}H_{10}$ was synthesized as described in J.-H. Her et al, *J. Phys. Chem. C* 113, 11187 (2009), which is incorporated herein by reference in its entirety. $^{11}$B-enriched primary salt $Na_2{}^{11}B_{12}H_{12}$ was prepared as described in X. Liu et al., *J. Mater. Chem. A,* 1 9935 (2013). Primary salt $Na_2{}^{11}B_{12}H_{12}$ was used for all pure primary salt $Na_2B_{12}H_{12}$ data presented. Natural-boron $Na_2B_{12}H_{12}$ was used to prepare a primary salt $Na_2B_{12}H_{12}/Na_2B_{10}H_{10}$ mixed compound. All primary salts were dried under appropriate conditions of vacuum, time, and temperature. The resulting anhydrous primary salts were ball-milled using a Fritch Pulverisette no. 7 planetary ball mill at 400 Hz. The total processing times including repetitive two-step sequences, which varied by primary salt. Stainless steel vials (12 mL) with six 10 mm balls and six 1 mm balls per vial were used with sample masses of ~0.3-0.4 g.

Compounds before (primary salt) and after ball-milling (superionic conducting salt) were structurally characterized by X-ray powder diffraction (XRD) using a Rigaku Ultima III X-ray diffractometer with a Cu-Kα source (λ=1.5418 Å). Structural refinements were performed using the Fullprof software. Neutron scattering measurements of the primary salt $Na_2{}^{11}B_{12}H_{12}$ and after ball milling (superionic conducting salt $Na_2{}^{11}B_{12}H_{12}$) were performed at the National Institute of Standards and Technology Center for Neutron Research. Quasielastic neutron scattering (QENS) measurements were taken on both the Disc Chopper Spectrometer (DCS) using incident neutrons of 12 Å wavelength (0.57 meV) with a full-width-at-half-maximum (fwhm) resolution of 11 μeV, and the High-Flux Backscattering Spectrometer (HFBS) using 6.27 Å neutrons with a fwhm resolution of 0.8 μeV. HFBS fixed-window scans were collected at ±0.5 K $min^{-1}$ ramp rates. All neutron inelastic scattering data were analyzed using the DAVE software package. Ionic conductivities were determined under Ar by an AC complex impedance method with a two-probe technique using an NF 5097 frequency response analyzer over a frequency range of 1 Hz to 10 MHz. The powder samples were pressed into pellets of 5 mm in diameter and approximately 2 mm in thickness without sintering, yielding densities typically more than 93% of those calculated from the lattice parameters. Au foils were used as electrodes for both $Na_2B_{12}H_{12}$ and $Li_2B_{12}H_{12}$ and mechanically fixed onto both faces of the pellets.

Figure 7:
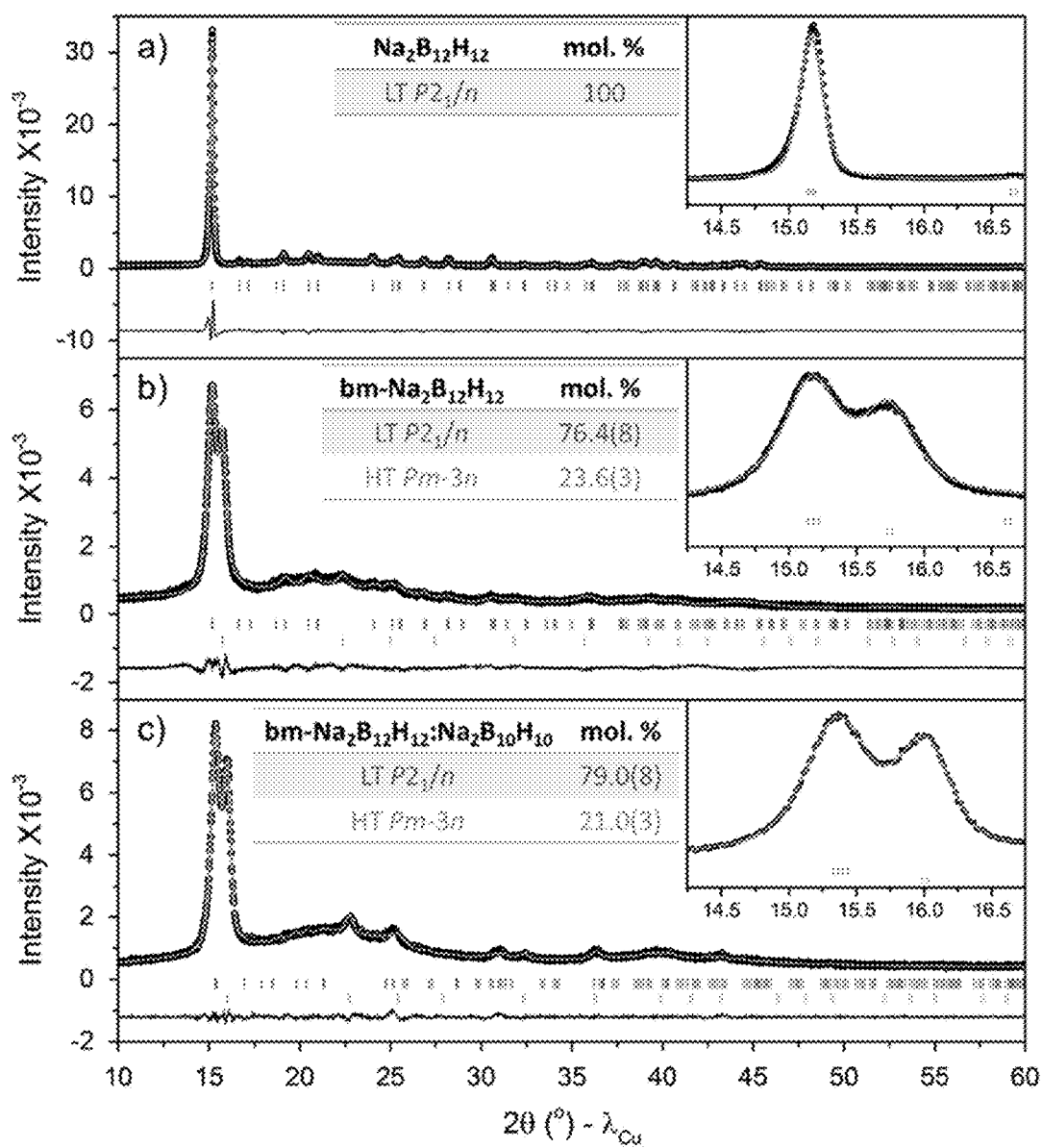
FIG. 7 shows graphs of intensity versus diffraction angle for XRD data of various primary salts and superionic conducting salts.

FIG. 7 panel a and panel b show X-ray powder diffraction to document, (XRD) patterns for $Na_2B_{12}H_{12}$ before (primary salt) and after (superionic conducting salt) ball-milling for 72 h in which data presented are for room-T XRD data [experimental (circles), fitted (grey line), and difference (black line) patterns] for (panel a) pristine (primary salt) $Na_2B_{12}H_{12}$, (b) ball-milled $Na_2B_{12}H_{12}$ (superionic conducting salt), and (c) ball-milled 1:1 $Na_2B_{12}H_{12}$:$Na_2B_{10}H_{10}$ (superionic conducting salt). Grey and light grey bars indicate positions of Bragg peaks for the low-T monoclinic and high-T pseudo-bcc phases, respectively; refinement-derived phase fractions are listed.

Ball milling conditions are listed in Table 1.

TABLE 1

| Sample | Cycle Duration (min) BM | Cycle Duration (min) Pause | Total time (h) | Total milling time (h) |
|---|---|---|---|---|
| $Na_2{}^{11}B_{12}H_{12}$ | 48 | 12 | 90 | 72 |
| $NaCB_{11}H_{12}$ | 30 | 5 | 100 | 86 |
| $Na_2B_{10}H_{10}$ | 50 | 2 | 83 | 80 |
| $Li_2B_{12}H_{12}$ | 2 | 0.5 | 20, 100 | 16, 80 |
| $LiCB_{11}H_{12}$ | 30 | 5 | 100 | 86 |
| $Li_2B_{10}H_{10}$ | 48 | 12 | 100 | 80 |
| $Na_2B_{10}H_{10}$:$Na_2CO_3$ (1:1) | 2 | 0.5 | 35 | 28 |
| $Na_2B_{12}H_{12}$/$Na_2B_{10}H_{10}$ (1:1) | 2 | 0.5 | 4 | 3.2 |

XRD patterns for the ball-milled materials (superionic conducting salts) displayed line broadening compared to the pristine materials (primary salts). Average crystallite sizes (absent any other line-broadening effects such as inhomogeneous strains and lattice imperfections) mentioned below were estimated from the Scherrer equation, $t \approx K\lambda/[\beta \cos(\theta)]$, where t is the crystallite size (nm), K is the shape factor (rad, assumed to be 0.9), λ is the x-ray wavelength (0.15418 nm), β is the fwhm line broadening of the peak (rad), and θ is the Bragg angle (rad).

For the $Na_2B_{12}H_{12}$ XRD data in FIG. 7, the patterns were refined using the low-T monoclinic $P2_1/n$ and high-T pseudo-bcc Pm-3n structures. The refined unit cell parameters for the pristine sample (primary salt) were a=7.0240(3) Å, b=10.6426(5) Å, c=7.0119(5) Å, B=94.842(4)°, and V=522.29(5) 3 for the low-T structure ($R_p$=0.152; $R_{wp}$=0.170). The refined unit cell parameters for the ball-milled sample (superionic conducting salt) were a=6.981(2) Å, b=10.672(3) Å, c=7.009(3) Å, B=94.40(2)°, and V=520.7(3) Å³ for the low-T structure; and a=7.963(2) Å and V=505.0(2) Å³ for the high-T structure ($R_p$=0.122; $R_{wp}$=0.131). The insets compare the relative line-broadening of the main peaks pre- and post-ball-milling. From the Scherrer equation, the particle size of the monoclinic-structured crystallites was estimated as 39 nm before ball-milling, decreasing to 13 nm after ball-milling.

Figure 8:
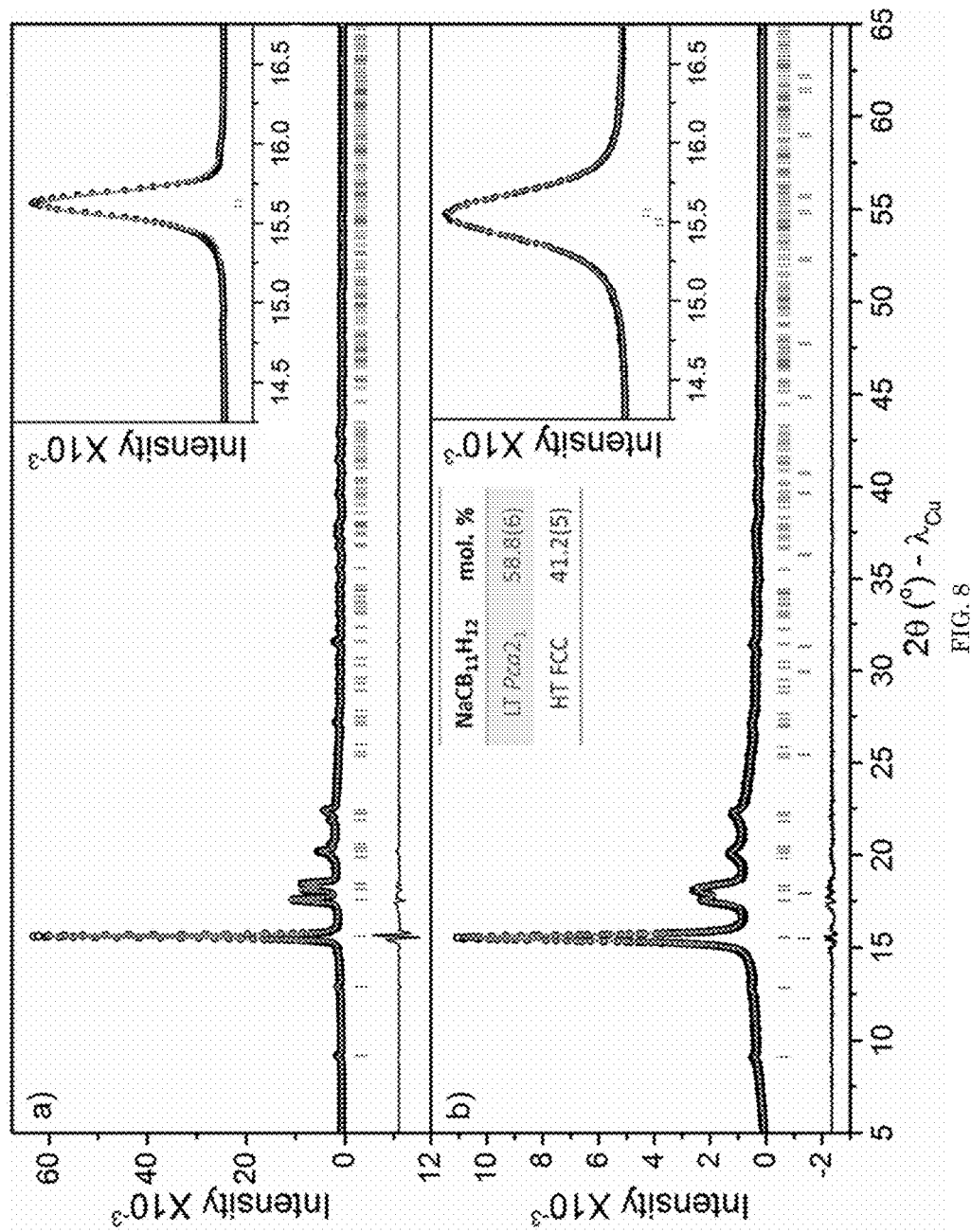
FIG. 8 shows graphs of intensity versus diffraction angle for XRD data of various primary salts and superionic conducting salts.

FIG. 8 shows data for room-T XRD data [experimental (circles), fitted (grey line), and difference (black line) patterns] for (panel a) pristine (primary salt) and (panel b) ball-milled $NaCB_{11}H_{12}$ (superionic conducting salt). Vertical grey and light grey bars indicate the positions of Bragg peaks for the low-T ($Pca2_1$) orthorhombic and high-T (Fm-3m) face-centered-cubic (fcc) phases, respectively. The refined unit cell parameters for the pristine sample were a=9.7821(4) Å, b=9.6254(4) Å, c=10.0928(4) Å, and V=950.30(6) Å³ for the low-T structure ($R_p$=0.091; $R_{wp}$=0.093). The refined unit cell parameters for the ball-milled sample were a=9.8192(6) Å, b=9.6868(5) Å, c=10.1159(5) Å, and V=962.18(9) Å.³ for the low-T structure; and a=9.9065(5) Å and V=972.20(8) Å³ for the high-T structure ($R_p$=0.145; $R_{wp}$=0.129). The insets compare the relative line-broadening of the main peaks pre- and post-ball-milling. From the Scherrer equation, the particle size of the orthorhombic-structured crystallites was estimated as 44 nm before ball-milling, decreasing to 26 nm after ball-milling.

Figure 9:
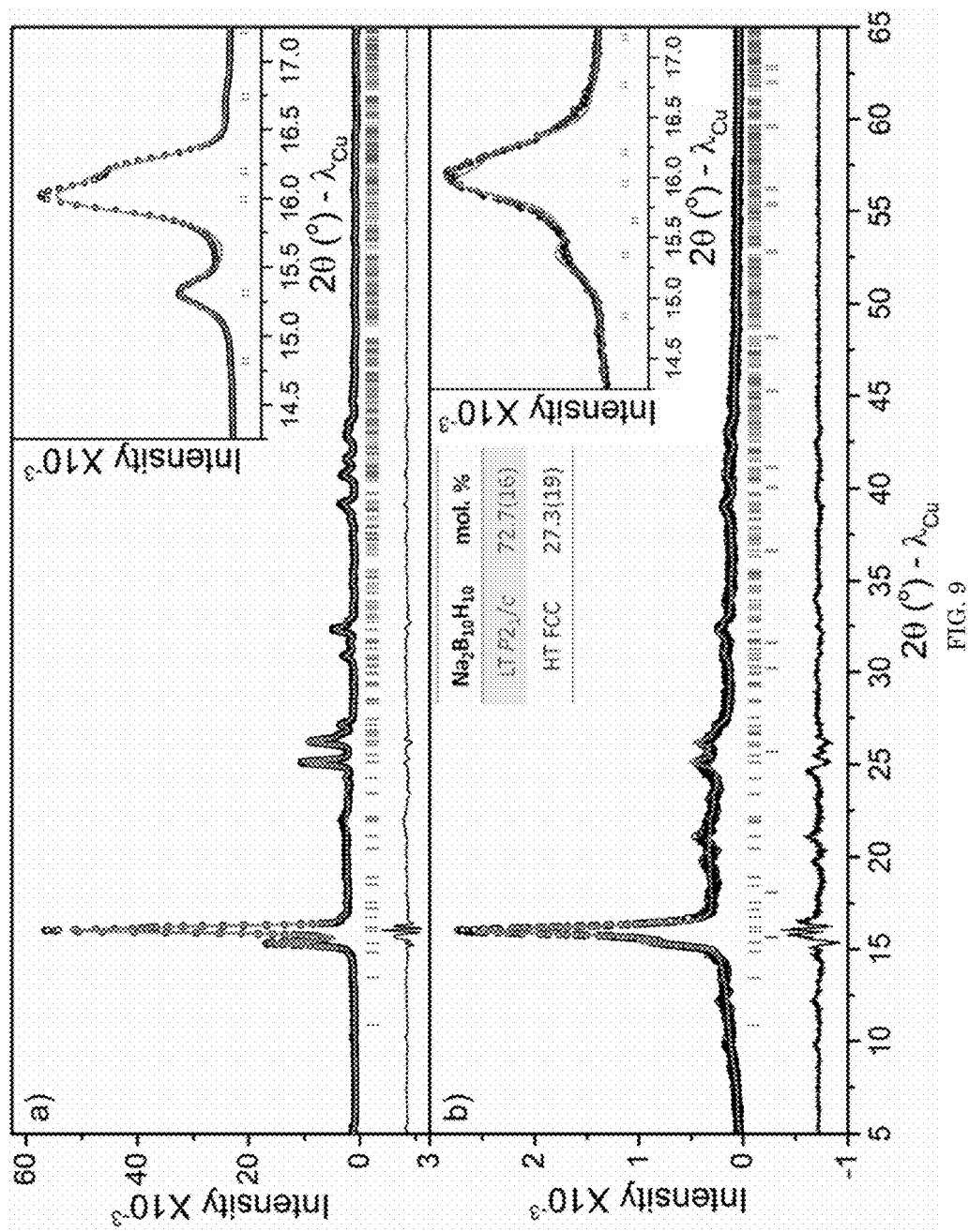
FIG. 9 shows graphs of intensity versus diffraction angle for XRD data of various primary salts and superionic conducting salts.

FIG. 9 shows room-T XRD data [experimental (circles), fitted (grey line), and difference (black line) patterns] for (a) pristine (primary salt) and (b) ball-milled $Na_2B_{10}H_{10}$ (superionic conducting salt). Vertical grey and light grey bars indicate the positions of Bragg peaks for the low-T ($P2_1/c$) monoclinic and high-T (Fm-3m) fcc phases, respectively. The refined unit cell parameters for the pristine sample were a=6.7263(4) Å, b=13.1520(8) Å, c=11.9671(6) Å, ß=120.623(3)°, and V=911.02(9) Å³ for the low-T structure ($R_p$=0.127; $R_{wp}$=0.134). The refined unit cell parameters for the ball-milled sample were a=6.702(1) Å, b=13.189(3) Å, c=11.995(2) Å, ß=120.508(9)°, and V=913.5(3) Å³ for the low-T structure; and a=9.817(2) Å and V=945.9(3) Å³ for the high-T structure ($R_p$=0.180; $R_{wp}$=0.177). The insets compare the relative line-broadening of the main peaks pre- and post-ball-milling. From the Scherrer equation, the particle size of the monoclinic-structured crystallites were estimated as 32 nm before ball-milling, decreasing to 23 nm after ball-milling.

Figure 10:
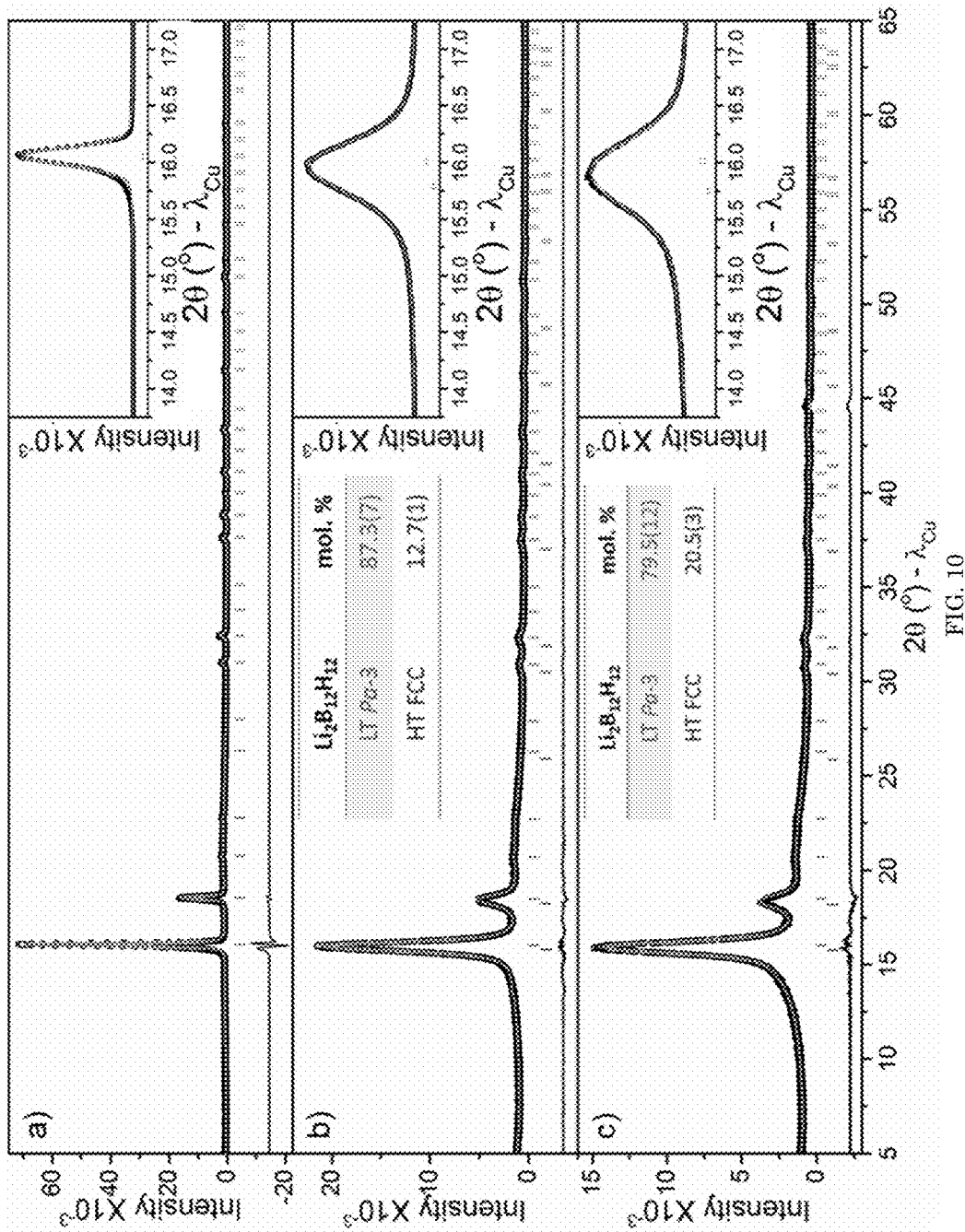
FIG. 10 shows graphs of intensity versus diffraction angle for XRD data of various primary salts and superionic conducting salts.

FIG. 10 shows room-T XRD data [experimental (circles), fitted (grey line), and difference (black line) patterns] for (a) pristine (primary salt), (b) 16 h ball-milled (superionic conducting salt), and (c) 80 h ball-milled (superionic conducting salt) $Li_2B_{12}H_{12}$. Vertical grey and light grey bars indicate the positions of Bragg peaks for the low-T (Pa-3) cubic and high-T (Fm-3m) fcc phases, respectively. The refined unit cell parameters for the pristine sample were a=9.5678(2) Å and V=875.87(3) As for the low-T structure ($R_p$=0.158; $R_{wp}$=0.179). The refined unit cell parameters for the 16 h ball-milled sample were a=9.5953(5) Å and V=883.45(8) As for the low-T structure; and a=9.7230(9) Å and V=919.17(15) Å³ for the high-T structure ($R_p$=0.065; $R_{wp}$=0.068). The refined unit cell parameters for the 80 h ball-milled sample were a=9.5914(5) Å and V=882.36(8) As for the low-T structure; and a=9.7482(7) Å and V=926.4(1) Å$^3$ for the high-T structure (R$_p$=0.106; R$_{wp}$=0.110). The insets compare the relative line-broadening of the main peaks pre- and post-ball-milling. From the Scherrer equation, the particle size of the low-T-cubic-structured crystallites were estimated as 49 nm before ball-milling, decreasing to 15 nm after 16 h of ball-milling and 13 nm after 80 h of ball-milling.

Figure 11:
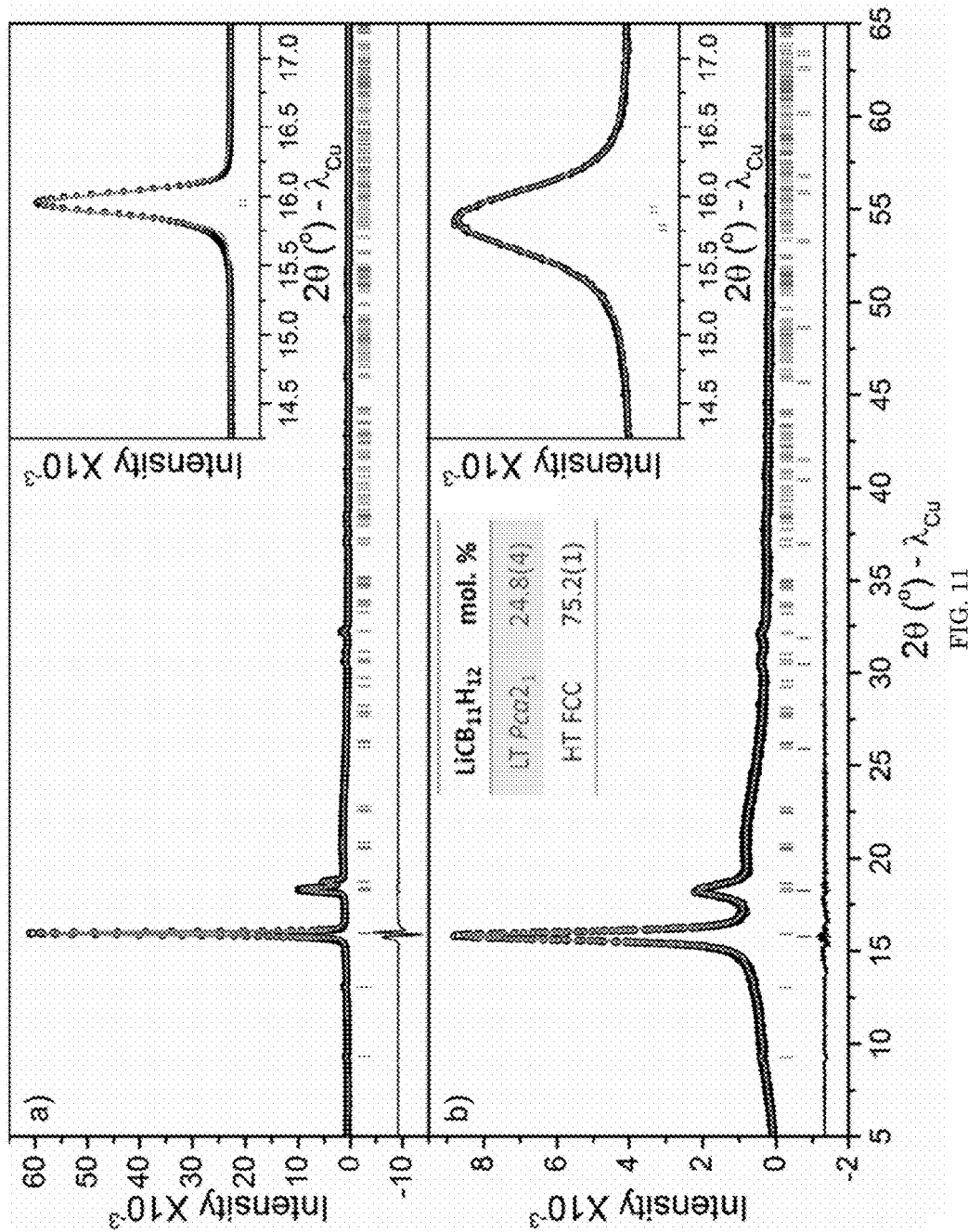
FIG. 11 shows graphs of intensity versus diffraction angle for XRD data of various primary salts and superionic conducting salts.

FIG. 11 shows room-T XRD data [experimental (circles), fitted (grey line), and difference (black line) patterns] for (a) pristine (primary salt) and (b) ball-milled LiCB$_{11}$H$_{12}$ (superionic conducting salt). Vertical grey and light rev bars indicate the positions of Bragg peaks for the low-T (Pca2$_1$) orthorhombic and high-T (Fm-3m) fcc phases, respectively. The refined unit cell parameters for the pristine sample were a=9.6668(5) Å, b=9.4892(5) Å, c=9.7273(5) Å, and V=892.28(8) Å$^3$ for the low-T structure (R$_p$=0.143; R$_{wp}$=0.155). The refined unit cell parameters for the ball-milled sample were a=9.678(1) Å, b=9.537(1) Å, c=9.7564 (9) Å, and V=900.5(2) Å$^3$ for the low-T structure; and a=9.734(1) Å and V=922.4(2) Å$^3$ for the high-T structure (R$_p$=0.105; R$_{wp}$=0.106). The insets compare the relative line-broadening of the main peaks pre- and post-ball-milling. From the Scherrer equation, the particle size of the orthorhombic-structured crystallites was estimated as 45 nm before ball-milling, decreasing to 15 nm after ball-milling.

Figure 12:
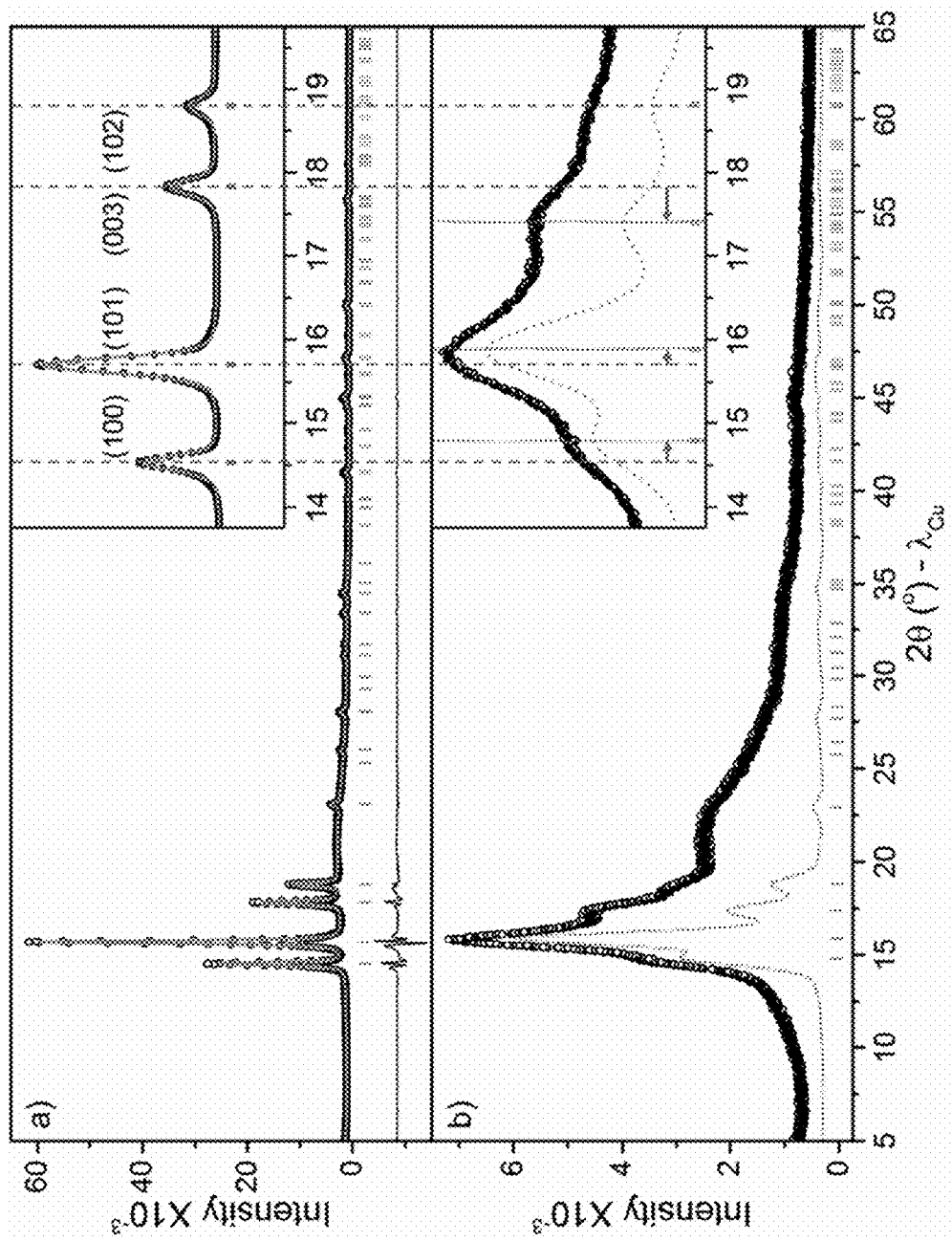
FIG. 12 shows graphs of intensity versus diffraction angle for XRD data of various primary salts and superionic conducting salts.

FIG. 12 shows room-T XRD patterns for (a) pristine (primary salt) and (b) ball-milled Li$_2$B$_{10}$H$_{10}$ (superionic conducting salt). Experimental (circles), fitted (grey line) and difference (black line) are shown for the pristine sample. Vertical grey bars indicate the positions of Bragg peaks for the low-T (P6$_4$22) hexagonal phase. There was clearly disorder present in the ball-milled material. The refined unit cell parameters for the pristine sample were a=7.0416(4) Å, c=14.9266(7) Å, and V=640.97(6) Å$^3$ for the low-T structure (R$_p$=0.140; R$_{wp}$, =0.141). The generated pattern (dotted line) for the ball-milled sample (for a possible hexagonal disordered phase) was based on the low-T hexagonal structure, but with modified unit cell parameters of a=6.92 Å, c=15.30 Å, and V=634.5 Å. The insets compare the relative line-broadening of the main peaks pre- and post-ball-milling. After ball-milling, the positions of the four main Bragg peaks were shifted as seen from the red dashed line (pristine) to the red dotted line (after ball-milling).

Figure 13:
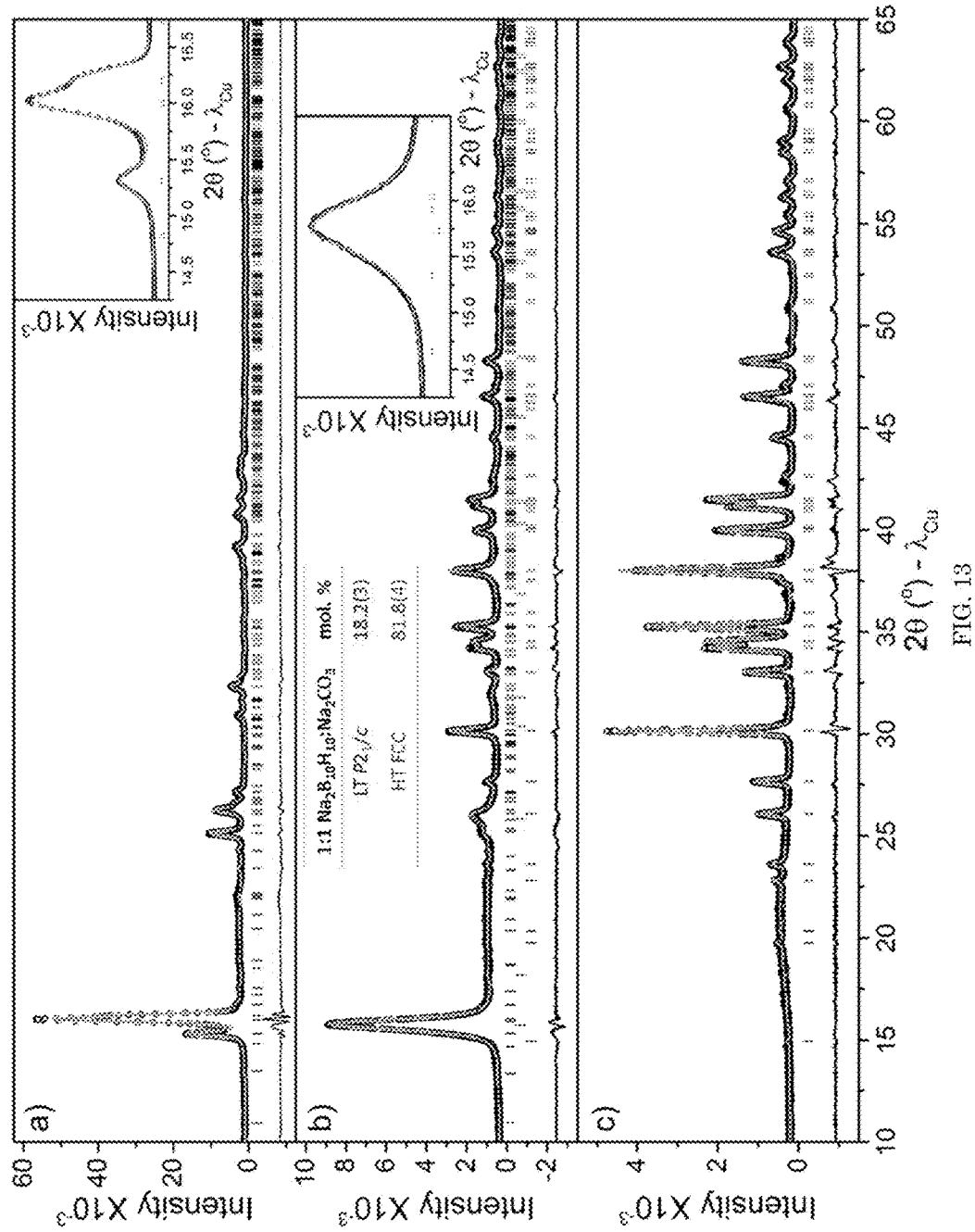
FIG. 13 shows graphs of intensity versus diffraction angle for XRD data of various primary salts and superionic conducting salts.

FIG. 13 shows room-T XRD data [experimental (circles), fitted (grey line), and difference (black line) patterns] for (a) pristine Na$_2$B$_{10}$H$_{10}$ (primary salt), (b) ball-milled 1:1 Na$_2$B$_{10}$H$_{10}$:Na$_2$CO$_3$ (superionic conducting salt), and (c) pristine Na$_2$CO$_3$ (secondary salt). Vertical grey and light grey bars indicate the positions of Bragg peaks for the low-T (P2$_1$/c) monoclinic and high-T (Fm-3m) fcc Na$_2$B$_{10}$H$_{10}$ phases, respectively; purple bars indicate those for (C2/m) monoclinic Na$_2$CO$_3$. The refined unit cell parameters for the pristine Na$_2$B$_{10}$H$_{10}$ sample were a=6.7263(4) Å, b=13.1520 (8) Å, c=11.9671(6) Å, β=120.623(3)°, and V=911.02(9) Å$^3$ for the low-T structure (R$_p$=0.127; R$_{wp}$=0.134) (cf. Fig. S2a). The refined unit cell parameters for the ball-milled 1:1 Na$_2$B$_{10}$H$_{10}$:Na$_2$CO$_3$ sample were a=6.795(2) Å, b=13.294(4) Å, c=11.988(4) Å, β=121.70(2)°, and V=921.4(5) Å$^3$ for the low-T Na$_2$B$_{10}$H$_{10}$ structure; a=9.7608(3) Å and V=929.94 (5) Å$^3$ for the high-T Na$_2$B$_{10}$H$_{10}$ structure; and a=8.9101(2) Å, b=5.2413(1) Å, c=6.0461(1), and β=101.304(2)° for Na$_2$CO$_3$ (R$_p$=0.115; R$_{wp}$=0.116). The refined unit cell parameters for the pristine Na$_2$CO$_3$ sample were a=8.9114 (2) Å, b=5.2423(1) Å, c=6.0454(2), and β=101.339(1)° (R$_p$=0.162; R$_{wp}$=0.179). The insets compare the relative line-broadening of the main peaks pre- and post-ball-milling. From the Scherrer equation, the particle size of the monoclinic-structured Na$_2$B$_{10}$H$_{10}$ crystallites were estimated as 32 nm before ball-milling, decreasing to 21 nm after ball-milling.

Figure 14:
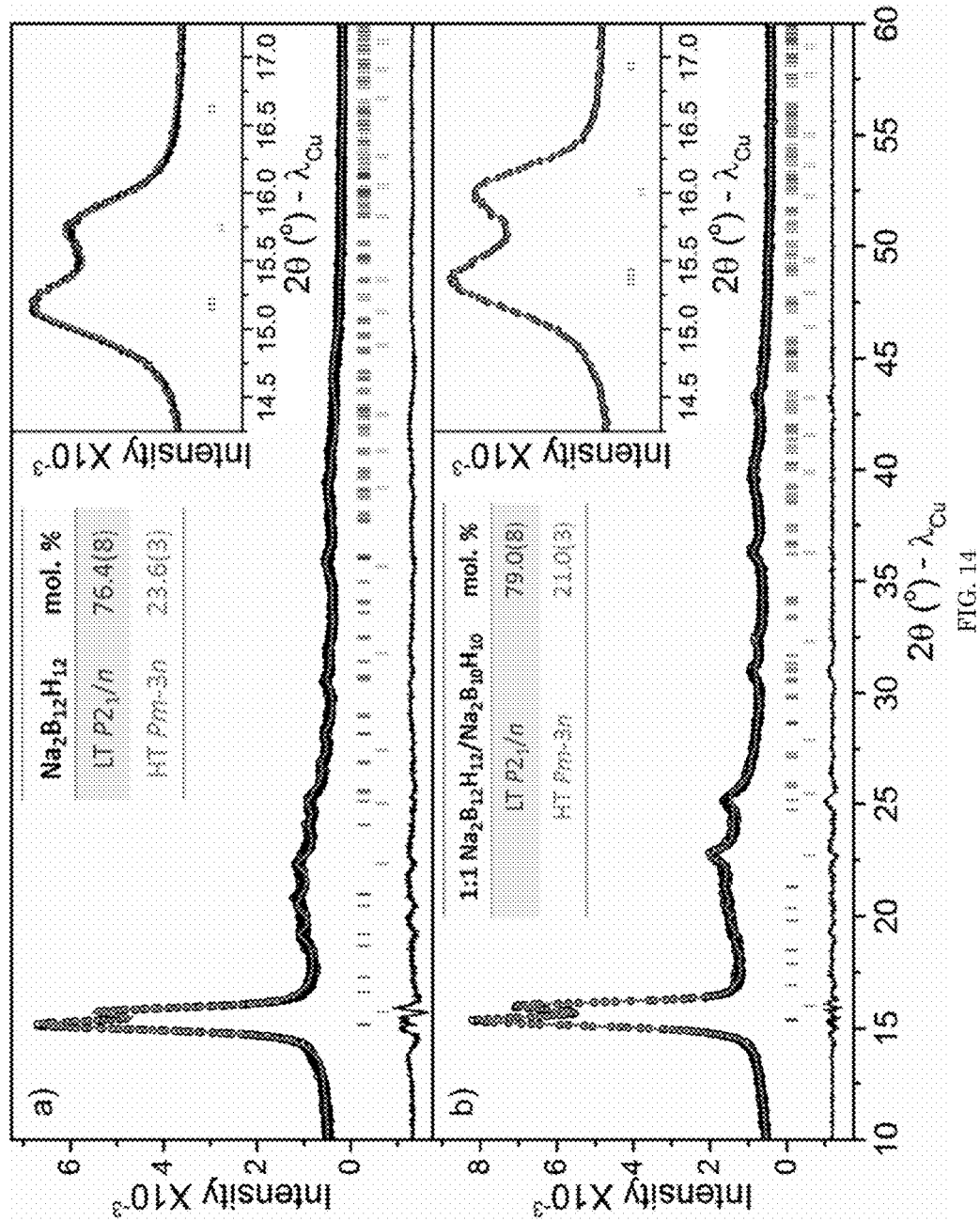
FIG. 14 shows graphs of intensity versus diffraction angle for XRD data of various primary salts and superionic conducting salts.

FIG. 14 shows room-T XRD data [experimental (circles), fitted (grey line), and difference (black line) patterns] for (a) ball-milled Na$_2$B$_{12}$H$_{12}$ (superionic conducting salt) and (b) a 1:1 Na$_2$B$_{12}$H$_{12}$:Na$_2$B$_{10}$H$_{10}$ mixture (superionic conducting salt) ball-milled for 3.2 h followed by vacuum annealing at 548 K for 16 h. Vertical grey and light grey bars indicate the positions of Bragg peaks for the low-T (P2$_1$/n) monoclinic and high-T (Pm-3n) pseudo-bcc phases, respectively. The similarity of the mixed-compound pattern to that for Na$_2$B$_{12}$H$_{12}$ strongly suggested presence of similar ordered monoclinic and disordered bcc solid-solution phases for the mixed compound (each containing both B$_{12}$H$_{12}^{2-}$ and B$_{10}$H$_{10}^{2-}$ anions), but with slightly smaller lattice constants than for pure Na$_2$B$_{12}$H$_{12}$. The refined unit cell parameters for the ball-milled Na$_2$B$_{12}$H$_{12}$ sample were a=6.981(2) Å, b=10.672(3) Å, c=7.009(3) Å, β=94.40(2)°, and V=520.7(3) Å$^3$ for the low-T structure; and a=7.9634(19) Å and V=505.0 (2) Å$^3$ for the high-T structure (R$_p$=0.122; R$_{wp}$=0.131). Assuming similar low-T and high-T Na$_2$B$_{12}$H$_{12}$ structures but with average B and H site occupancies of $^{11}\!/_{12}$, the refined unit cell parameters for the ball-milled Na$_2$B$_{12}$H$_{12}$:Na$_2$B$_{10}$H$_{10}$ sample were a=6.882(3) Å, b=10.477(5) Å, c=6.927(3) Å, β=91.9(3)°, and V=499.1(4) Å$^3$ for the low-T structure; and a=7.8333(1) Å and V=480.6(2) Å$^3$ for the high-T structure (R$_p$=0.112; R$_{wp}$=0.098). These cell volumes were intermediate between those for Na$_2$B$_{12}$H$_{12}$ and Na$_2$B$_{10}$H$_{10}$, which is consistent with the formation of a solid-solution mixed-anion phase.

Figure 15:
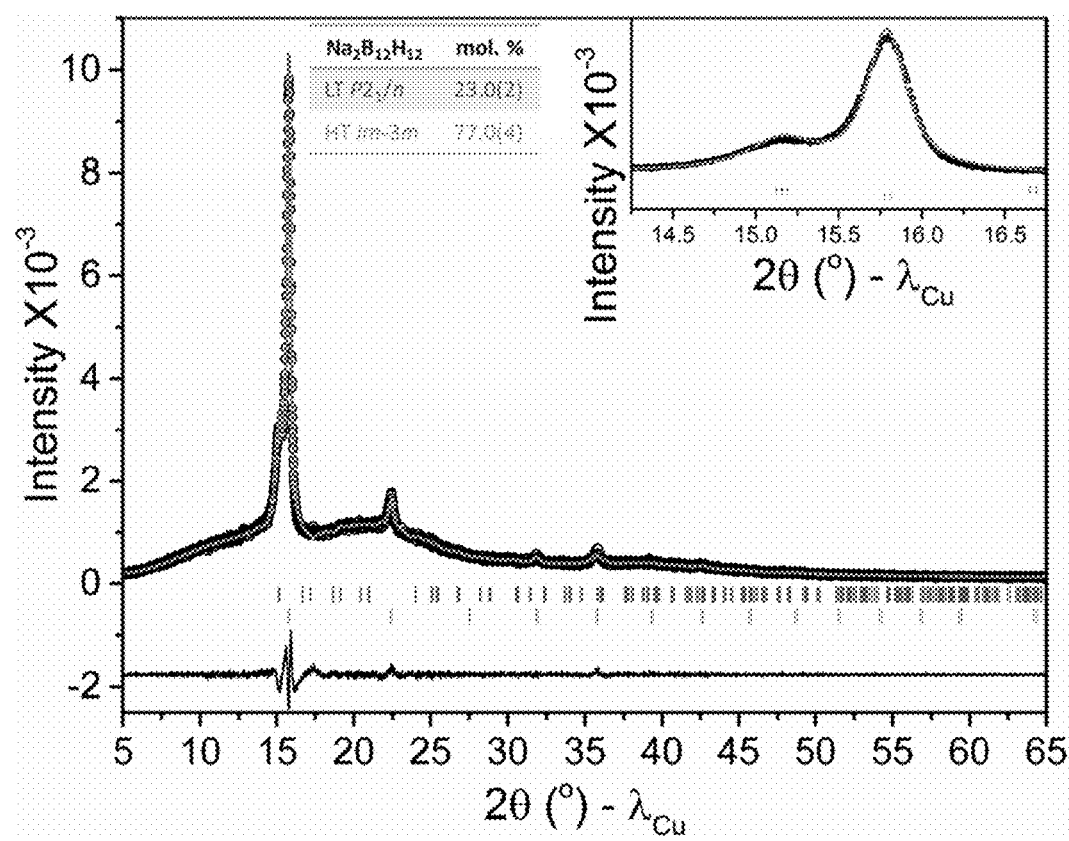
FIG. 15 shows graphs of intensity versus diffraction angle for XRD data of a superionic conducting salt.
Figure 16:
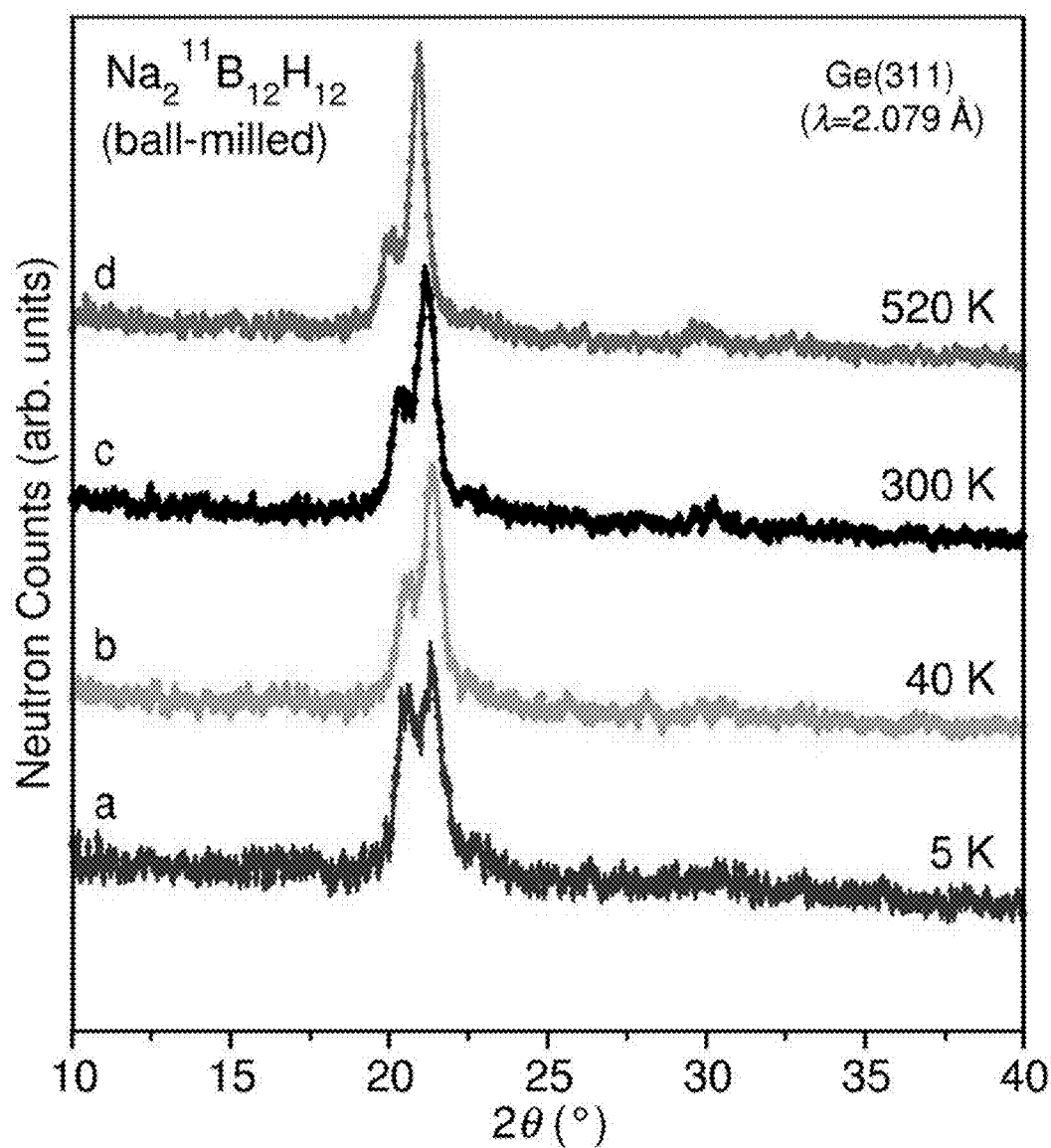
FIG. 16 shows a graph of neutron counts versus angle.
Figure 17:
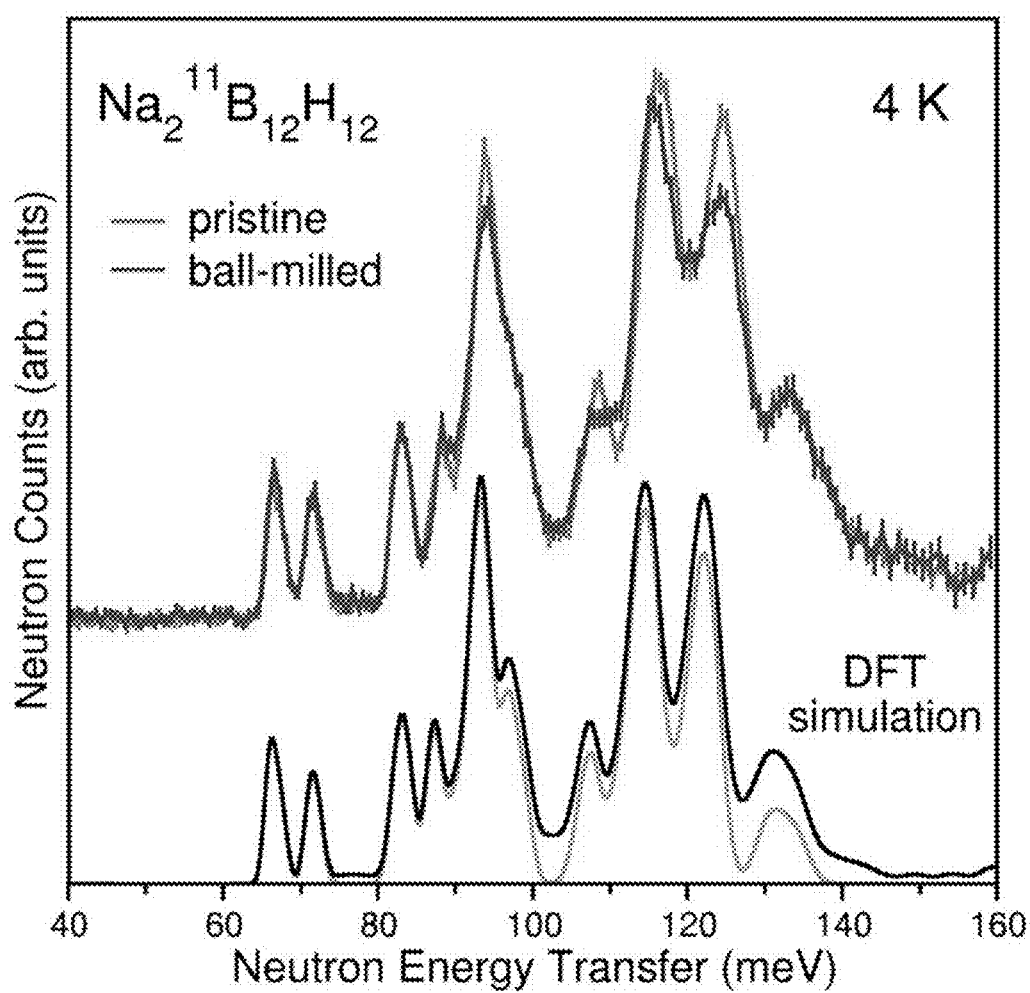
FIG. 17 shows a graph of neutron counts versus neutron energy transfer.

FIG. 15 shows room-T XRD data [experimental (circles), fitted (grey line), and difference (black line) patterns] for ball-milled Na$_2$B$_{12}$H$_{12}$ (superionic conducting salt) after annealing at 620 K for 13 d. Vertical grey and light grey bars indicate the positions of Bragg peaks for the low-T (P2$_1$/n) monoclinic and high-T (Im-3m) bcc phases, respectively. The fully disordered Im-3m bcc structure (instead of the intermediate pseudo-bcc Pm-3n structure) indexed best with the observed pattern. The refined unit cell parameters were a=7.033(5) Å, b=10.641(6) Å, c=7.013(3) Å, β=94.61(5)°, and V=523.1(5) Å$^3$ for the low-T monoclinic structure; and a=7.938(2) Å and V=500.3(2) Å$^3$ for the high-T bcc structure (R$_p$=0.177; R$_{wp}$=0.154). As shown by the NPD data in FIG. 16, this indicated that the stabilized bcc phase for Na$_2$B$_{12}$H$_{12}$ increases upon annealing, even at 620 K and is surprisingly robust with respect to temperature. FIG. 16 shows neutron powder diffraction (NPD) patterns [BT-1 Powder Diffractometer, Ge(311) mono., λ=2.079 A] for Na$_2$$^{11}$Br$_{12}$H$_{12}$: (a) at 5 K after ball-milling for 72 h and annealing at 410 K for 12 h. The bimodal feature represented the Bragg scattering from the ordered monoclinic (at lower angle) and disordered bcc (at higher angle) phases. FIG. 17 compares the 4 K neutron vibrational spectrum for this material at this thermal treatment stage with that for pristine Na$_2$$^{11}$B$_{12}$H$_{12}$. Here, FIG. 17 shows neutron vibrational spectroscopy (NVS) data at 4 K of Na$_2$$^{11}$B$_{12}$H$_{12}$ before and after ball-milling for 72 h and annealing at 410 K for 12 h (using the Filter-Analyzer Neutron Spectrometer with the Cu(220) monochromator) compared to the simulated one-phonon (grey) and one+two-phonon (black) densities of states from DFT phonon calculations of the optimized ordered monoclinic structure. The disordered ball-milled sample displayed perturbations of some anion internal-vibration bands compared to pristine monoclinic $Na_2^{11}B_{12}H_{12}$. Subsequently, the neutron fixed-window scans (FWSs) and QENS data in FIG. 18 were collected up to 520 K. More NPD patterns were then collected at (FIG. 17, curve b) 40 K, (FIG. 17, curve c) 300 K, and (FIG. 17, curve d) 520 K, indicating an increased bcc-phase fraction compared to (FIG. 17, curve a) and an increasing bcc-phase fraction with temperature, in line with the FWS behavior in FIG. 18. Conductivity data in FIG. 21 was finally collected at this stage.

As shown here, ball-milling introduced substantial Bragg peak broadening in all studied compounds. Moreover, phase analyses of the post-ball-mill patterns by Rietveld refinement were consistent with the presence of two phases in all ball-milled samples, the low-T ordered phase plus a higher-symmetry disordered phase matching that normally observed above the order-disorder phase transition. For $Na_2B_{12}H_{12}$, the ordered phase had monoclinic symmetry, whereas the disordered phase had body-centered-cubic (bcc) symmetry. After ball-milling, the molar ratio of ordered-to-disordered phases was estimated from refinement to be 76:24. Complementary neutron powder diffraction (NPD) measurements (FIG. 16) confirmed that the disordered bcc fraction remained stable down to at least 5 K, and neutron vibrational spectra (FIG. 17) revealed minor phonon perturbations due to this disorder.

Figure 19:
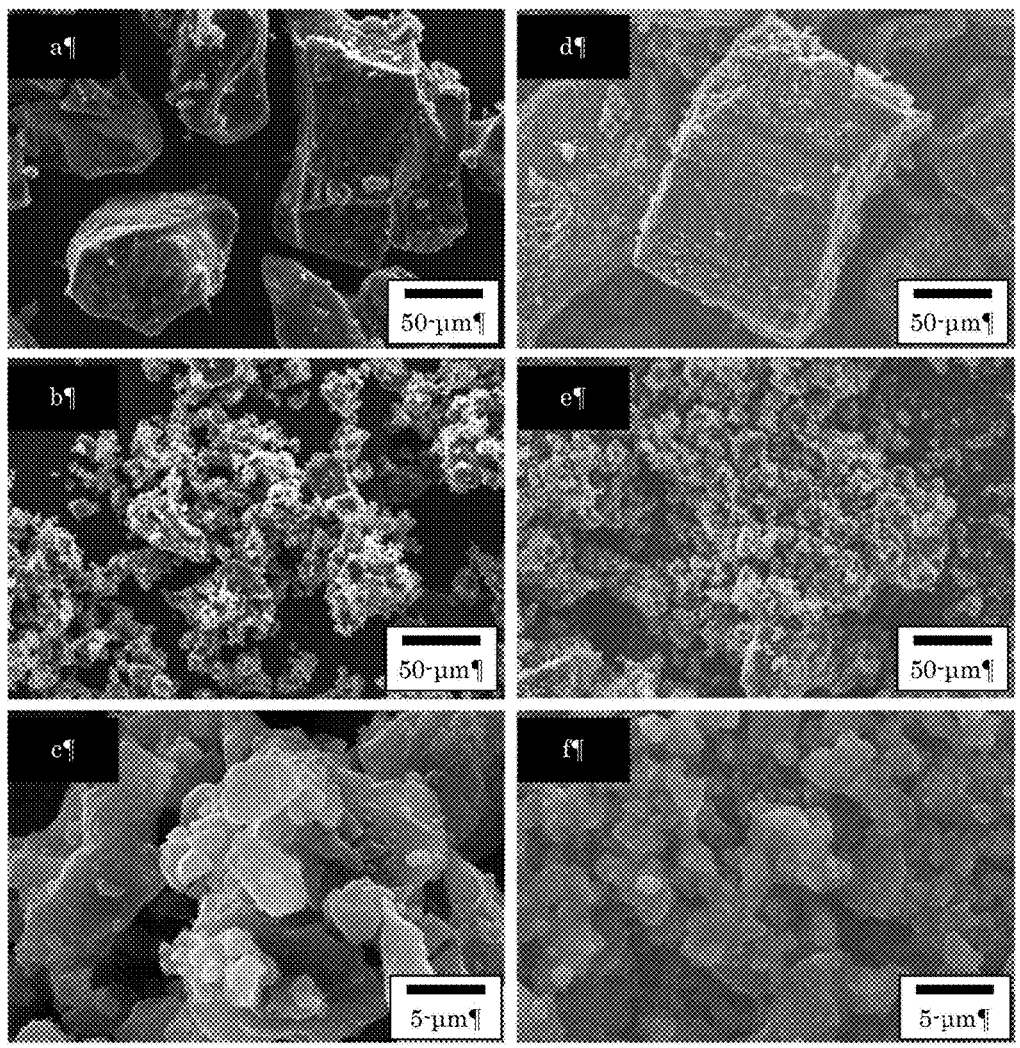
FIG. 19 shows micrographs of sample.

FIG. 19 shows representative scanning electron microscopy images of both $Na_2B_{12}H_{12}$ and $Li_2B_{12}H_{12}$ before and after ball-milling, elucidating the milling-induced particle pulverization. For these materials, increasing the fraction of superionic phase depended on more aggressive milling conditions to maximize the necessary nanoparticulate morphologies. For example, when smaller anions were disposed into the polyhedral salt structures via ball-milling, these additional salt compounds acted as "abrasives" to enhance the particle-size reduction, which led to higher fractions of disordered phase. This is exemplified in FIG. 13 by the XRD pattern for a 1:1 $Na_2B_{10}H_{10}$:$Na_2CO_3$ mixture ball-milled for 28 h, indicating that 82% of the $Na_2B_{10}H_{10}$ is in its disordered fcc phase at room temperature, compared with only around 27% after ball-milling for 80 h without any additive (FIG. 9). Differential scanning calorimetry (FIG. 20) confirmed no order-disorder phase transition upon cycling until the sample was annealed to ~550 K, presumably leading to increased particle sizes and reduced defects through accelerated sintering. This additive-assisted particle-size reduction was even observed at the lowest $Na_2CO_3$ doping of 5% and for other additives such as $Na_2SO_4$.

Panel c of FIG. 7 shows the room-T XRD pattern for a 1:1 mixture of $Na_2B_{12}H_{12}$/$Na_2B_{10}H_{10}$ after ball-milling for 4 h followed by vacuum annealing at 548 K for 16 h. This pattern was similar to ball-milled $Na_2B_{12}H_{12}$ in panel b of FIG. 7. Indeed, it is in line with the presence of both ordered monoclinic and disordered bcc solid-solution phases (each containing both $B_{12}H_{12}^{2-}$ and $B_{10}H_{10}^{2-}$ anions) with unit cell volumes intermediate between the ordered/disordered volumes of the pure compounds (see FIG. 14 for more details). Hence, nanocrystalline mixed-polyhedral-anion compounds can be synthesized in this way, resulting in the room-T stabilization of their own disordered alloy phases.

Figure 18:
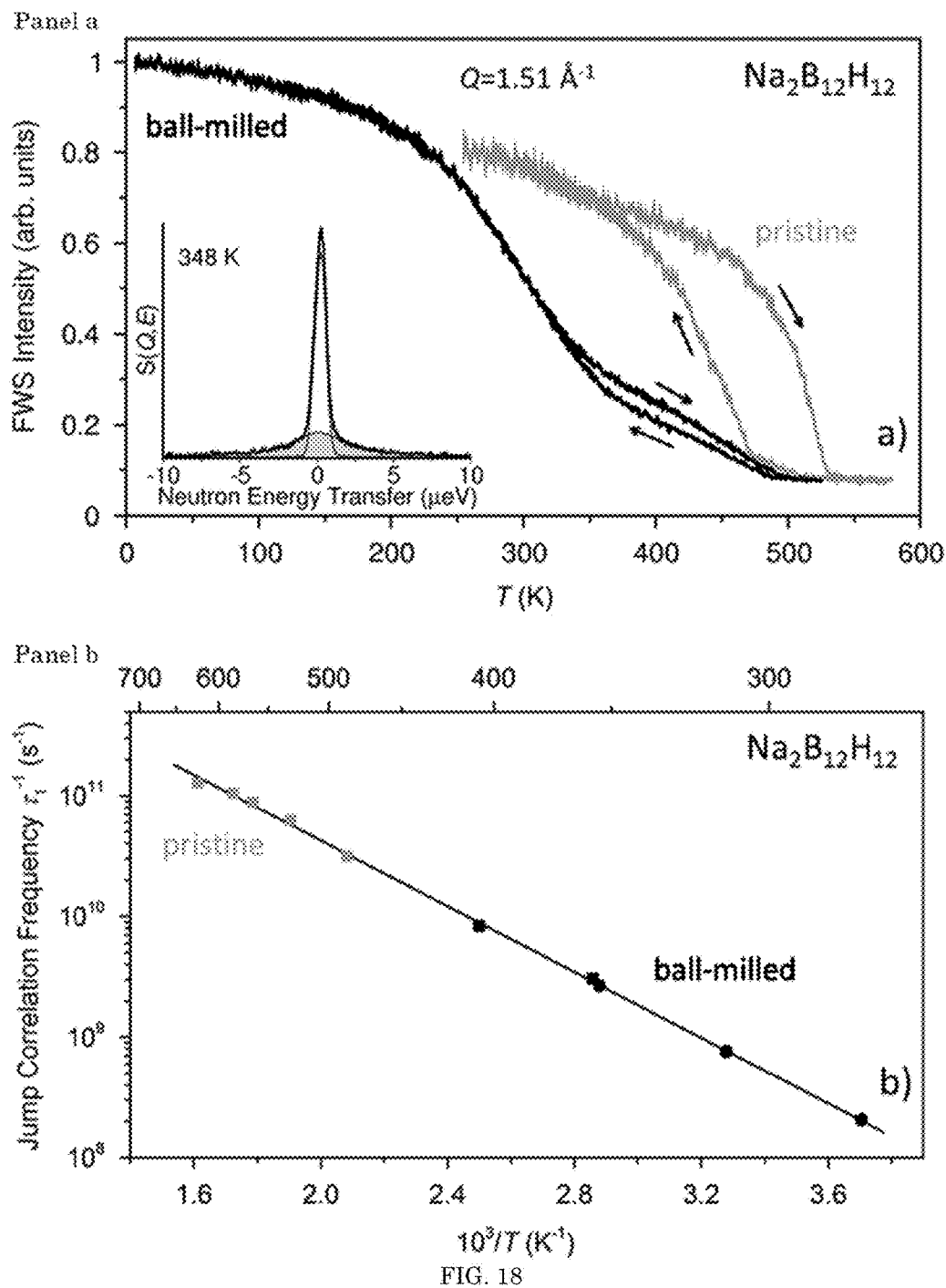
FIG. 18 shows a graph of intensity versus temperature and a graph of jump correlation frequency versus inverse temperature.

Quasielastic neutron scattering (QENS) measurements for the same pre- and post-ball-milled ($^{11}$B-labelled) $Na_2B_{12}H_{12}$ sample measured by XRD in FIG. 7 are shown in FIG. 18. The temperature behavior of the neutron fixed-window scans (FWSs) in panel a of FIG. 18 reflected $B_{12}H_{12}^{2-}$ anion reorientational jump frequencies on the order of $10^8$ s$^{-1}$ already by ~240-250 K after ball-milling (as evidenced by the onset of more significant intensity dropoff), which was consistent with the presence of the high-T-like disordered phase manifested by XRD. In comparison, pristine $Na_2B_{12}H_{12}$ displayed hysteretic FWS behavior and high reorientational mobility only at considerably higher temperatures. QENS spectra of ball-milled $Na_2B_{12}H_{12}$ were measured between 270 K and 400 K and fit to a primary Lorentzian component linewidth $(2 h)/\tau_1$, ranging between 0.27 µeV and 11 µeV fwhm, respectively. This narrow Lorentzian component dominated at lower Q values, with increasing contributions from one and probably broader Lorentzian components at larger Q values, which was compatible with a small-angle jump mechanism. Anion reorientational jump correlation frequencies derived from the QENS spectral broadening (panel b of FIG. 18), were in agreement with Arrhenius dependence observed for pristine $Na_2B_{12}H_{12}$ above its phase transition at higher temperatures. Combined data yielded an activation energy for reorientation of 270(3) meV, the same value obtained for pristine bcc $Na_2B_{12}H_{12}$ from NMR measurements. FIG. 18 shows neutron fixed-window scans (HFBS, neutron momentum transfer Q=1.51 Å$^{-1}$) for $Na_2B_{12}H_{12}$ before (red) and after (blue) ball-milling for 72 h. The inset of FIG. 18 shows QENS spectrum (348 K, Q=1.51 Å$^{-1}$) with Lorentzian broadening (green) due to rapid anion reorientational motions (~3×10$^9$ jumps s$^{-1}$) for the ball-milled material; (b) Arrhenius plot of the jump correlation frequency $(\tau_1^{-1})$ vs. T$^{-1}$ determined for ball-milled $Na_2B_{12}H_{12}$ (blue symbols) compared to $\tau_1^{-1}$ values for pristine $Na_2B_{12}H_{12}$. Squares and circles denoted measurements on DCS and HFBS instruments, respectively. All data points fit to a single line with a preexponential factor of 2.2(2)×10$^{13}$ s$^{-1}$ and an activation energy for reorientation $E_a$ (from the $-E_a/k$ slope) of 270(3) meV.

The measured elastic fraction of the total QENS spectrum (i.e., the elastic incoherent structure factor, EISF) at 400 K at 0.84 Å$^{-1}$ (with 11 µeV resolution) was estimated to be ~0.48. Assuming a similar reorientational mechanism as for pristine disordered $Na_2B_{12}H_{12}$, this EISF value is consistent with some small fraction (on the order of 20-25%) of the anions being relatively immobile in an ordered monoclinic phase at this temperature. Moreover the further decrease in the FWS in panel a of FIG. 18 upon heating above ~340 K indicates that this remaining "immobile" phase fraction converts to the superionic phase over a broad temperature range until its completion above 500 K. This transitioning fraction is reversible, as evidenced by the observed hysteretic FWS cooling behavior.

Since XRD results imply a much higher fraction of ordered phase, a significant fraction present of disordered amorphous or nanocrystalline phase was invisible to diffraction, or there were substantial contributions from "mobile" anions associated with a highly defective monoclinic phase. This was consistent with the NPD patterns for ball-milled $Na_2B_{12}H_{12}$ after the QENS measurements (see FIG. 16), which showed a further increase in the crystalline bcc fraction, presumably from a slow coalescence of residual amorphous or nanocrystalline material during the (520 K maximum) FWS measurements. In addition, XRD patterns measured at elevated temperatures of 373 K and 438 K (not shown) indicated increasing fractions of bcc phase consistent with the reversible, temperature-dependent transformation of the immobile fraction seen in panel a of FIG. 18. Even annealing at 620 K for 13 d led to a further increase in the apparent room-T fraction of bcc phase (see FIG. 15). One might speculate that minute fractions of the anions may be changing by both ball-milling and such elevated temperatures (e.g., by polymerization or degradation of the cage-like structure) and somehow act as morphology-stabilizing defects.

Figure 21:
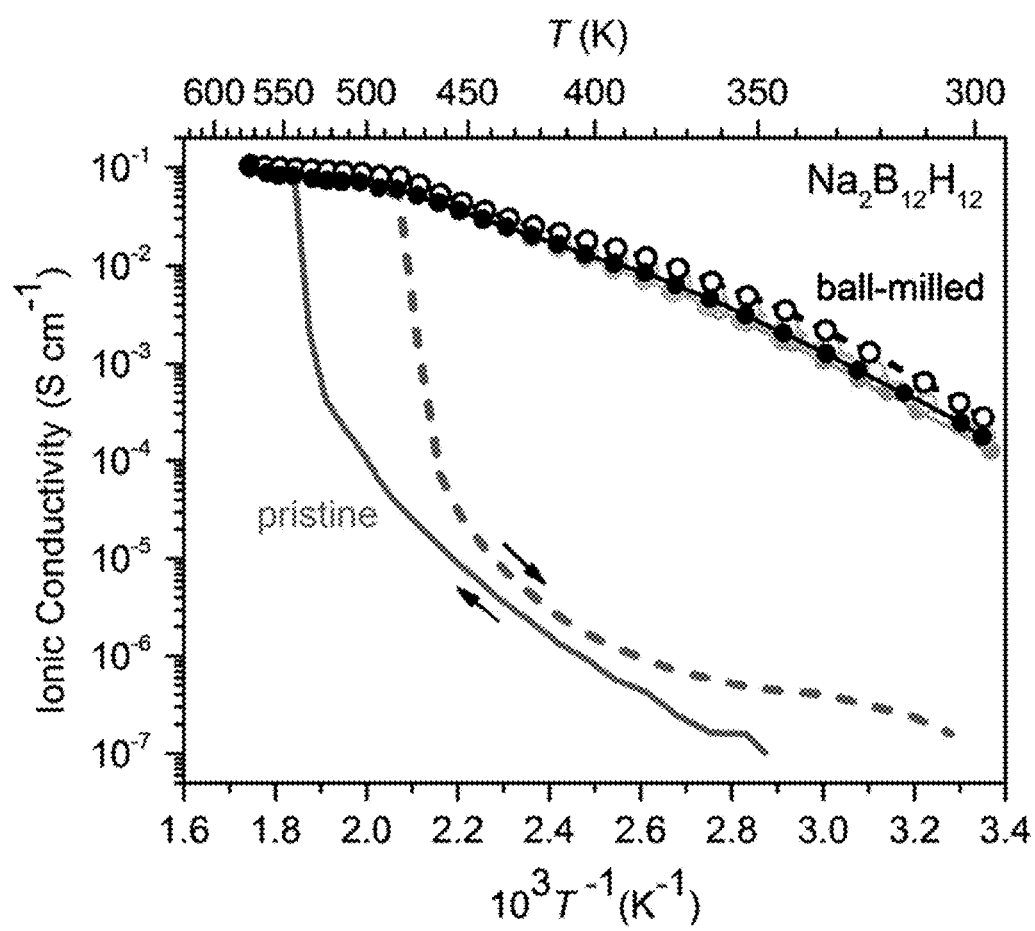
FIG. 21 shows ionic conductivity versus inverse temperature.
Figure 22:
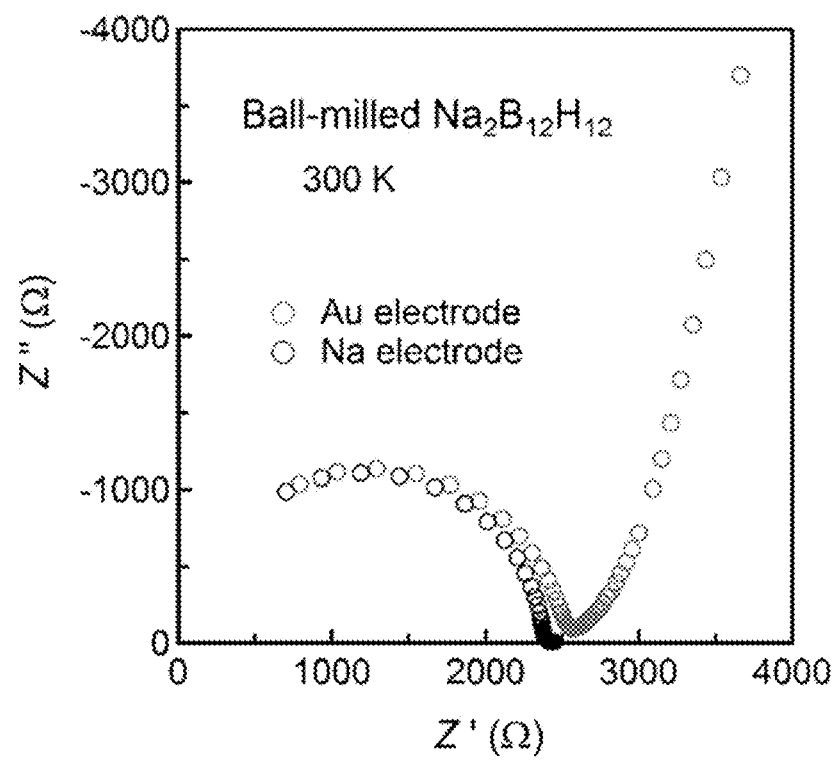
FIG. 22 shows graphs of complex impedance.
Figure 22:
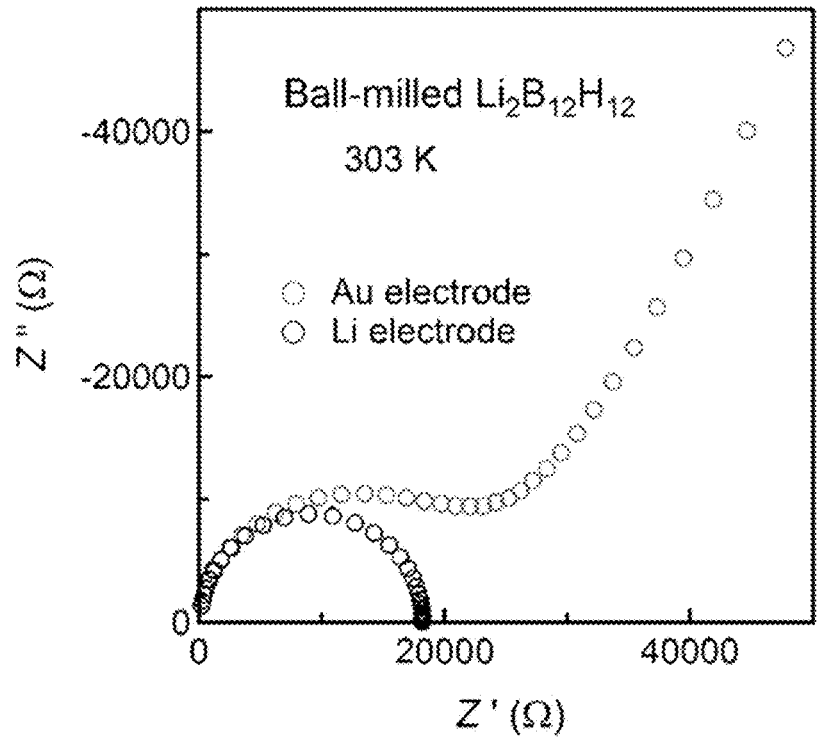
Figure 23:
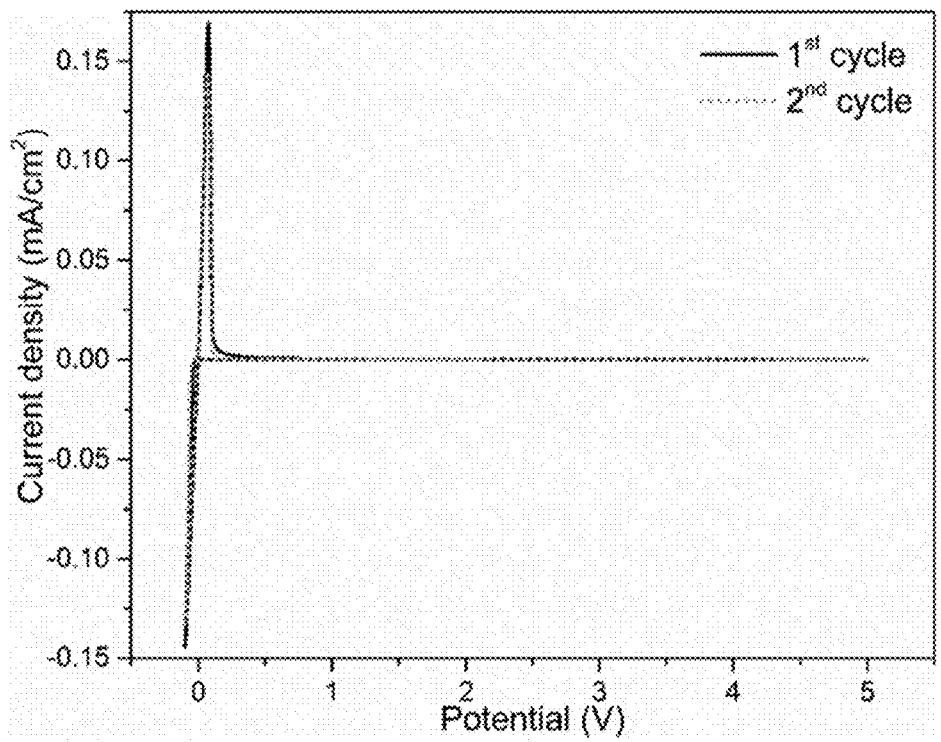
FIG. 23 shows a graph of current density versus potential.

FIG. 21 compares the ionic conductivities of $Na_2B_{12}H_{12}$ pre- and post-ball-milling. FIG. 22 and FIG. 23 display the corresponding complex impedance and cyclic voltammetry plots of the ball-milled material. The post-ball-milling conductivities were evaluated after performing the QENS (FIG. 18) and NPD (FIG. 16) measurements. The limited degree of ball-milling led to four-orders-of-magnitude conductivity enhancement compared with pristine $Na_2B_{12}H_{12}$ below its $T_{trans}$ (and similar superionic conductivities above $T_{trans}$). The conduction activation energy is 0.21 eV for the pure superionic phase above ~480 K. Below this temperature, with respect to the ball-milled sample, the conductivity dropped more rapidly with decreasing temperature, indicating that the activation energy was qualitatively larger in this mixed-phase region due to higher-barrier bottlenecks associated with the changing T-dependent fraction of ordered phase present.

FIG. 21 shows comparison of ionic conductivities for to document, pristine vs. ball-milled $Na_2B_{12}H_{12}$ after QENS measurements (see corresponding NPD patterns in FIG. 16). Closed and open symbols denote heating and cooling values, respectively. 1st, 2nd, and 3rd cycles: light grey, ($\leq$373 K), grey (<423 K), and dark grey (<573 K) symbols, respectively.

FIG. 22 shows data from AC impedance/cyclic voltammetry measurements that includes symmetric-cell complex-impedance plots for ball-milled $Na_2B_{12}H_{12}$ and $Li_2B_{12}H_{12}$. The electrodes were mechanically fixed onto both pellet faces. The Na-symmetric-cell spectrum for ball-milled $Na_2B_{12}H_{12}$ consists of only a semi-circle due to contributions from the bulk and grain boundaries. On the other hand, for an Au-symmetric cell, a spike appears after the semi-circle in the low-frequency region caused by the electrode contribution. Similar behavior is observed for ball-milled $Li_2B_{12}H_{12}$ upon comparison of Li-symmetric and Au-symmetric cells.

FIG. 23 shows data for cyclic voltammetry (at 5 mV/s) for ball-milled $Na_2B_{12}H_{12}$ sandwiched by Na and Mo electrodes at 303 K using a potentiostat/galvanostat (Princeton VersaSTAT4). Reversible Na deposition/stripping was observed nearly at 0 V, and no irreversible oxidation current appeared up to 5 V.

Figure 24:
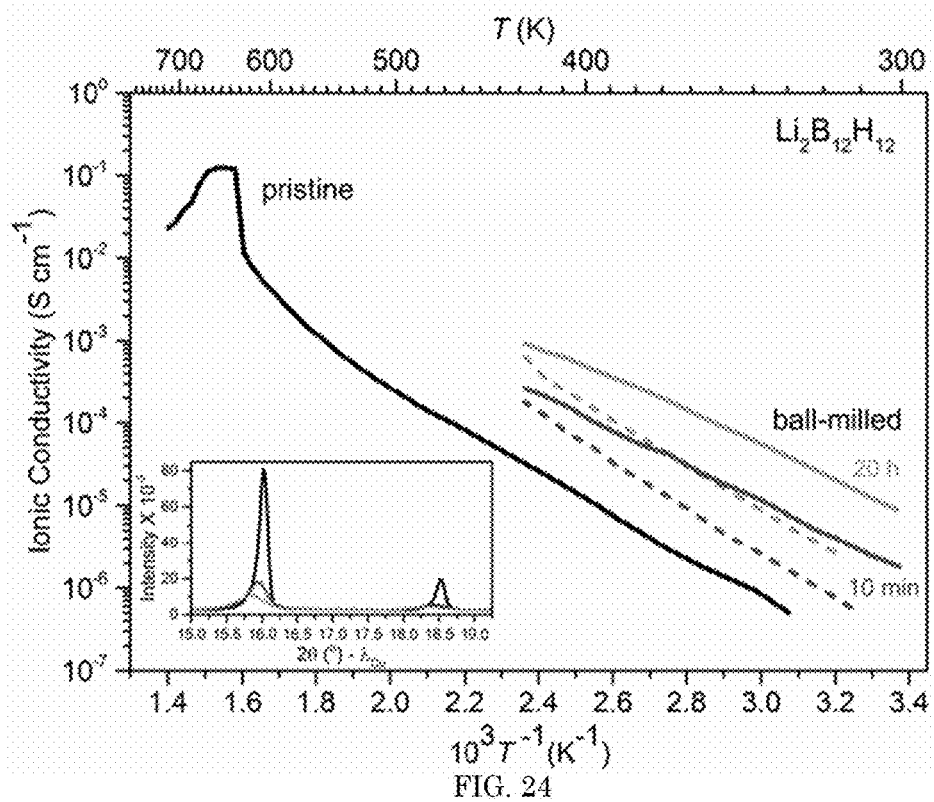
FIG. 24 shows a graph of the ionic conductivity versus inverse temperature.

FIG. 24 exemplifies the ionic conductivity behavior for $Li_2B_{12}H_{12}$ as a function of ball-milling time (i.e., disordered phase fraction), and FIG. 22 displays the related complex impedance plot. Ball-milling dramatically enhances conductivity, and, indeed, more extensive ball-milling leads to further improvement. FIG. 24 shows comparative ionic conductivity plots for $Li_2B_{12}H_2$ vs. 1/T before (black) and after ball-milling for 10 min (dark grey) and 20 h (grey). This is a different $Li_2B_{12}H_{12}$ sample than shown in FIG. 10; corresponding XRD patterns in the inset again show evidence of increasing fraction of disordered phase with increasing ball-milling time, as in FIG. 10). Solid lines denote the $1^{st}$ heating runs. Dashed lines denote the $4^{th}$ heating runs. Conductivities increase with ball-milling time. Reduced conductivities after repeated cycling to 413 K reflect the slow reversion back towards the original sample morphology. The conductivity decay of the pristine sample with increasing temperature above the 618 K order-disorder phase transition reflects the expected decomposition of the material at these temperatures. It is evident that the initial 10 min of ball-milling already generates enough superionic phase to increase the conductivity by an order of magnitude.

From the XRD, QENS, and AC impedance measurements, ball-milling these materials leads to room-T (and sub-room-T) stabilization of high-T-like disordered phases that exist in the untreated bulk materials at more elevated temperatures above the thermally activated transition temperature. Although ball-milling-induced stresses and defects (vacancies, dislocations, stacking faults, grain boundaries, etc.) in the otherwise ordered room-T crystal structures may themselves lead to enhanced cation mobility, the stabilization of high-T-like superionic phases due to crystallite-size reduction into the nanoscale regime cannot be ignored. The atoms in any crystallite surface layer will reconstruct in such a way as to minimize the crystallite surface energy, which can often lead to non-bulk-like thermodynamic behavior for nanoscale crystallites, such as the adoption of a normally higher-T crystal structure or a decrease in $T_{trans}$. Although larger crystallites are dominated by their interior "bulk-like" region, the higher fraction of overall material associated with the surface of a polyhedral borate nanoparticle (which exhibits a large surface-to-bulk ratio as well as non-bulk-like finite-size effects) may translate into a higher fraction or complete stabilization of high-T-like disordered phase, if this phase has a lower surface energy. Compression of these powder materials would lead to a dense interconnecting conductive network of nanoparticles, allowing the cations to percolate through a continuum of facile pathways, even if these pathways are restricted to superionic nanoparticle surface layers surrounding more poorly conducting yet isolated crystallite interiors.

Here, pristine lithium and sodium salts (i.e., primary salts) with large polyhedral anion architectures formed superionic conducting salts with disordered phases and superionic conductivities. These results provide for stabilizing these superionic phases at room temperature and below. Crystallite-size-reduction processes such as ball-milling open the door for exploring further other possible superionic-phase-forming compounds based on this class of salts, including other cation substituents besides $Li^+$ and $Na^+$ and other related polyhedral anion substituents besides $B_{12}H_{12}^{2-}$, $B_{10}H_{10}^{2-}$, and $CB_{11}H_{12}^-$, regardless of their $T_{trans}$ values. Moreover, new "alloy" compounds resulted from ball-milling mixtures of these salts. Nanosizing can also be accomplished in combination by micronizing procedures such as spray drying or nanosequestration.

FIG. 19 shows scanning electron microscopy (SEM) images (using the JEOL JSM6009) of (a) pristine $Na_2B_{12}H_{12}$ (primary salt), (b) and (c) 72 h ball-milled $Na_2B_{12}H_{12}$ (superionic conducting salt), (d) pristine $Li_2B_{12}H_{12}$ (primary salt), and (e) and (f) 20 h ball-milled $Li_2B_{12}H_{12}$ (superionic conducting salt) from FIG. 24. After ball-milling, the particle size decreases to a few microns from 100-200 μm, and agglomeration occurs, as is often characteristic for the method.

Figure 20:
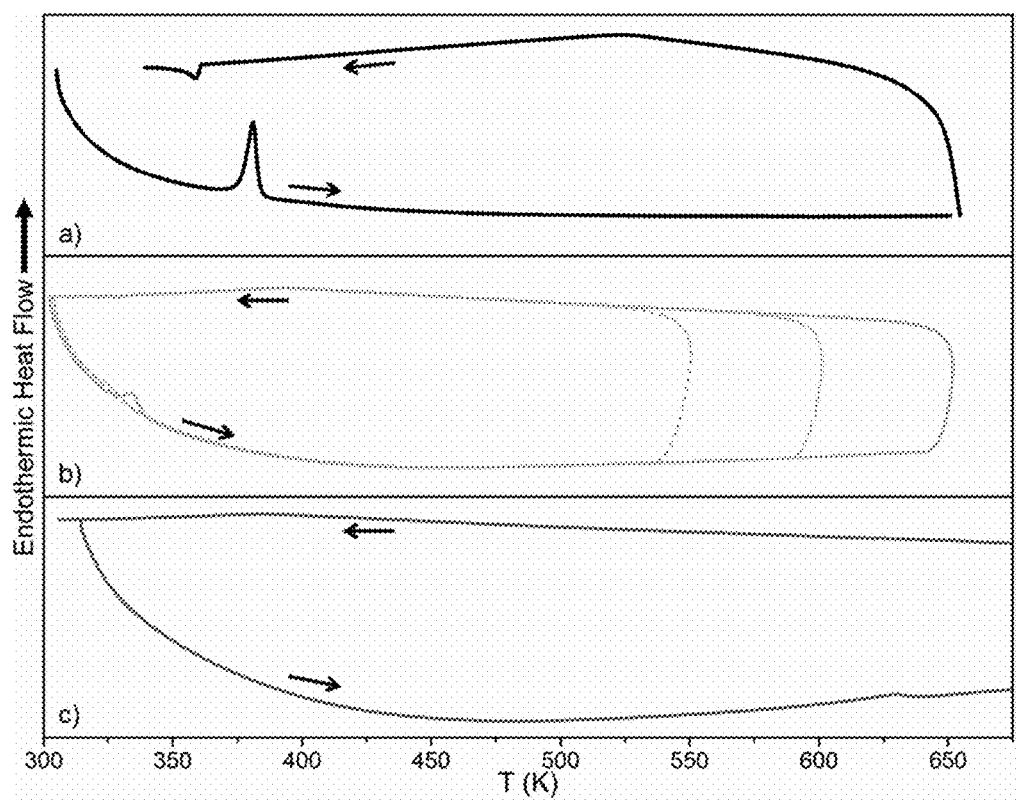
FIG. 20 shows a graph of endothermic heat flow versus temperature.

FIG. 20 shows differential scanning calorimetry (DSC) measurements for (a) pristine $Na_2B_{10}H_{10}$ (primary salt), (b) a 1:1 $Na_2B_{10}H_{10}$:$Na_2CO_3$ mixture ball-milled (to produce superionic conducting salt) for 28 h (first cycle up to 550 K, dashed line; second cycle up to 600 K, dotted line; third cycle up to 650 K, solid line) and (c) pristine $Na_2CO_3$ (secondary salt). Measurements were made with a Netzsch (STA 449 F1 Jupiter) TGA-DSC under He flow with Al sample pans. Heating rates were 5 K min$^{-1}$; cooling rates below 375 K were less than 2 K min$^{-1}$. There is no order-disorder phase transition evident for the ball-milled mixture during the first 550 K cycle. The second (600 K) cycle shows the emergence of a transition peak, which shifts upward and narrows during the third cycle (650 K). The appearance of the transition peak with increasing maximum cycle temperature is presumably due to increased particle sizes and reduced defects through accelerated sintering of this material. Even so, the resulting $T_{trans}$ values after annealing the ball-milled mixture are still much lower than for pristine $Na_2B_{10}H_{10}$.

Comparative Example A: Thermally Activated Transition Temperature of Boranes

Figure 25:
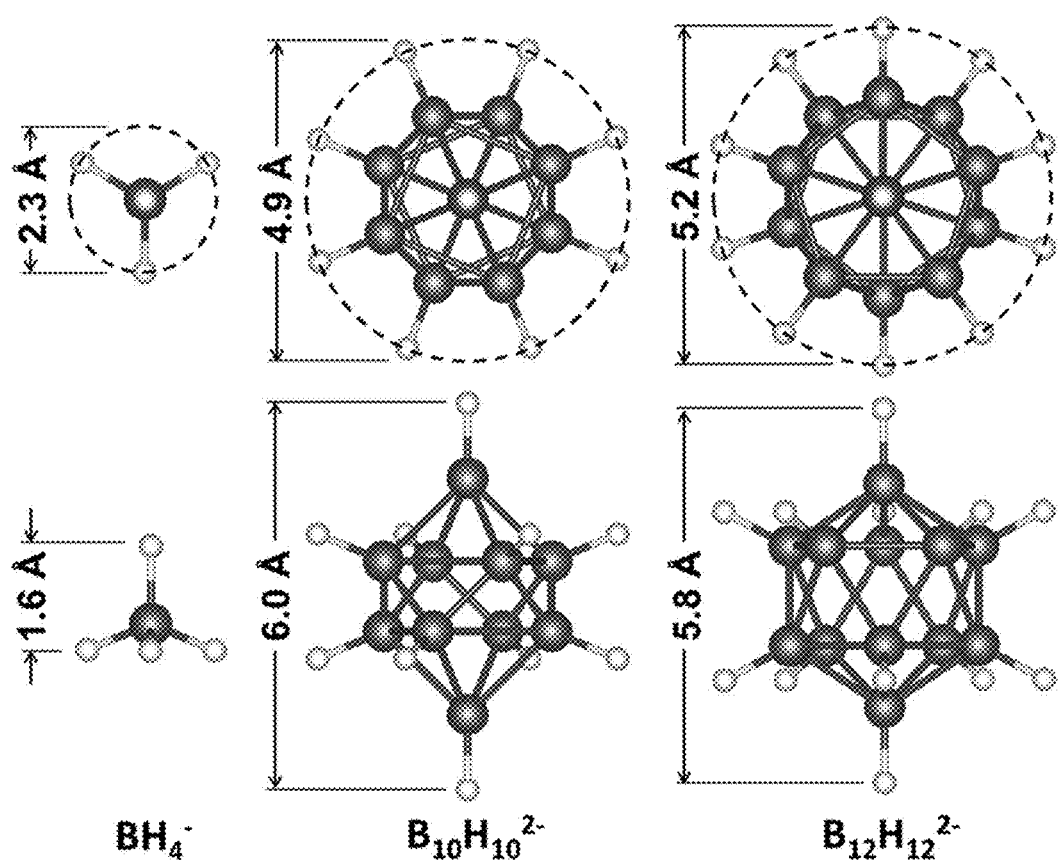
FIG. 25 shows structures of anions.

Complex hydride salts (e.g., primary salts) undergoing to document, solid-state, entropy-driven, order-disorder transitions exhibit fast-ion conduction properties as a result of the appearance of vacancy-rich cation sublattices within networks of highly mobile, reorientationally disordered, polyanions. Such compounds include light-metal Li and Na primary salts possessing icosahedral dodecahydro-closo-dodecaborate ($B_{12}H_{12}^{2-}$) anions (see FIG. 25) that undergo order-disorder phase transitions upon heating and $Na_2B_{12}H_{12}$ exhibiting disorder-induced superionic conductivity (approaching 0.1 S cm$^{-1}$) above around 480 K. This conductivity rivals that of traditional ceramic materials, Na β"-alumina solid electrolyte (BASE), and Na Superionic Conductor (NASICON), as well as more recent $Na_3PS_4$-based glass ceramic electrolytes, all currently of considerable interest for use in Na-ion batteries. The pronounced superionicity and relatively low conduction barrier for disordered $Na_2B_{12}H_{12}$ are probably due, in part, to the larger size (and roughly spherical shape) of the $B_{12}H_{12}^{2-}$ anions compared to the substantially smaller $BH_4^-$ anions (see FIG. 25) present in other investigated fast-ion conductors. These types of large polyanion primary salts represent a potentially fertile area for discovering new materials with superionic conductivities, but still exhibiting thermally activated transition temperatures for superionic conductivity. Sodium decahydro-closo-decaborate ($Na_2B_{10}H_{10}$), a sodium primary salt containing large, ellipsoidal-shaped, $B_{10}H_{10}^{2-}$ anions (see FIG. 25), formed a disordered, face-centered-cubic (fcc) phase above ~360 K, possessing a vacancy-rich Na$^+$ cation sublattice. This cation sublattice was highly mobile within the spacious corridors formed by the large $B_{10}H_{10}^{2-}$ anions and exhibited remarkable superionic conductivity (e.g., σ≈0.01 S cm$^{-1}$ at 383 K). In particular, FIG. 25 shows geometries and approximate relative sizes of $BH_4^-$, $B_{10}H_{10}^{2-}$, and $B_{12}H_{12}^{2-}$ anions, each shown from top and side views. Boron and hydrogen atoms are denoted by grey and light grey spheres, respectively.

$^{11}$Boron-enriched $Na_2^{11}B_{10}H_{10}$ (and partially deuterated $Na_2^{11}B_{10}H_{10}$) was synthesized as follows. The triethylammonium salt $(Et_3NH)_2[^{11}B_{10}H_{10}]$ was synthesized via reaction of $^{11}B_{10}H_{14}$ (Katchem) and triethylamine in para-xylene at reflux. The crude product was recrystallized from water/EtOH and dried in vacuum (10 mTorr) at room temperature for 16 h. The $(Et_3NH)_2[^{11}B_{10}H_{10}]$ was converted into the corresponding acid $(H_3O)_2[^{11}B_{10}H_{10}]$ by ion exchange using an Amberlite resin in H$^+$-form. Aqueous $Na_2^{11}B_{10}H_{10}$ was prepared by neutralization of $(H_3O)_2[^{11}B_{10}H_{10}]$ with 0.1 M NaOH until a pH value of 7 was reached. The solvent was removed on a rotary evaporator at 323 K. Unlabeled $Na_2B_{10}H_{10}$ was synthesized using a similar approach. The resulting hydrated materials were dried under vacuum at 433 K for 16 h. For the partially deuterated sample, a single exchange treatment was performed by dissolution and stirring for 3 h of 1 g $Na_2^{11}B_{10}H_{10}$ in 20 mL $D_2O$ slightly acidified by adding 50 μL of a saturated solution of deuterochloric (DCl) acid in $D_2O$. The resulting dried sample had a D:H ratio of only 27:73 as determined from refinement of the 20 K NPD pattern, yet led to some reduction of the incoherent neutron scattering background from the lighter H isotope.

DSC measurements were made with a Netzsch (STA 449 F1 Jupiter) TGA-DSC under He flow with Al sample pans. The neutron scattering measurements were performed at the National Institute of Standards and Technology Center for Neutron Research. NPD patterns were measured on the BT-1 High-Resolution Powder Diffractometer using the Ge(311) monochromator at a neutron wavelength of 2.077 Å. Horizontal divergences of 60', 20', and 7' of arc were used for the in-pile, monochromatic-beam, and diffracted-beam collimators, respectively. The sample was contained in a 6 mm diameter V can inside a He closed-cycle refrigerator. FWSs were measured on the High-Flux Backscattering Spectrometer using 6.27 Å wavelength neutrons, with a resolution of 0.8 eV FWHM. QENS spectra were collected at 270 K (resolution measurement) and 375 K on the Disk Chopper Spectrometer using 4.08 Å wavelength neutrons with a resolution of 79 μeV FWHM. $^{23}$Na NMR measurements were performed on a pulse spectrometer at a frequency ω/2π=23 MHz. The nuclear spin-lattice relaxation rates were measured using the saturation-recovery method. NMR spectra were recorded by Fourier transforming the solid echo signals. Ionic conductivities were determined in heating and cooling runs repeatedly in the temperature range between 303 K and 423 K by the AC complex impedance method using an NF FRA5097 frequency response analyzer over a frequency range of 10 Hz to 10 MHz. All measurements were performed under Ar. The powder sample was pressed into a pellet of 8 mm in diameter and 2 mm in thickness without sintering. The pellet density was about 1.17 g cm$^{-3}$, which is more than 95% of the density calculated from the lattice parameters. Au or Mo foils were used as electrodes and were mechanically fixed on both faces of the pellet. The resistances of the sample were obtained by least square fittings of a single arc in the high-frequency range using equivalent circuits of a parallel combination of a resistance and a capacitance. At high temperature, since only a spike caused by the electrode contribution was observed, the resistance values were calculated from the intercept of the spike. The cross-section of the pelletized sample was examined by scanning electron microscopy (SEM, JEOL JSM6009). Cyclic voltammetry measurements were conducted at 5 mV s$^{-1}$ scan rates using a potentiostat/galvanostat (Princeton VersaSTAT4) with a Mo disk as the working electrode and counter/reference electrodes of Na or Na—In at 353 K and 393 K, respectively.

Figure 26:
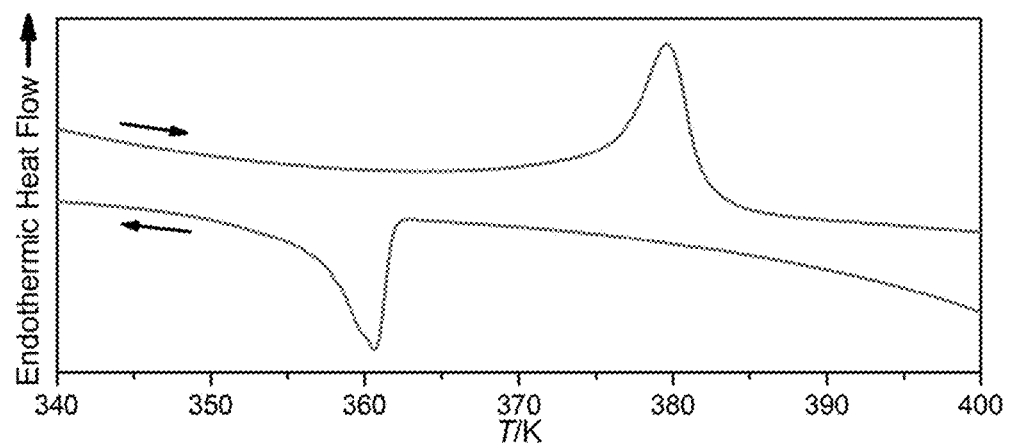
FIG. 26 shows a graph of endothermic heat flow versus temperature.

FIG. 26 shows differential scanning calorimetry (DSC) results for $Na_2B_{10}H_{10}$ after several heating/cooling cycles. A reversible transition with minor hysteresis was observed. After a number of cycles to 500 K, the hysteresis decreased, and the onset temperature stabilized near 360 K upon both heating and cooling. A slow attenuation of the DSC features occurred upon repeated cycling to temperatures near 600 K. In particular, FIG. 26 shows characteristic DSC measurements (2 K min$^{-1}$) for $Na_2B_{10}H_{10}$ after several heating and cooling cycles up to 410 K.

Figure 27:
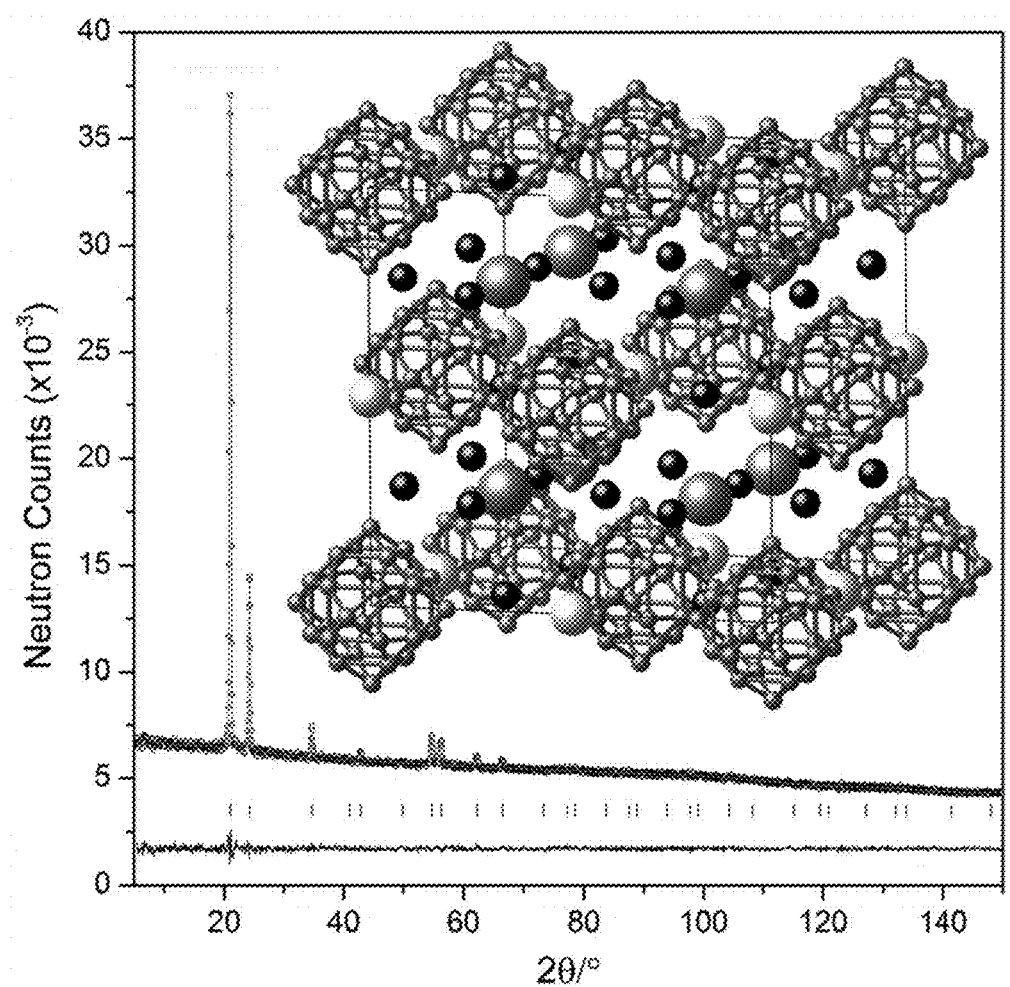
FIG. 27 shows a graph of neutron counts versus angle.

FIG. 27 shows the neutron powder diffraction (NPD) to document, results for a partially deuterated $Na_2^{11}B_{10}H_{10}$ sample at 410 K, above the thermally activated phase transition temperature. The Rietveld-refined model confirmed the transformation from known, low-T ordered, monoclinic structure (not shown) to a high-T disordered structure with Na$^+$ cations partially occupying a variety of interstitial sites within an fcc lattice of orientationally disordered anions. Neutron scattering Fourier difference maps initially suggested the broad distribution of cation positions, and the inclusion of the three most intense positions was ultimately necessary to attain a good model fit to the data. Furthermore, the refinements suggested extensive anion orientational disorder, which could be represented in various ways via multiple B and H positions. The model reflected a simple representation of six approximately superimposed anion orientations, each equally probable. In particular, the six possible-anion orientations are aligned in pairs with their long axes oriented along any one of the three orthogonal crystallographic axes. The members of each pair are azimuthally offset from each other by 45° about their long axes. Each B and H position in the structure is ⅓ occupied, being shared by two of the six possible orientations. In particular, FIG. 27 shows experimental (circles), fitted (line), and difference (lower line) NPD profiles for $Na_2{}^{11}B_{10}(H_{0.73}D_{0.27})_{10}$ at 410K ($\lambda$=2.077 Å; Fm-3m; a=9.8426(8) Å; $R_{wp}$=0.0123; $R_p$=0.0104; X=0.817). Vertical bars indicate the calculated positions of the Bragg peaks. The inset shows a disordered structure. H atoms are omitted for clarity. B atoms are denoted by grey spheres. Anions are centered at 4d (0 0 0). Different $Na^+$ cation positions are denoted by red [tetrahedral (t) sites at 8c (¼ ¼ ¼), yellow [octahedral (o) sites at 4b (½ 0 0)], and blue [intermediate (i) sites at 24d (¼ ¼ 0) between two t sites] spheres. Sphere sizes are proportional to partial occupancies of 0.58(1), 0.28(3), and 0.09(1) for the t, o, and i sites, respectively.

Figure 28:
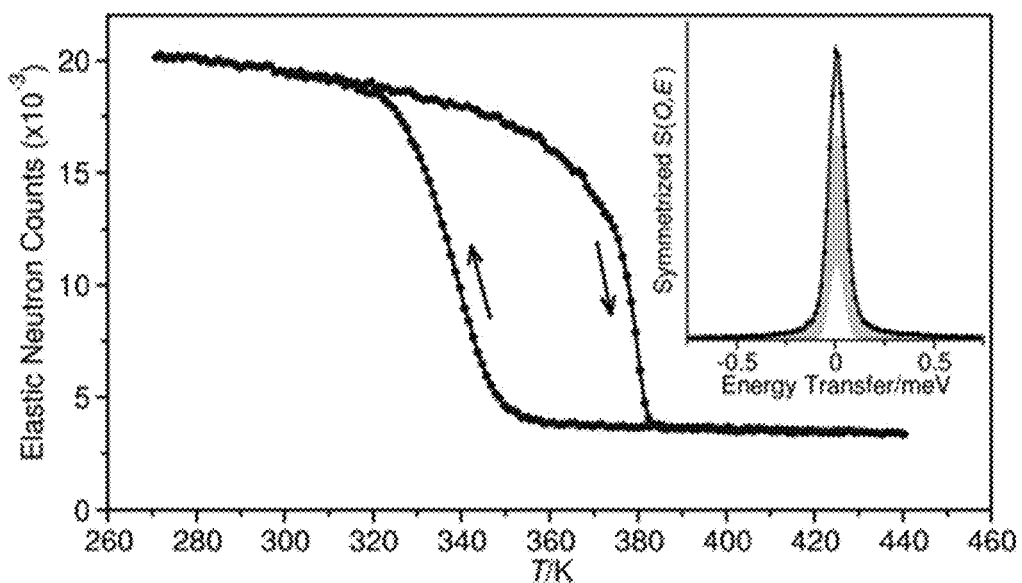
FIG. 28 shows a graph of elastic neutron counts versus temperature.

Anion dynamical behavior was probed by neutron elastic-scattering fixed-window scans (FWSs) of $Na_2{}^{11}B_{10}H_{10}$. The results in FIG. 28 suggest that a dramatic change in $B_{10}H_{10}{}^{2-}$ anion reorientational mobility occurred upon phase transformation. In particular, the high elastic neutron counts in the low-T ordered phase suggested anion reorientational jump frequencies less than $10^8$ $s^{-1}$, whereas the roughly 80% lower counts in the high-T disordered phase suggested an orders-of-magnitude enhancement in jump frequencies to greater than $10^{10}$ $s^{-1}$. This is reminiscent of the FWS behavior observed for $Na_2B_{12}H_{12}$. Indeed, the FIG. 28 inset of a quasielastic neutron scattering (QENS) spectrum for the disordered phase at 375 K indicates a quasielastic component with a Lorentzian linewidth of about 41(1) μeV FWHM, which reflected a jump correlation frequency on the order of $3\times10^{10}$ $s^{-1}$. The ratio of elastic and total scattering intensities (which was also consistent with the ratio of FWS neutron counts in the disordered and ordered phases from FIG. 28) suggested that, besides $B_{10}H_{10}{}^{2-}$ reorientational jumps around the long axis, two-fold anion flips leading to exchanges of apical H atom positions are also occurring. In particular, FIG. 28 shows neutron elastic-scattering fixed-window scan at 0.8 μeV (FWHM) instrumental resolution for $Na_2{}^{11}B_{10}H_{10}$ upon heating and cooling at 0.25 K $min^{-1}$, at a neutron momentum transfer Q of 0.87 $Å^{-1}$. The inset shows a quasielastic scattering spectrum at 375 K at the same Q value, at 79 μeV (FWHM) instrumental resolution. The fit (dark grey) to the data (black) included elastic (light grey) and quasielastic (grey) contributions.

Figure 29:
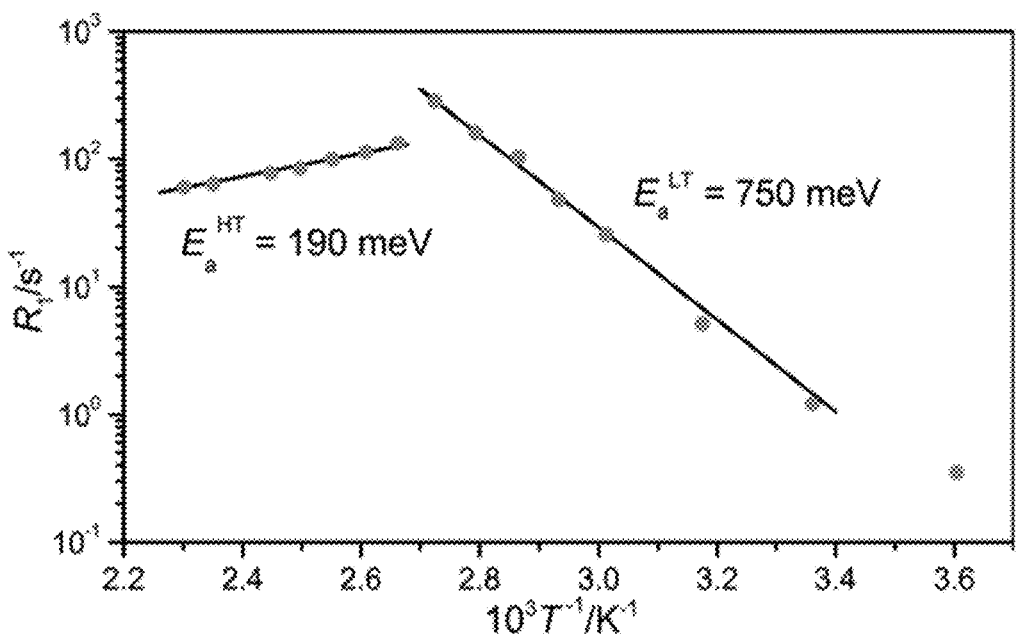
FIG. 29 shows a graph of rate versus inverse temperature.

$Na^+$ dynamical behavior was probed in $Na_2B_{10}H_{10}$ by $^{23}Na$ NMR measurements. FIG. 29 shows the $^{23}Na$ spin-lattice relaxation rate $R_1$ at the resonance frequency $\omega/2\pi$=23 MHz as a function of $T^1$. General features of the behavior of $R_1$ for $Na_2B_{10}H_{10}$ resembled those for $Na_2B_{12}H_{12}$ at the phase transition. Here, $R_1$ exhibited a jump accompanied by the change in sign of its temperature dependence. Such behavior indicated that the transition from the ordered to the disordered phase was accompanied by an abrupt increase in the $Na^+$ jump rate $\tau_d{}^{-1}$. The expected $R_1(T)$ maximum was 'folded'; i.e., because of the abrupt increase in $\tau_d{}^{-1}$ at the phase transition, there was a jump directly from the low-T slope to the high-T slope of the $R_1(T)$ peak. On the low-T slope, $R_1$ was proportional to $\tau_d{}^{-1}$; on the high-T slope, $R_1$ was proportional to $\tau_d$. From the two slopes, we obtained activation energies for $Na^+$ jumps in the ordered and disordered phases of 750(20) meV and 190(10) meV, respectively. The $Na^+$ jump rate exceeded $\omega \approx 1.5\times10^8$ $s^{-1}$ just above the phase transition at the thermally activated transition temperature. Moreover, the small $^{23}Na$ NMR linewidth (0.2 kHz FWHM) observed in the disordered phase confirmed that $Na^+$ cations underwent long-range diffusion. In particular, FIG. 29 shows the $^{23}Na$ spin-lattice relaxation rate $R_1$ versus $T^1$ for $Na_2B_{10}H_{10}$ measured at 23 MHz. Solid lines show the Arrhenius fits to the data for the ordered and disordered phases.

Figure 30:
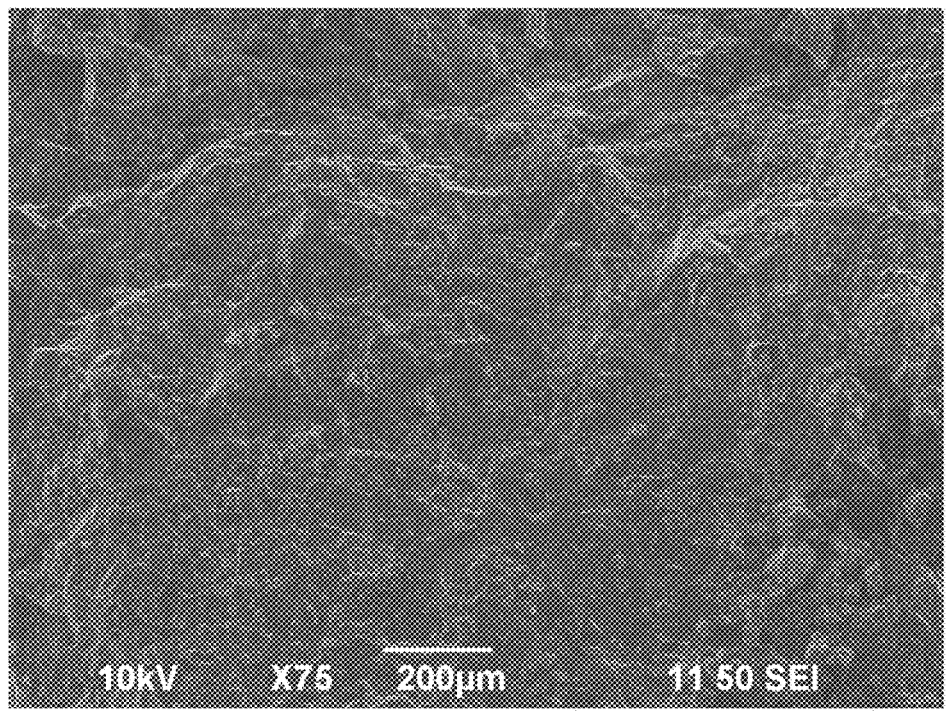
FIG. 30 shows micrographs of a sample.
Figure 30:
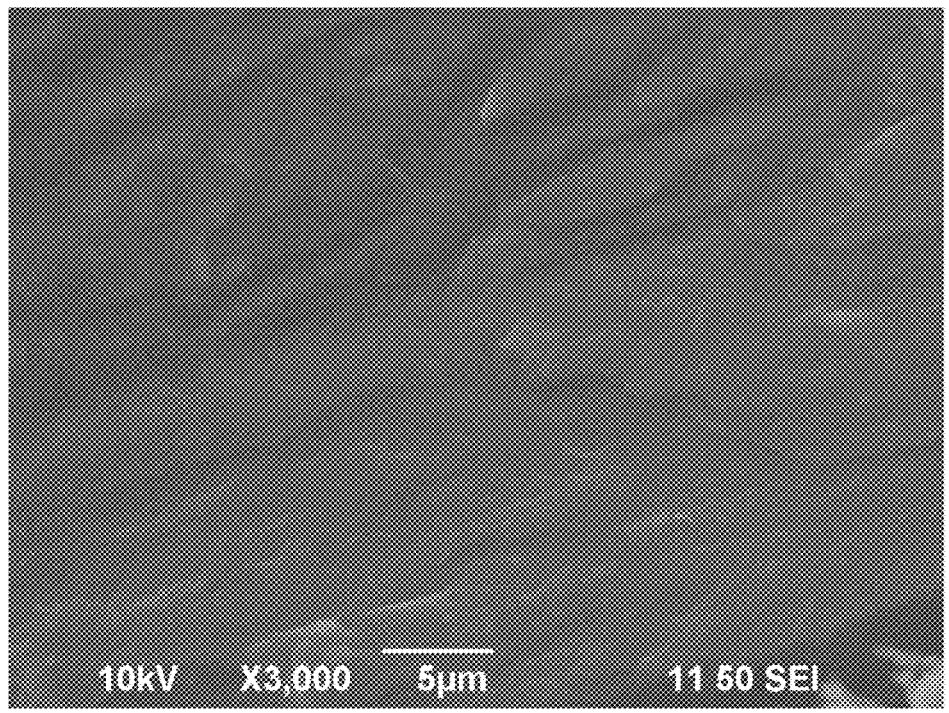
Figure 31:
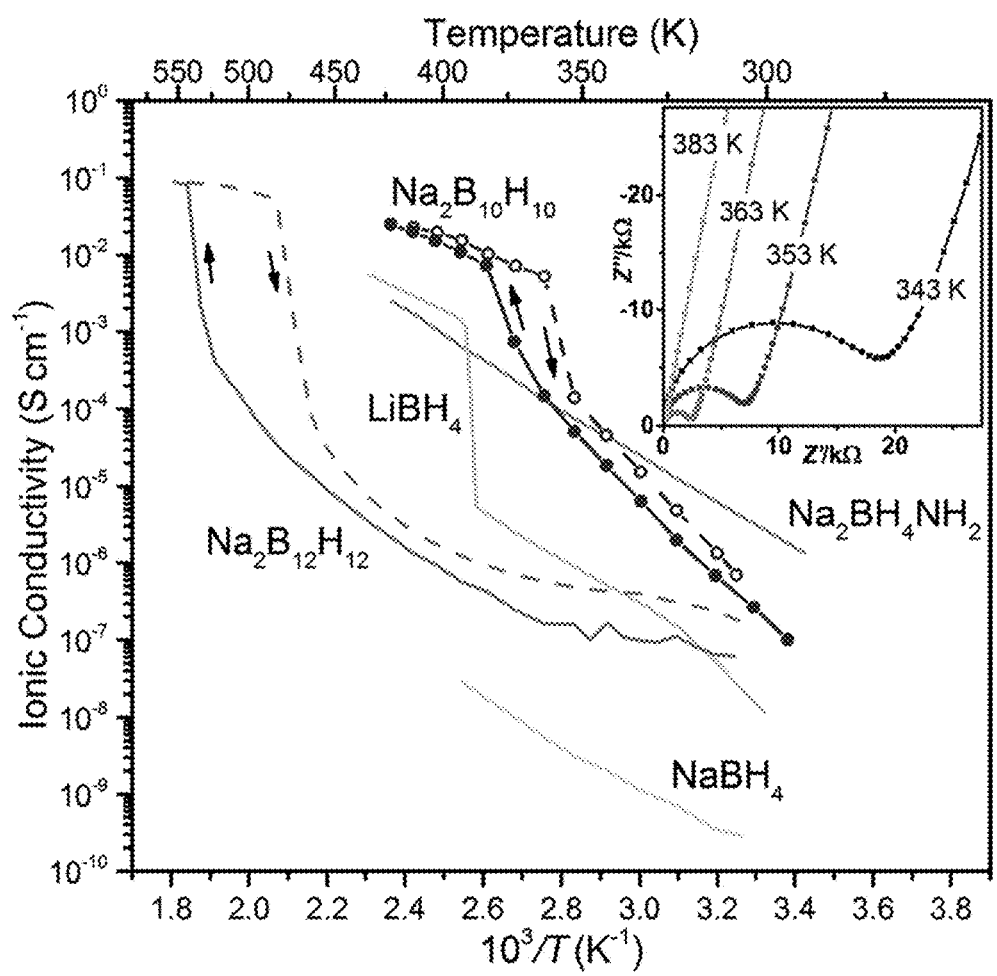
FIG. 31 shows a graph of ionic conductivity versus inverse temperature.

To characterize $Na_2B_{10}H_{10}$ conduction behavior, AC impedance measurements were made from 295 K to 423 K using a pressed disk of polycrystalline $Na_2B_{10}H_{10}$ powder with either gold or (similarly performing) molybdenum foil contacts. Cross-sectional SEM images of the pelletized sample in FIG. 30 of the SI confirmed that intimate contacts among particles were achieved. $Na_2B_{10}H_{10}$ was pelletized without further sintering. The results are shown in FIG. 31 for the gold contacts. The inset shows complex impedance plots at various temperatures. They consist of an arc in the high-frequency region and a spike in the low-frequency region due to contributions from the bulk/grain boundaries and the electrode, respectively. The results suggested that $Na_2B_{10}H_{10}$, similar to $Na_2B_{12}H_{12}$ behaved like an ionic conductor. The temperature dependence of the conductivity indicated dramatic superionic conductivity above the hysteretic order-disorder thermally activated transition temperature near 373 K, rising two orders of magnitude higher than that in the low-T phase. Indeed, the conductivity exhibited a value of about 0.01 S $cm^{-1}$ at 383 K, which was about 25× greater than that of $Na_2BH_4NH_2$ ($4\times10^{-4}$ S $cm^{-1}$). A conductivity above 0.1 S $cm^{-1}$ at 500 K was suggested by extrapolation of the lower-T data. The activation energy for conduction was evaluated to be 0.47 eV. In particular, FIG. 31 shows T-dependent ionic conductivity of $Na_2B_{10}H_{10}$ compared with that for other related materials: $Na_2B_{12}H_{12}$, $Na_2BH_4NH_2$, $NaBH_4$, and $LiBH_4$. The inset shows complex impedance plots of $Na_2B_{10}H_{10}$ measured at various temperatures during heating.

The superionic conductivity of disordered $Na_2B_{10}H_{10}$ above the thermally activated transition temperature is consistent with the relatively small activation energy for $Na^+$ diffusion within the liquid-like cation sublattice. The overly large size and spheroidal shape of the polyanions resulted in less restrictive interstitial pathways and, hence, reduced Na diffusional bottlenecks between the various cation sites within the close-packed anion sublattice.

As for the other disordered complex hydrides, the reorientationally mobile anions associated with superionic $Na_2B_{10}H_{10}$ also lowered the cation diffusional barrier and provided a dynamically cooperative environment for cation jumps within the voids of the anion sublattice. Indeed, at least an order-of-magnitude higher anion reorientational jump rate compared to the $Na^+$ diffusional jump rate provided a dynamic environment where the anions behaved as 'lubricants' for cation diffusive motions.

A comparison of the relative sizes of the $B_{10}H_{10}{}^{2-}$ and $B_{12}H_{12}{}^{2-}$ anions in FIG. 25 indicated a similar maximum dimension for each anion. The lattice constants for the disordered fcc $Na_2B_{10}H_{10}$ and body-centered cubic (bcc) $Na_2B_{12}H_{12}$ structures indicated that both disordered anions possessed similar spherical packing radii of $\approx 3.5$ Å. This made the small 190 meV activation energy for Na$^+$ diffusion in Na$_2$B$_{10}$H$_{10}$ less than half that of Na$_2$B$_{12}$H$_{12}$ (410 meV). Such a difference may be the result of the different natures of the diffusion saddle points inherent within the fcc and bcc structures but may also signal a local geometric advantage that the less spherical B$_{10}$H$_{10}{}^{2-}$ anions have over their more spherical relatives. In particular, within a cubic structure, the more ellipsoidal B$_{10}$H$_{10}{}^{2-}$ anions may occupy less space in directions perpendicular to their long axes than the more spherical B$_{12}$H$_{12}{}^{2-}$ anions. On a local level, this allowed freer space between anions for cation diffusion. The QENS results were consistent with a locally ellipsoidal anion where each anion retained a particular orientation of its long axis over at least a nanosecond timescale.

Figure 32:
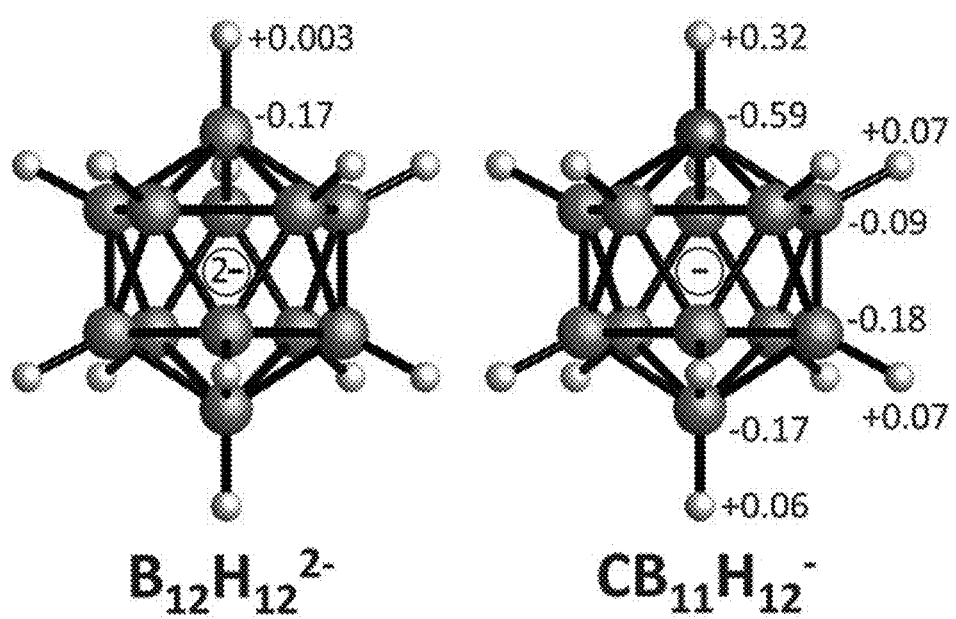
FIG. 32 shows structures of anions.

Comparative Example B: Thermally Activated Transition Temperature of Carboranes FIG. 32 shows relative geometries of the B$_2$H$_{12}{}^{2-}$ and CB$_{11}$H$_{12}{}^-$ anions with boron, carbon, and hydrogen atoms denoted by grey, dark grey, and light grey spheres, respectively. Numbers indicate relative Mulliken charges associated with the structurally distinct atoms of the isolated anions as determined by first-principles calculations.

At room temperature, LiCB$_{11}$H$_{12}$ and NaCB$_{11}$H$_{12}$ exhibited ordered orthorhombic structures. Above the thermally activated transition temperature for forming a superionic conductive disordered state of these salts, the cation-vacancy-rich, disordered cubic phases for both compounds with their high anion orientational mobility exhibited superionic Li$^+$ and Na$^+$ conductivities.

For neutron scattering measurements, aqueous lithium and sodium monocarba-closo-dodecaborates LiCB$_{11}$H$_{12}$ and NaCB$_{11}$H$_{12}$ were each formed by first preparing (H$_3$O)CB$_{11}$H$_{12}$ from trimethylammonium monocarba-closo dodecaborate [(CH$_3$)$_3$NH]CB$_{11}$H$_{12}$ (Katchem) by a procedure described in T. J. Udovic et al, *Adv. Mater.* 26, 7622 (2014), which is incorporated by reference herein in its entirety, then neutralizing the (H$_3$O)CB$_{11}$H$_{12}$ with either 0.1 M $^7$LiOH (Cambridge Isotope Laboratories, 99.9+% $^7$Li) or NaOH until a pH of 7 was reached. Finally, anhydrous LiCB$_{11}$H$_{12}$ and NaCB$_{11}$H$_{12}$ were obtained from these respective aqueous solutions, first using a rotary evaporator at room temperature to form a hydrated solid, followed by dehydration under vacuum at 433 K and 330 K, respectively, for 16 h. Boron-11 enrichment, although also desirable for neutron scattering measurements, was not considered in this study because of the added complication of needing $^{11}$B-enriched starting materials to synthesize the CB$_{11}$H$_{12}{}^-$ anions. Both $^6$Li and $^{10}$B present in natural Li and B were strong neutron absorbers. For all other non-neutron-related measurements, separate batches of LiCB$_{11}$H$_{12}$ with no $^7$Li enrichment and NaCB$_{11}$H$_{12}$ were obtained directly from Katchem.

Both anhydrous compounds were structurally characterized in quartz capillaries by XRPD using a Rigaku Ultima III X-ray diffractometer with a Cu-Kα source (λ=1.5418 Å). Elevated sample temperatures were enabled by a custom-designed, calibrated radiative/convective heat source. Differential scanning calorimetry measurements were made with a Netzsch (STA 449 F1 Jupiter) TGA-DSC under He flow with Al sample pans. Neutron scattering measurements were performed at the National Institute of Standards and Technology Center for Neutron Research. Neutron vibrational spectroscopy (NVS) measurements were performed at 4 K using thin flat-plate sample geometries and scattering in reflection on the Filter-Analyzer Neutron Spectrometer (FANS). The Cu(220) monochromator was used with pre- and post-collimations of 20' of arc, yielding a full-width-at-half-maximum (FWHM) energy resolution of about 3% of the neutron energy transfer. Quasielastic neutron scattering (QENS) measurements were performed using the same sample geometries on the Disc Chopper Spectrometer (DCS), utilizing incident neutrons at 4.1 Å (4.87 meV) with respective resolutions of 87.3 μeV and 184.4 μeV FWHM for NaCB$_{11}$H$_{12}$ and LiCB$_{11}$H$_{12}$. Spectra were collected in reflection over a useful momentum transfer (Q) range of around 1.0 Å$^{-1}$ to 2.88 Å$^{-1}$. The instrument resolution function was determined from QENS spectra at 200 K. The neutron scattering data were analyzed using the DAVE software package. XRPD structural refinements were performed using either GSAS or Fullprof software.

Ionic conductivities were determined in heating and cooling runs repeatedly in the temperature range from room temperature to 433 K for LiCB$_{11}$H$_{12}$ and to 393 K for NaCB$_{11}$H$_{12}$ by the AC complex impedance method with a two-probe technique using a HIOKI 3532-80 chemical impedance meter over a frequency range of 4 Hz to 1 MHz with an input voltage perturbation of 150 mV. All measurements were performed under Ar. The powder sample was pressed into a pellet of 8 mm in diameter and approximately 2.7 mm in thickness without sintering. The pellet densities were about 1.05 g cm$^{-3}$ and 1.13 g cm$^{-3}$, which is more than 94% of the density calculated from the lattice parameters. Li and Au foils were used as electrodes for LiCB$_{11}$H$_{12}$ and NaCB$_{11}$H$_{12}$, respectively, and mechanically fixed onto both faces of the pellet.

LiCB$_{11}$H$_{12}$ was used in preliminary battery tests. TiS$_2$ (99.9%, Sigma-Aldrich), and LiCB$_{11}$H$_{12}$ powders were mixed in a 1:1 mass ratio by an agate mortar in an agate pestle, and then used as a composite positive electrode. 25 mg of LiCB$_{11}$H$_{12}$ and 6 mg of the composite positive electrode powders were separately placed in an 8-mm-diameter die and then uniaxially pressed at 190 MPa. Li foil was used as a negative electrode and placed opposite of the positive electrode. The assembled bulk-type, all-solid-state TiS$_2$/Li battery, namely TiS$_2$|LiCB$_{11}$H$_{12}$|LiCB$_{11}$H$_{12}$|Li, was placed in a stainless-steel electrochemical cell with an 8-mm-diameter Teflon® guide, as schematically shown in A. Unemoto et al., *Appl Phys. Lett.* 105, 083901 (2014), which is incorporated by reference herein in its entirety. Procedures for the battery assemblies were carried out in an Ar-filled glove box. The battery test was carried out at 403 K with a 0.2 C charge rate (C-rate), corresponding to 285 μA cm$^{-2}$, in the voltage range of 1.75 V to 2.6 V using a 580 battery test system (Scribner Associates).

To assist the structural refinements, first-principles calculations were performed within the plane-wave implementation of the generalized gradient approximation to Density Functional Theory (DFT) using a Vanderbilt-type ultrasoft potential with Perdew-Burke-Ernzerhof exchange correlation. A cutoff energy of 544 eV and a 2×2×1 k-point mesh (generated using the Monkhorst-Pack scheme) were used and found to be enough for the total energy to converge within 0.01 meV/atom. For comparison with the NVS measurements, the phonon densities of states (PDOSs) were calculated from the DFT-optimized structures using the supercell method (2×2×1 cell size) with finite displacements. They were weighted to take into account the H, $^7$Li, Na, C, and B total neutron scattering cross sections, appropriately averaged over Q-space, and convoluted with the instrumental resolution. The PDOS of the isolated CB$_{11}$H$_{12}{}^-$ anion was also calculated for comparison, using a 30×30×30 supercell and full C$_{5v}$ molecular symmetry. Mulliken atomic charges (shown in FIG. 32) were determined from these DFT calculations for the isolated $CB_{11}H_{12}^-$ anion as well as from those for the related $B_{12}H_{12}^{2-}$ anion using the same-size supercell and its full $I_h$ molecular symmetry.

Figure 33:
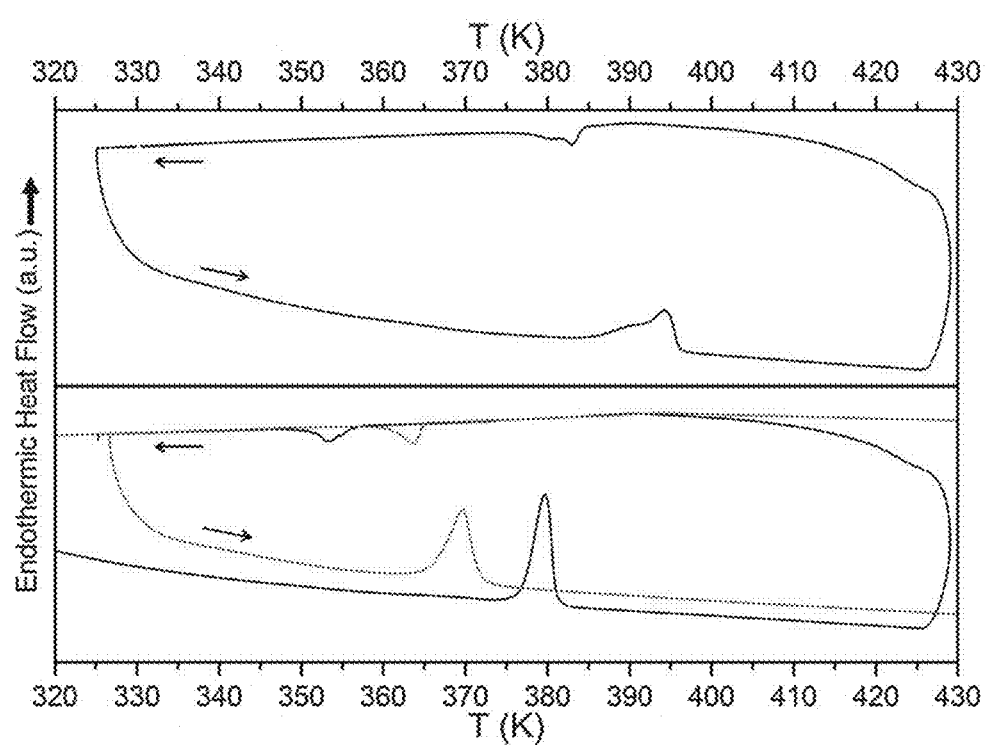
FIG. 33 shows graphs of endothermic he flow versus temperature.

FIG. 33 shows DSC scans for $LiCB_{11}H_{12}$ and $NaCB_{11}H_{12}$, indicating a clear hysteretic phase change based on the respective endothermic (upon heating) and exothermic (upon cooling) enthalpic features. In particular, FIG. 33 shows sequential heating (5 K min$^{-1}$)/cooling (≤2 K min$^{-1}$) DSC scans for (panel a) $LiCB_{11}H_{12}$ and (panel b) $NaCB_{11}H_{12}$ for two different cycles, the red curves measured after previously heating to 733 K. Arrows denote heating and cooling segments. Here, thermally activated transitions occurred roughly near 395 K and 383 K for $LiCB_{11}H_{12}$ and near 380 K and 354 K for $NaCB_{11}H_{12}$. As evidenced for $NaCB_{11}H_{12}$ during a later DSC cycle and for the polyhedral borate salts, these temperatures can vary by more than 10 K depending on the cycling parameters and the maximum temperature employed and seemed to be intimately related to morphological changes that can occur with cycling, such as particle sintering or size reduction.

Figure 34:
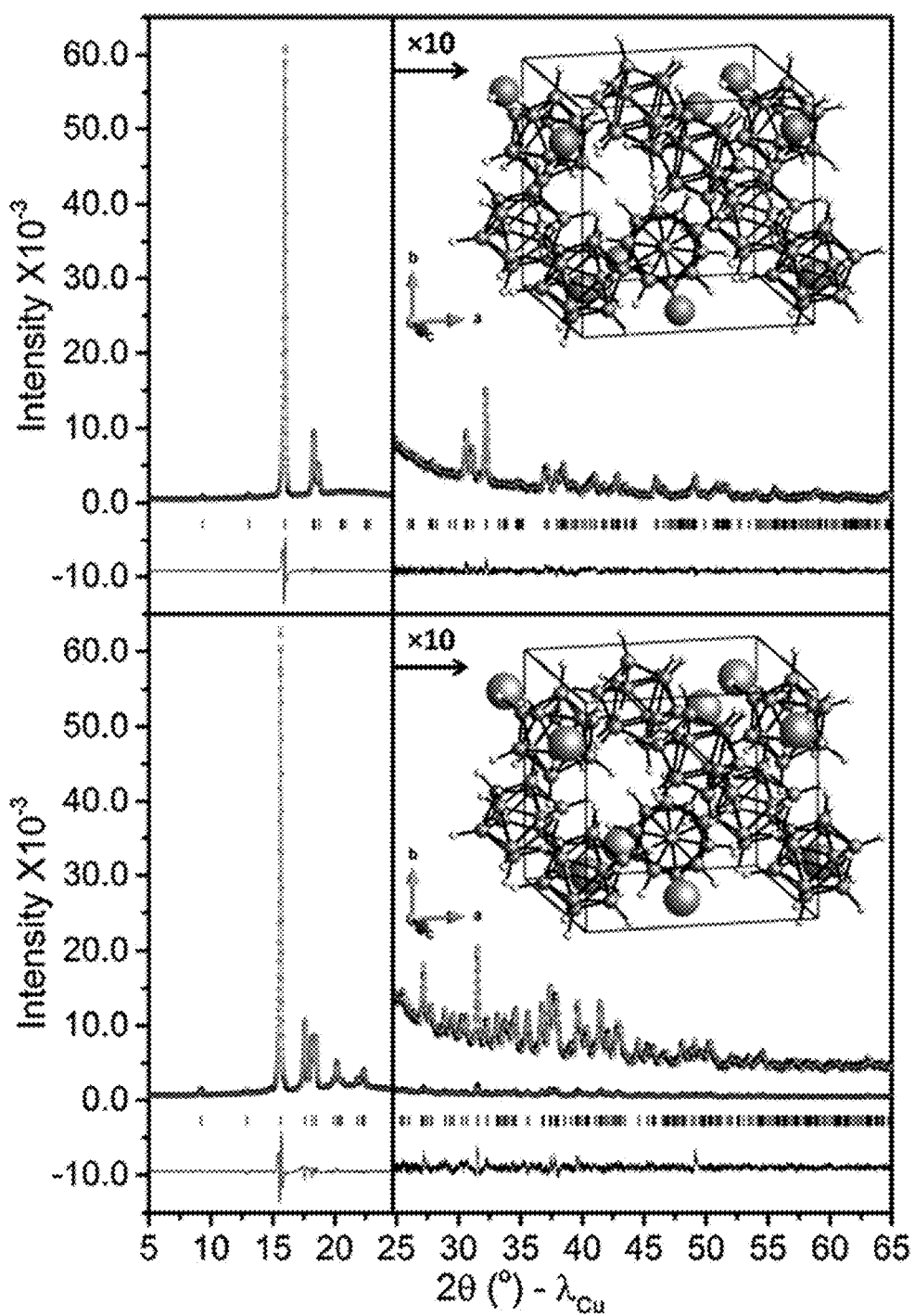
FIG. 34 shows graphs of intensity versus angle.

The room-temperature X-ray powder diffraction (XRPD) patterns and structural model fits for $LiCB_{11}H_{12}$ and $NaCB_{11}H_{12}$ are shown in FIG. 34. In particular, FIG. 34 shows experimental (circles), fitted (line), and difference (line below observed and calculated patterns) XRPD profiles for orthorhombic $LiCB_{11}H_{12}$ (top) and $NaCB_{11}H_{12}$ (bottom) at room temperature (CuKα radiation). Vertical bars indicated the calculated positions of the Bragg peaks, a=9.6668(5) Å, b=9.4892(5) Å and =9.7273(5) Å for $LiCB_{11}H_{12}$; a=9.7821(4) Å, b=9.6254(4) Å, and c=10.0928(4) Å for $NaCB_{11}H_{12}$. Insets depicted the corresponding structures. Darker grey, lighter grey, darkest grey, intermediate grey, and lightest grey spheres denoted Li, Na, C, B, and H atoms, respectively. At room temperature, $LiCB_{11}H_{12}$ and $NaCB_{11}H_{12}$ were indexed to orthorhombic structures. The approximate structural details for each compound were determined using direct space methods under the same most probable space group of $Pca2_1$ (No. 29). DFT calculations were then individually performed to optimize the $CB_{11}H_{12}^-$ rigid-body geometries with respect to the relative C, B, and H positions. Final Rietveld structural refinements of the lattice constants and cation and anion coordinates were performed with DFT-optimized $CB_{11}H_{12}^-$ rigid bodies.

The insets shown in FIG. 34 depicted the similar orthorhombic structures for $LiCB_{11}H_{12}$ and $NaCB_{11}H_{12}$. In both of these ordered structures, the C atoms were not orientationally disordered amongst the various icosahedral vertices. Rather, there was a preferred vertex position for the C atom within the structures. As shown in FIG. 32, although the C atom has a markedly larger negative Mulliken charge than the other B atoms of the $CB_{11}H_{12}^-$ anion, its covalently bonded H atom has a five-fold larger positive Mulliken charge than those for the other B-bonded H atoms. This anomalously large positive charge influenced the lowest-energy orientation established by the anion and the particular crystallographic position of its C atom. As such, it was most energetically favorable for these particular H atoms to maximize their distance from the surrounding cations, as observed experimentally and in DFT calculations.

Figure 35:
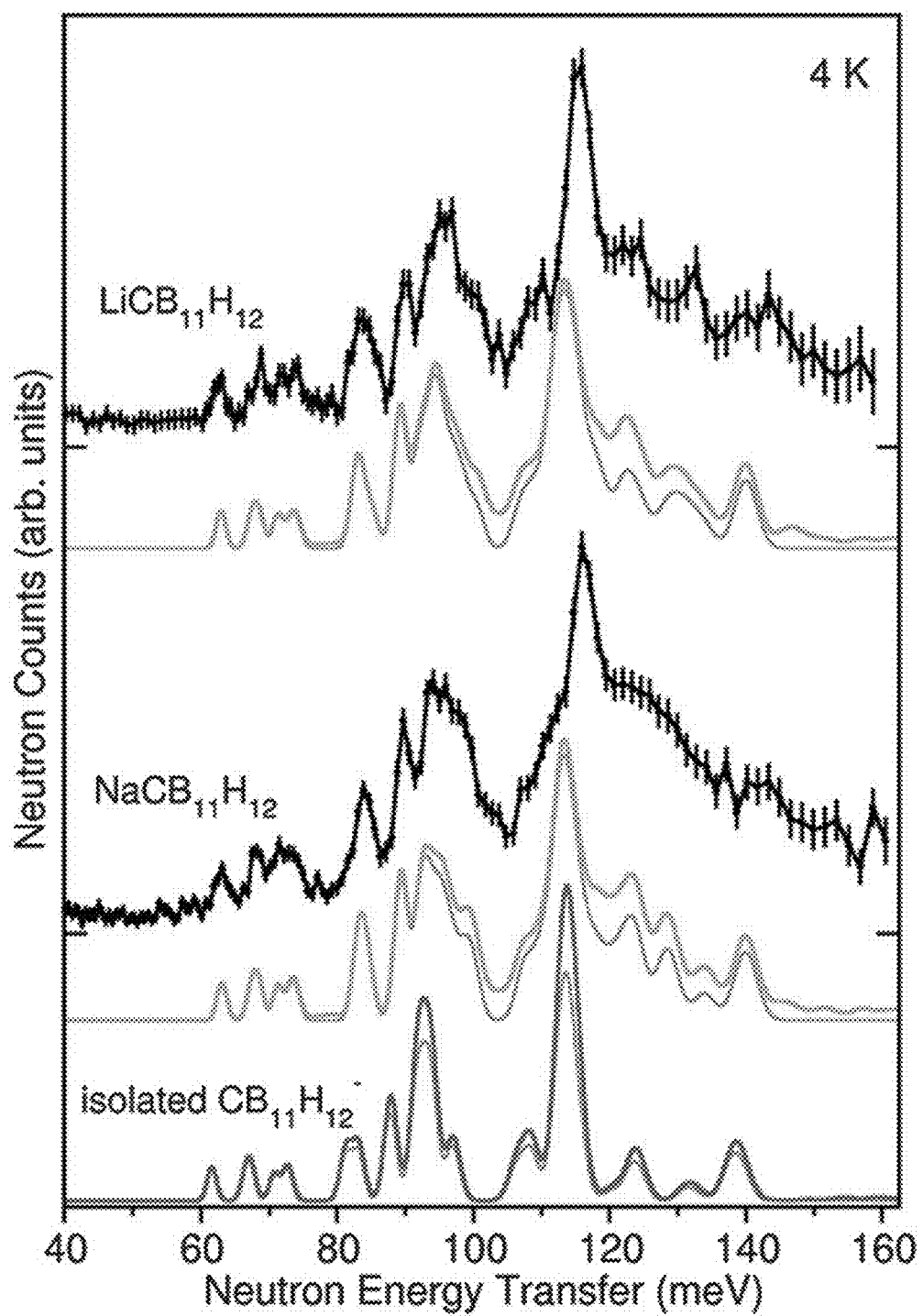
FIG. 35 shows a graph of neutron counts versus neutron energy transfer.

The neutron vibrational spectra for $LiCB_{11}H_{12}$ and $NaCB_{11}H_{12}$ at 4 K are shown in FIG. 35 and are compared with the simulated PDOSs based on the DFT-optimized, XRPD-refined structures as well as that for the isolated $CB_{11}H_{12}^-$ anion. In particular, FIG. 35 shows neutron vibrational spectra (black) of $LiCB_{11}H_{12}$ and $NaCB_{11}H_{12}$ at 4 K compared to the simulated one+two-phonon densities of states from first-principles phonon calculations of the optimized orthorhombic structures (light grey), and the isolated $CB_{11}H_{12}^-$ anion (dark grey). Simulated one-phonon densities of states are depicted in grey. Due to the relatively large neutron scattering cross-section for H atoms compared to Li, Na, C, and B atoms, the spectrum was dominated by the various optical vibrational modes involving H-atom displacements. Hydrogen stretching modes were at higher energies and are outside the measured energy range. The experimental and simulated spectra agreed, which provided verification of the refined structures. As suggested by the simulated PDOS of the isolated $CB_{11}H_{12}^-$ anion in FIG. 35 and borne out by PDOS results for other polyhedral hydroborate salts, the neutron vibrational spectrum was sensitive to the crystal structure arrangement.

Figure 36:
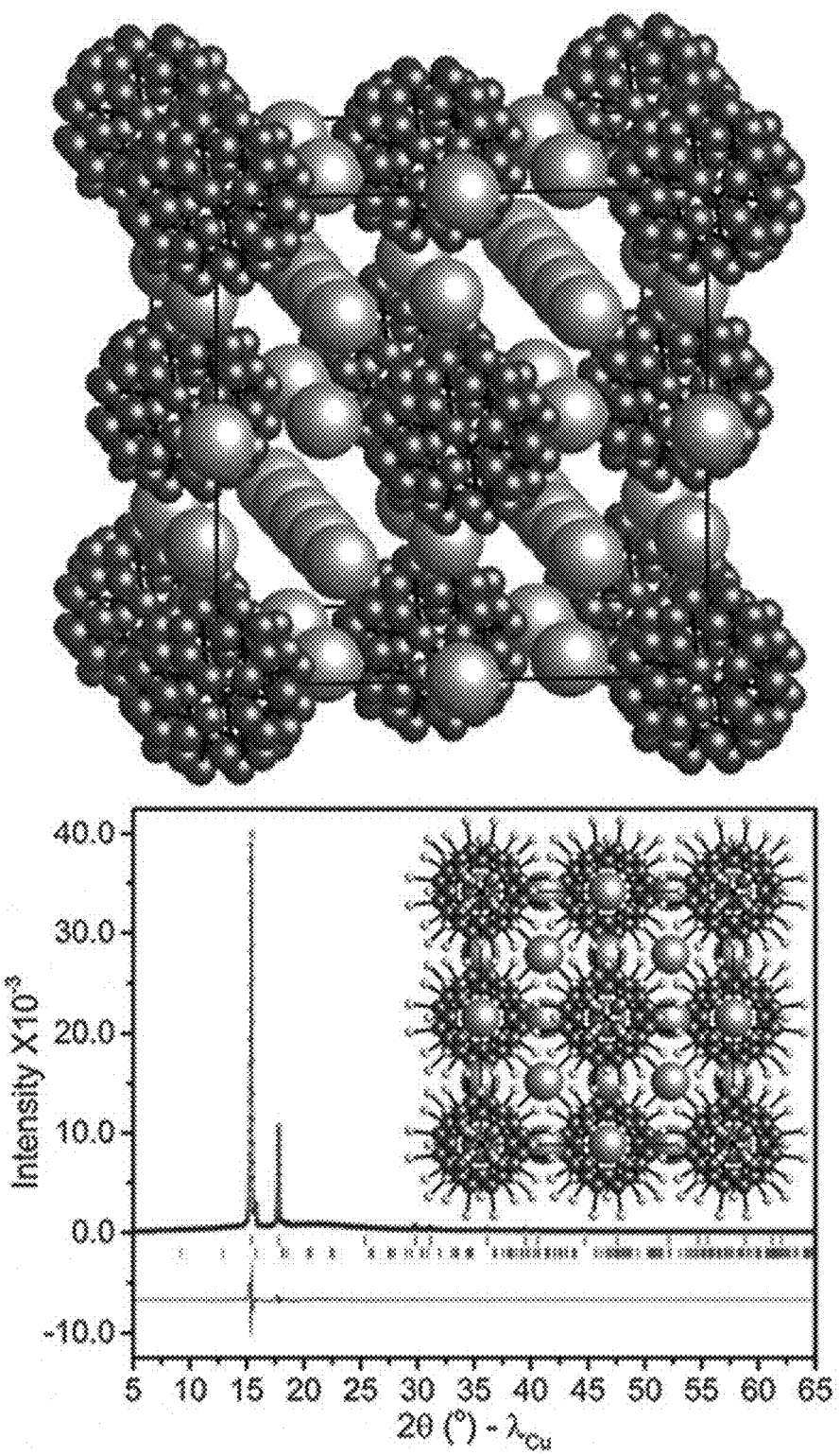
FIG. 36 shows a structure of a salt and a graph of intensity versus angle.
Figure 37:
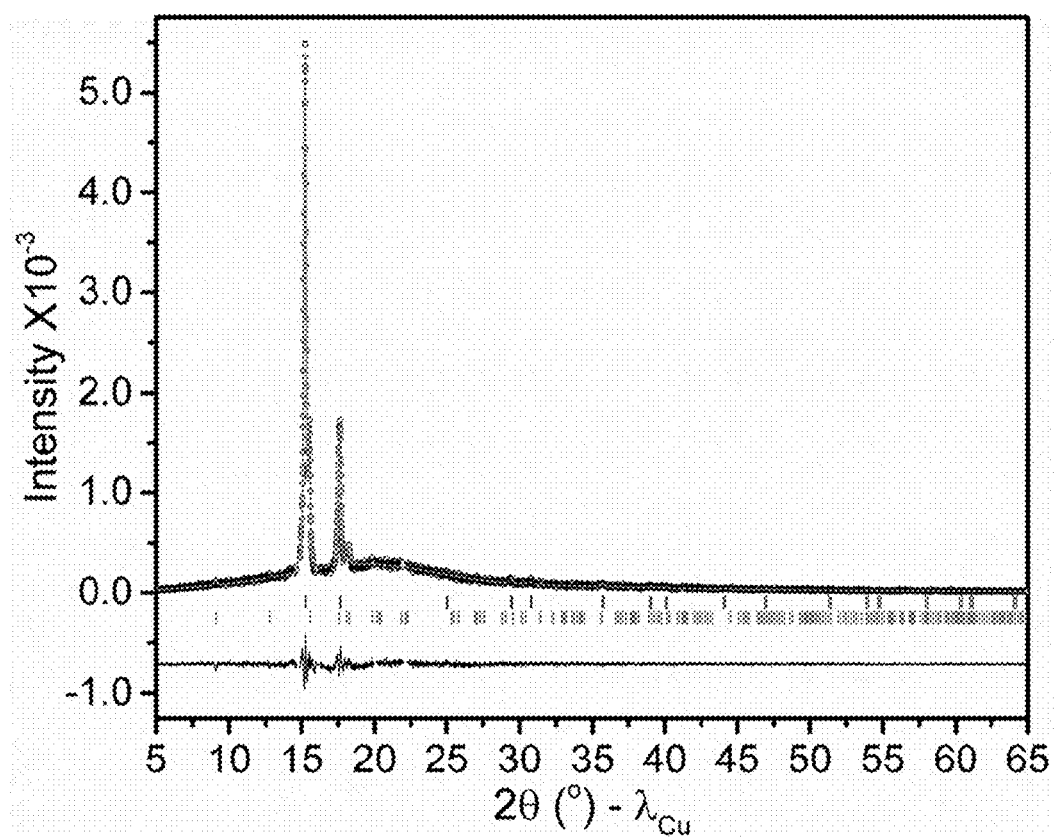
FIG. 37 shows a graph of intensity versus angle.

FIG. 36 shows representative XRPD refinement results to document, for the high-temperature disordered phase of $LiCB_{11}H_{12}$. See FIG. 37 for the $NaCB_{11}H_{12}$ refinement results. Two different schematic views (lower inset and top) illustrate the primary disordered face-centered-cubic (fcc) structure found for both $LiCB_{11}H_{12}$(at 430 K) and $NaCB_{11}H_{12}$(at 356 K). The orientationally disordered anion arrangements provided a network of ample interstitial space with cation vacancies present for facile cation transport. In particular, FIG. 36 shows (bottom) experimental (circles), fitted (line), and difference (line below observed and calculated patterns) XRPD profiles for the high-temperature, disordered, face-centered-cubic (fcc) structure for $LiCB_{11}H_{12}$ at 430 K (CuKα radiation), with a=9.9355(6)Å. Vertical bars indicate the calculated positions of the Bragg peaks (with about 5% orthorhombic phase still present). $NaCB_{11}H_{12}$ at 356 K is isostructural with a=10.066(3) Å. The inset in FIG. 36 shows a schematic view of the disordered structure along a principal axis. Grey, dark grey, and light grey spheres denote Li/Na, C/B, and H atoms, respectively. The top panel of FIG. 36 shows an alternate view without the H atoms, indicating the cation channels. The disordered cation positions reflect locations based on favorable interstitial volumes and previous neutron diffraction results for similarly disordered $Na_2B_{10}H_{10}$. Moreover, multiple distinct B/C and H positions mimicked average, spherically isotropic, anion orientational disorder present in these materials. Also, FIG. 37 shows experimental (circles), fitted (line), and difference (line below observed and calculated patterns) XRPD profiles for $NaCB_{11}H_{12}$ at 356 K (CuKα radiation). Vertical bars indicated the calculated positions of Bragg peaks for the high-temperature fcc (77.8(1) wt. %) and the low-temperature orthorhombic phases (22.2(2) wt. %) of $NaCB_{11}H_{12}$, respectively (from the top). $R_{wp}$=0.0782, $R_p$=0.0678, $X^2$=1.444. The refined lattice parameter of the high-temperature fcc phase were 10.066(3) Å; and a=9.818(3) Å, b=9.712(4) Å, and c=10.101(3) Å for the low-temperature orthorhombic phase. As for $LiCB_{11}H_{12}$ in FIG. 36, the refinement model for the fcc phase ignored the cations and H atoms and employed multiple B/C positions to mimic a spherical shell of B/C scatterers due to the isotropically orientationally disordered anions.

Figure 38:
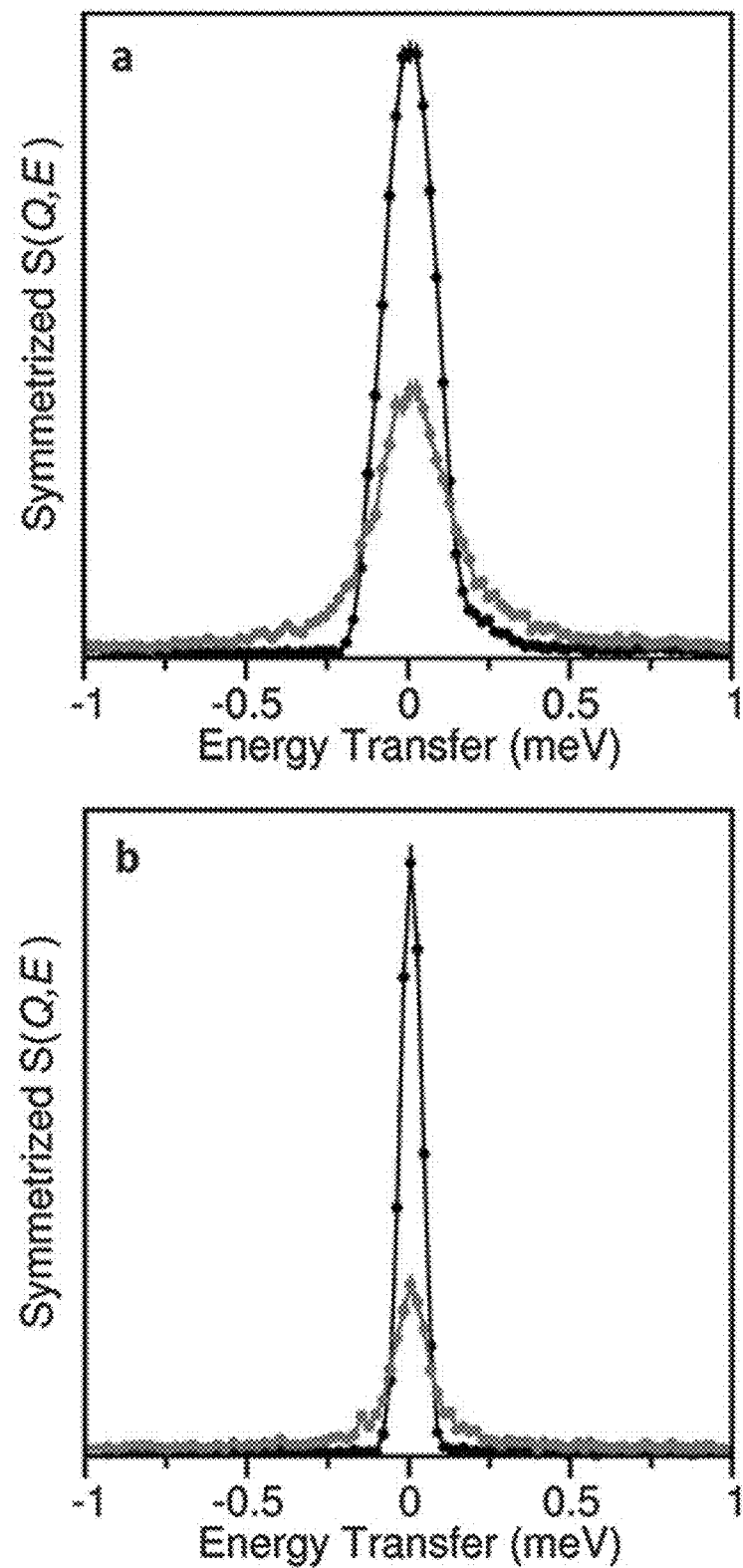
FIG. 38 shows graphs of scattering versus energy transfer.

Preliminary QENS measurements for both $LiCB_{11}H_{12}$ and $NaCB_{11}H_{12}$ confirm the orders of magnitude leaps in anion orientational mobilities to between $10^{10}$ and $10^{11}$ reorientational jumps s$^{-1}$ in the disordered phases, as reflected in FIG. 38 by the transformation from purely resolution-limited elastic component peaks at 200 K to ones with significant quasielastic broadening at 433 K and 375 K, respectively. For both materials, the observed fraction of scattering that is quasielastic above Q=1 Å$^{-1}$ appears to be of the order of 0.8 or more, suggesting that we are observing anion small-angle-jump reorientations akin to that observed for $Na_2B_{12}H_{12}$, which entailed a distribution of individual anion motions ranging from one-axis to multi-axis reorientations. A comparison of a simple one-Lorentzian fit of the broad component for $NaCB_{11}H_{12}$ in panel b of FIG. 38 to that for $Na_2B_{10}H_{10}$ under identical conditions of temperature, Q, and instrumental resolution suggests that reorientational jump frequencies for the $CB_{11}H_{12}^-$ anions may be on the order of 60% higher than those for the $B_{10}H_{10}^{2-}$ anions. $Na_2B_{12}H_{12}$ was not normally in its disordered phase at 375 K and was therefore less straightforward to compare. Of course, this comparison assumed similar reorientational mechanisms. In particular, FIG. 38 shows QENS spectra at $Q=1.35$ Å$^{-1}$ showing the anion-reorientation-induced broadening in red for (panel a) $LiCB_{11}H_{12}$ (at 433 K) and (panel b) $NaCB_{11}H_{12}$ (at 375 K) compared to the resolution-limited elastic-scattering peaks in black observed at 200 K, below the order-disorder phase transitions.

Figure 39:
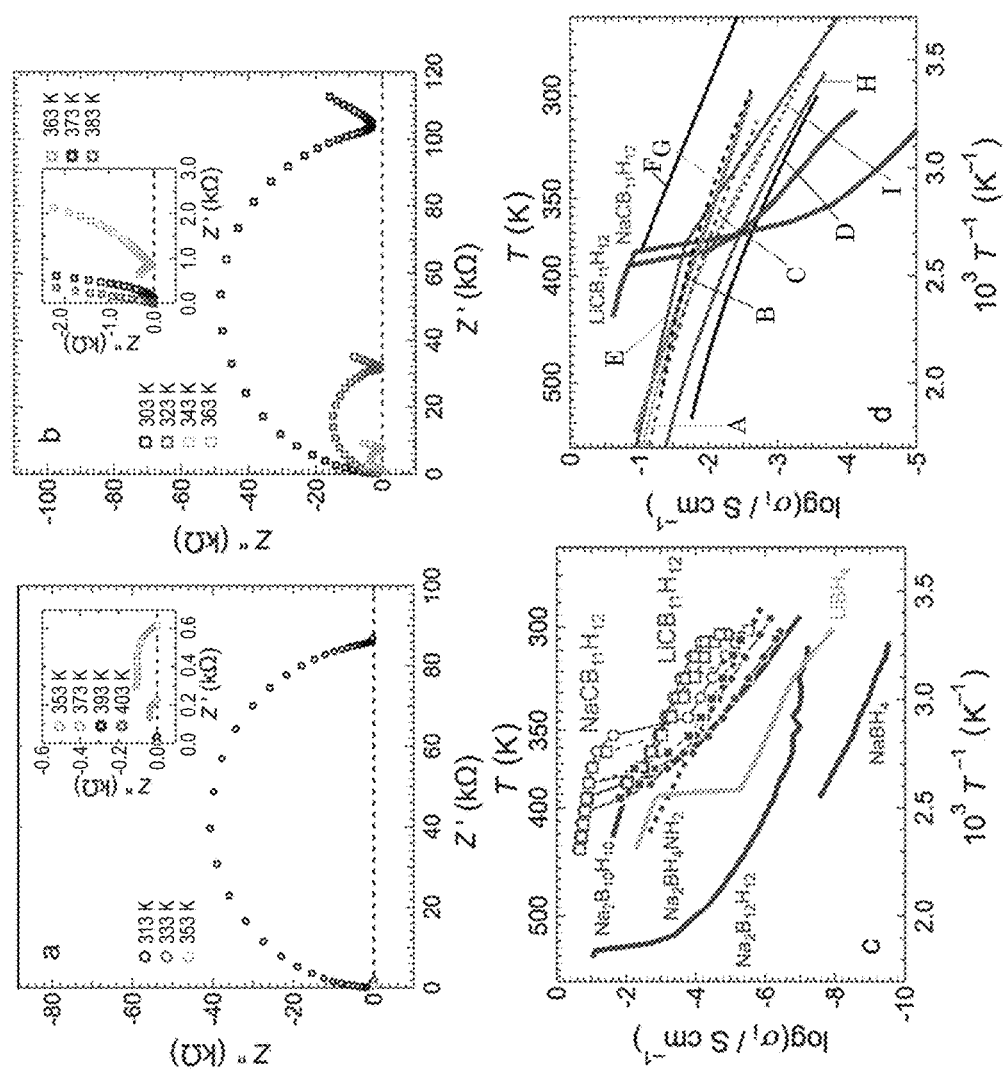
FIG. 39 shows graphs of complex impedance and graph of ionic conductivity versus inverse temperature.

FIG. 39 summarizes the conductivity-related results for both compounds. The ac impedance spectra of the symmetric cells for the $LiCB_{11}H_{12}$ and the $NaCB_{11}H_{12}$ electrolytes were characteristic of pure ionic conductors. In the characteristics of these disordered polyhedral-anion-based compounds, the anions can be considered translationally immobile compared to the rapidly diffusing cations. Moreover, additional dc conductivity measurements indicated that electronic conduction was relatively negligible, confirming near-unity cation transport numbers. As shown in panel a of FIG. 39, the Li-symmetric cell for $LiCB_{11}H_{12}$ had a parallel circuit of a resistor and a capacitor (semi-circle) at T≤393 K while only ohmic resistance appeared at T≥403 K. On the other hand, a spike appeared after the semi-circle or ohmic resistance when using an Au-symmetric cell with this electrolyte (Au-symmetric cell data not shown) as well as with the $NaCB_{11}H_{12}$ electrolyte (panel b of FIG. 39) owing to interface resistance. Thus, the semi-circle and ohmic resistance appearing in the complex plane was assigned to the total electrolyte resistances contributed by the bulk and grain boundaries. At elevated temperatures, conductivity jumps appeared for both materials accompanied by the order-disorder transition completed at 393 K to 403 K for $LiCB_{11}H_{12}$ and 373 K to 383 K for $NaCB_{11}H_{12}$. $\sigma_{Li+}$ for $LiCB_{11}H_{12}$ and $\sigma_{Na+}$ for $NaCB_{11}H_{12}$ are ≥0.15 S cm$^{-1}$ at T≥403 K and ≥0.12 S cm$^{-1}$ at T>383 K, respectively, with low activation energies of 0.22 eV. The high-temperature ionic conductivities were the greatest among polycrystalline electrolytes investigated thus far, complex hydrides (panel d of FIG. 39) or otherwise (panel d of FIG. 39). Indeed, Li$^+$ conductivity for $LiCB_{11}H_{12}$ surpassed $Li_{10}GeP_2S_{12}$. Na$^+$ conductivity for $NaCB_{11}H_{12}$ was an order of magnitude higher than $NaCB_{10}H_{10}$ and almost 50× better (at 363 K) than the $Na_3PS_4$-based glass ceramic. In particular, FIG. 39 shows complex impedance plots of (panel a) Li-symmetric cell using the $LiCB_{11}H_{12}$ electrolyte and (panel b) Au-symmetric cell using the $NaCB_{11}H_{12}$ electrolyte measured at various temperatures during $2^{nd}$ heating. Panel c shows ionic conductivities of species i (i=Li$^+$ and Na$^+$) of $LiCB_{11}H_{12}$ (dark grey) and $NaCB_{11}H_{12}$(light grey) as a function of inverse temperature. Circles and squares denoted the conductivities of the respective $1^{st}$ and $2^{nd}$ temperature cycles. Closed and open symbols denoted respective heating and cooling processes. The ionic conductivities were compared to other related materials: $Na_2B_{12}H_{12}$, $Na_2B_{10}H_{10}$, $Na_2BH_4NH_2$, $NaBH_4$, and $LiBH_4$. Panel d shows comparison of ionic conductivities for $LiCB_{11}H_{12}$ and $NaCB_{11}H_{12}$ (during $2^{nd}$ heating) with other polycrystalline superionic conductors $Li_{10}GeP_2S_{12}$, $Li_7P_3S_{11}$ glass-ceramic, $Li_{0.325}Ge_{0.25}P_{0.75}S_4$, $Li_{0.34}La_{0.51}TiO_{2.94}$, $Li_7La_3Zr_2O_{12}$, $Li_{1.3}Al_{0.3}Ti_{1.7}(PO_4)_3$, $Na_3PS_4$ glass-ceramic, polycrystalline β/β''-alumina mixture, and $Na_3Zr_{1.917}Si_{1.667}P_{1.333}O_{12}$. In panel D of FIG. 39 $Li_{1.3}Al_{0.3}Ti_{1.7}(PO_4)_2$ is labeled as curve A; $Li_7P_2S_{11}$ (glass-ceramics) is labeled as curve B; polycrystalline β-/β''-alumina is labeled as curve C; $Na_3PS_4$ (glass-ceramics) is labeled as curve D; $Li_{0.34}La_{0.51}TiO_{2.94}$ is labeled as curve E $Li_{10}GeP_2S_{12}$ is labeled as curve F; $Li_{0.325}Ge_{0.25}P_{0.78}S_4$ is labeled as curve G; $Li_7La_3Zr_2O_{12}$ is labeled as curve H; and $Na_3Zr_{1.917}Si_{1.333}O_{12}$ is labeled as curve I.

The 1:1 cation:anion ratio means that there are relatively half as many cations in the $LiCB_{11}H_{12}$ and $NaCB_{11}H_{12}$ structures as, e.g., $Na_2B_{12}H_{12}$, and therefore more available cation vacancies per unit cell. Both $LiCB_{11}H_{12}$ and $NaCB_{11}H_{12}$ exhibited liquid-like high ionic conductivities, as in the classical silver superionic conductor, a-AgI ($\sigma_{Ag+}$ ≥1.3 S cm$^{-1}$ at T≥420 K).

Figure 40:
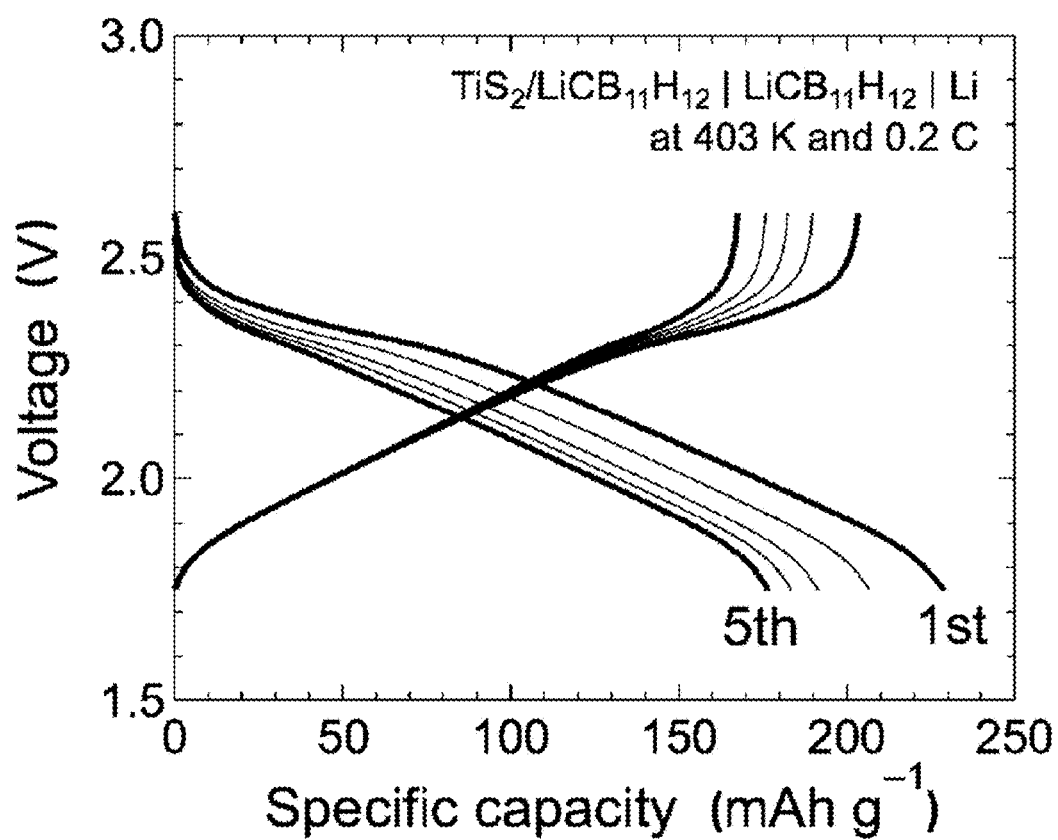
FIG. 40 shows a graph of voltage versus specific capacity.

As a test of electrochemical stability, $LiCB_{11}H_{12}$ was incorporated into a positive electrode layer comprised of a hand-mixed $TiS_2/LiCB_{11}H_{12}$ powder in a 1:1 mass ratio. This positive electrode layer was part of a bulk-type, all-solid-state $TiS_2/LiCB_{11}H_{12}|LiCB_{11}H_{12}|Li$ battery with $LiCB_{11}H_{12}$ acting as the electrolyte separator. This cell was operated repeatedly at 403 K and 0.2 C. It had approximately 175 mAh g$^{-1}$ discharge capacity during operation with approximately 95% coulombic efficiency (ratio of discharge to charge capacities) after the $3^{rd}$ cycle. FIG. 40 shows discharge-charge profiles over five cycles of the bulk-type all-solid-state 50 wt. % $TiS_2/LiCB_{11}H_{12}|LiCB_{11}H_{12}|Li$ battery operated at 403 K and 0.2 C. The data indicated that the $LiCB_{11}H_{12}$ is stable with respect to $TiS_2$ and Li over this voltage range.

Example 2. Superionic Conducting Salts

We created superionic conducting salts at ambient and sub-ambient temperatures via forming mixed-anion solid solutions of monacarba-closo-borate salts $1LiCB_9H_{10}$:$1LiCB_{11}H_{12}$ and $1NaCB_9H_{10}$:$1NaCB_{11}H_{12}$, either by ball-milling the starting equimolar mixtures of the anhydrous components or by vacuum-drying aqueous solutions of the starting solution mixtures at 200° C. Lithium and sodium 1-carba-closo-decaborates and carba-closo-dodecaborates ($LiCB_9H_{10}.xH_2O$, $NaCB_9H_{10}$, $LiCB_{11}H_{12}.xH_2O$, and $NaCB_{11}H_{12}$ were obtained from Katchem. As there are two possible $CB_9H_{10}^-$ isomers, 1-carba-refers to carbon occupying an apical position of the bicapped-square-antiprismatic $CB_9H_{10}^-$ anion. Here, it is assumed that $CB_9H_{10}^-$ refers to the 1-$CB_9H_{10}^-$ isomer. These highly hygroscopic salts were annealed under vacuum at 473 K overnight to ensure full dehydration.

X-ray powder diffraction (XRPD) measurements were performed using a Rigaku Ultima III X-ray diffractometer with a Cu-Kα source (λ=1.5418 Å). Differential scanning calorimetry (DSC) measurements were made with a Netzsch (STA 449 F1 Jupiter) TGA-DSC under He flow with Al sample pans. Neutron-elastic-scattering fixed-window scans were measured at the National Institute of Standards and Technology Center for Neutron Research at around 0.25 K min$^{-1}$ on the High-Flux Backscattering Spectrometer (HFBS) using 6.27 Å wavelength neutrons, with a resolution of 0.8 μeV FWHM.

Compound mixtures before (primary and secondary salts) and after ball-milling or drying (superionic conducting salt) were structurally characterized by X-ray powder diffraction.

Ball-milling of each mixture was performed for a total of 200 hours. Aqueous-solution-dried samples were first precipitated from solutions by room-temperature (RT) evacuation of the excess water, followed by complete removal of any remaining water by evacuation at 200 C.

Figure 41:
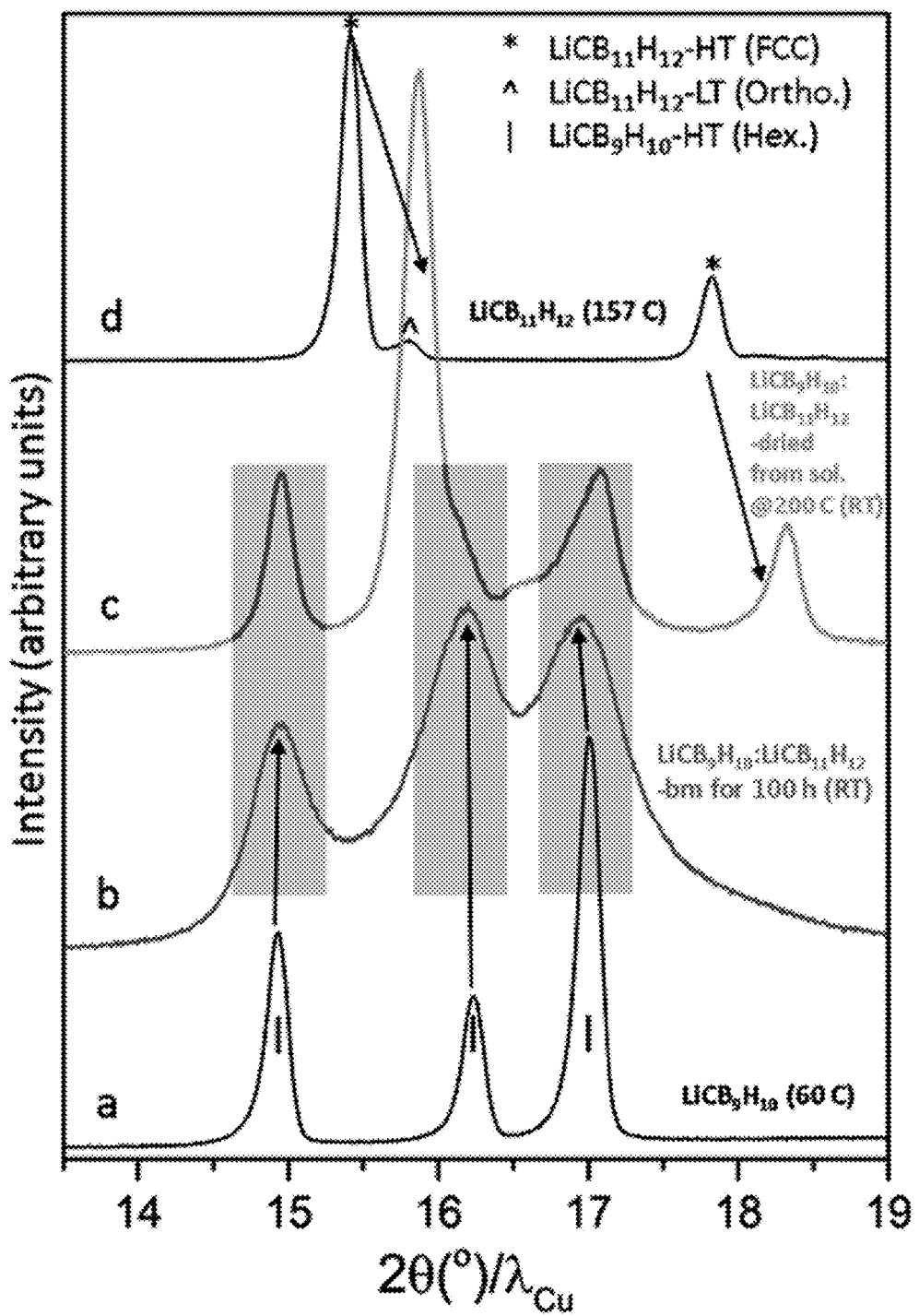
FIG. 41 shows a graph of intensity versus diffraction angle.
Figure 42:
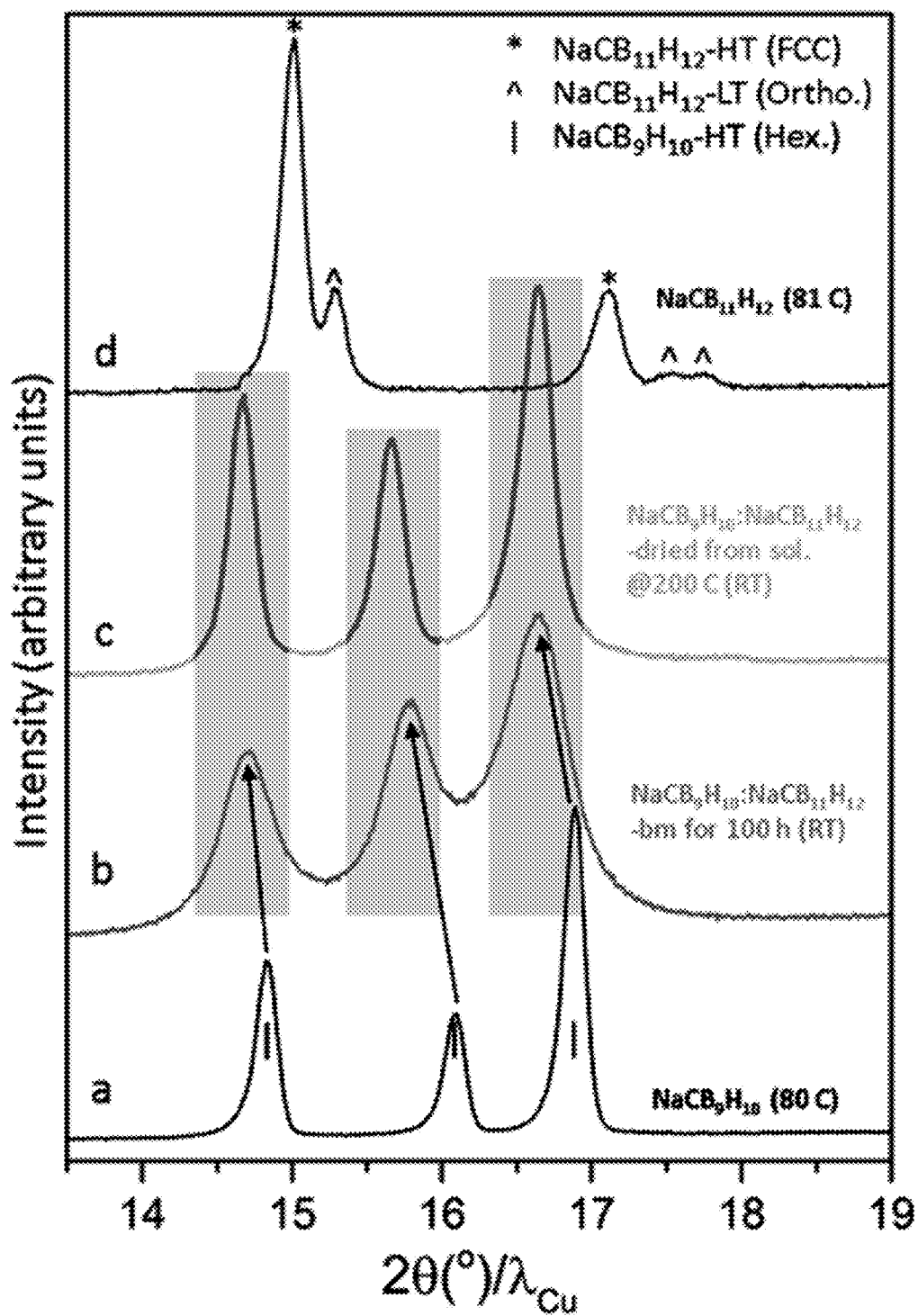
FIG. 42 shows a graph of intensity versus diffraction angle.

FIG. 41 and FIG. 42 compare the XRD patterns of superionic conducting phases of pure components and resulting phases of various anhydrous mixtures formed by either ball-milling or solution-drying. FIG. 41 shows results for $1LiCB_9H_{10}:1LiCB_{11}H_{12}$. Pattern a (at 60 C) depicts a superionic conducting disordered hexagonal phase of $LiCB_9H_{10}$ and pattern d (at 157 C) depicts a superionic conducting disordered FCC phase of $LiCB_{11}H_{12}$. Patterns b and c (both at RT) depict phases of ball-milled and solution-dried $1LiCB_9H_{10}:1LiCB_{11}H_{12}$ mixtures, respectively. It is clear that the ball-milled mixture (pattern b) formed a disordered hexagonal phase like $LiCB_9H_{10}$ (pattern a) but with a slightly larger lattice. This larger lattice was consistent with the substitution of larger $CB_{11}H_{12}^-$ anions for $CB_9H_{10}^-$ anions into the disordered structure of the mixture. This hexagonal-phase mixture possessed ambient temperature superionic conductivity. The solution-dried mixture (pattern c) formed two disordered phases, a disordered hexagonal phase like $LiCB_9H_{10}$ (pattern a) but with a similar size lattice, and a disordered FCC phase like $LiCB_{11}H_{12}$ (pattern d) but with a slightly smaller lattice. This smaller lattice was consistent with the substitution of smaller $CB_9H_{10}^-$ anions for larger $CB_{11}H_{12}^-$ anions into the disordered FCC structure. Both of these disordered phases of the mixture possessed ambient temperature superionic conductivity. The two phases were due to incomplete mixing and reflect two mixture fractions, one fraction that was slightly $CB_9H_{10}$-rich and one that was slightly $CB_{11}H_{12}$-poor.

FIG. 42 displays results for $1NaCB_9H_{10}:1NaCB_{11}H_{12}$. Pattern a (at 80 C) depicts a superionic conducting disordered hexagonal phase of $NaCB_9H_{10}$ and pattern d (at 81 C) depicts a superionic conducting disordered FCC phase of $NaCB_{11}H_{12}$. Patterns b and c (both at RT) depict the phases of ball-milled and solution-dried $1NaCB_9H_{10}:1NaCB_{11}H_{12}$ mixtures, respectively. Both the ball-milled and solution-dried mixtures (patterns b and c) formed disordered hexagonal phases like $NaCB_9H_{10}$ (pattern a) but with slightly larger lattices. These larger lattices were consistent with the substitution of larger $CB_{11}H_{12}^-$ anions for $CB_9H_{10}^-$ anions into the disordered structure of the mixture. These hexagonal-phase mixtures possessed ambient temperature superionic conductivities. The solution-dried $1NaCB_9H_{10}:1NaCB_{11}H_{12}$ mixture became more homogeneously mixed than the solution-dried $1LiCB_9H_{10}:1LiCB_{11}H_{12}$ mixture.

DSC measurements for all of these mixtures cycled between −70 C and 200 C indicated no endothermic or exothermic phase transitions, indicating that the superionic conducting disordered phases are stable at least within this temperature range.

Figure 43:
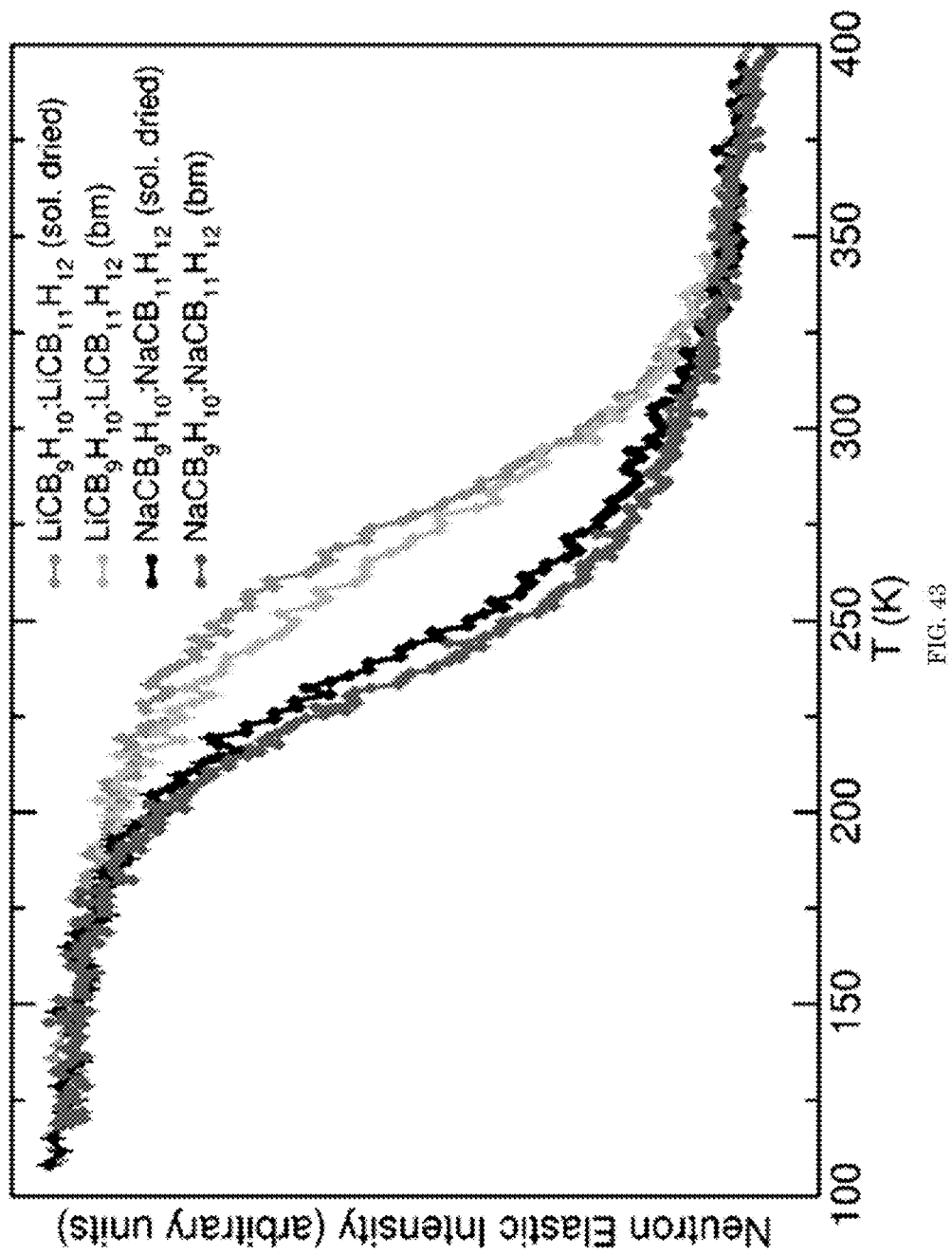
FIG. 43 shows a graph of neutron elastic intensity versus temperature.

Neutron-elastic-scattering fixed-window scans between 100 K and 400 K for all sample mixtures in FIG. 43 indicated highly mobile anion reorientational motions already approaching $10^8$ jumps/s by around 200 K, signaled by an onset of the drop in neutron elastic intensity near this temperature. By RT, the jump rate attained the order of $10^{10}$ reorientational jumps/s. This high anion mobility above 200 K was representative behavior of superionic conducting closo-borate phases.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:
1. A superionic conducting salt comprising:
a plurality of salt cations;
a plurality of salt anions the salt anions comprising:
a closo-borate anion of formula $B_nH_{(n-z)}R_z^{2-}$, wherein n is an integer greater than or equal to 10; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-carborate anion of formula $CB_nH_{(n+1)-z}R_z^{-1}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-dicarborate anion of formula $C_2B_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a carborate anion of formula $CB_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a borate of formula $B_{11}H_{(14-z)}R_z^{-1}$, wherein z is an integer from 0 to 11; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-ammonioborate anion of formula $((R'R''R''')NB_nZ_{n-1})^{1-}$, wherein n is an integer greater than or equal to 10, N is bonded to B; and R', R", R"', and Z independently comprise a hydrogen, a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

or a combination comprising at least one of the foregoing salt anions; and a superionic conductive phase that is present in a solid state at ambient temperature, the superionic conducting salt being a mechanical milling product of a primary salt or a drying product of a drying composition comprising the primary salt.

2. The superionic conducting salt of claim 1, wherein that salt cations comprise: a cation of an alkali metal, an alkaline earth metal, a transition metal, a rare earth metal, or a combination comprising at least one of the foregoing metals.

3. The superionic conducting salt of claim 2, wherein the salt anions comprise:
a plurality of first salt anions; and
a plurality of second salt anions.

4. A battery comprising:
an electrolyte composition comprising:
a superionic conducting salt that comprises:
a plurality of salt cations;
a plurality of salt anions, the salt anions comprising:
a closo-borate anion of formula $B_nH_{(n-z)}R_z^{2-}$, wherein n is an integer greater than or equal to 10; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-carborate anion of formula $CB_nH_{(n+1)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-dicarborate anion of formula $C_2B_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a carborate anion of formula $CB_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a borate of formula $B_{11}H_{(14-z)}R_z^{1-}$, wherein z is an integer from 0 to 11; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-ammonioborate anion of formula $((R'R''R''')NB_nZ_{n-1})^{1-}$, wherein n is an integer greater than or equal to 10, N is bonded to B; and R', R", R"', and Z independently comprise a hydrogen, a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

or a combination comprising at least one of the foregoing salt anions; and a superionic conductive phase that is present in a solid state at ambient temperature; and optionally, a binder in which the superionic conducting salt is disposed;

a first electrode; and a second electrode separated from the first electrode by interposition of the electrolyte composition.

5. The battery of claim 4, wherein the salt cations comprise:

a cation of an alkali metal, an alkaline earth metal, a transition metal, a rare earth metal, or a combination comprising at least one of the foregoing metals.

6. The battery of claim 5, wherein the salt anions comprise:
a plurality of first salt anions; and
a plurality of second salt anions.

7. A process for making a superionic conducting salt, the process comprising:
combining a primary salt and an impact member,
the primary salt comprising an ordered phase and being an ionic conductor;
impacting the primary salt with the impact member; and
converting the primary salt to the superionic conducting salt in response to impacting the primary salt with the impact member at a conversion temperature to make the superionic conducting salt,
the conversion temperature optionally being less than a thermally activated transition temperature that thermally converts the primary salt to the superionic conducting salt in an absence of the impacting the primary salt, and
the superionic conducting salt comprising a superionic conductive phase in a solid state at less than the thermally activated transition temperature,
wherein the superionic conducting salt comprises:
a plurality of salt cations;
a plurality of salt anions, the salt anions comprising:
a closo-borate anion of formula $B_nH_{(n-z)}R_z^{2-}$, wherein n is an integer greater than or equal to 10; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;
a closo-carbarate anion of formula $CB_nH_{(n+1)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;
a closo-dicarborate anion of formula $C_2B_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;
a carborate anion of formula $CB_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;
a borate of the formula $B_{11}H_{(14-z)}R_z^{1-}$, wherein z is an integer from 0 to 11; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;
a closo-ammonioborate anion of formula $((R'R''R''')NB_NZ_{n-1})^{1-}$, wherein n is an integer greater than or equal to 10, N is bonded to B; and R', R'', R''', and Z independently comprise a hydrogen, a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups; or
a combination comprising at least one of the foregoing salt anions; and
the superionic conductive phase is present in a solid state at ambient temperature.

8. The process of claim 7, wherein impacting the primary salt with the impact member comprises milling the primary salt with the impact member.

9. The process of claim 8, wherein the primary salt comprises:
a plurality of primary cations that comprise a cation of an alkali metal, an alkaline earth metal, a transition metal, a rare earth metal, or a combination comprising at least one of the foregoing metals; and
a plurality of primary anions.

10. The process of claim 9, wherein the primary anions comprise:
a closo-borate anion of formula $B_nH_{(n-z)}R_z^{2-}$, wherein n is an integer greater than or equal to 10; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;
a closo-carbarate anion of formula $CB_nH_{(n+1)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;
a closo-dicarborate anion of formula $C_2B_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;
a carborate anion of formula $CB_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a borate of the formula $B_{11}H_{(14-z)}R_z^{1-}$, wherein z is an integer from 0 to 11; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-ammonioborate anion of formula $((R'R''R''')NB_n Z_{n-1})^{1-}$, wherein n is an integer greater than or equal to 10, N is bonded to B; and R', R'', R''', and Z independently comprise a hydrogen, a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups; or a combination comprising at least one of the foregoing primary anions.

11. The process of claim 10, wherein the salt cations comprises:

a cation of an alkali metal, an alkaline earth metal, a transition metal, a rare earth metal, or a combination comprising at least one of the foregoing metals.

12. The process of claim 11, wherein the impact member comprises a ball for a ball mill, a secondary salt, or a combination comprising at least one of the foregoing impact members.

13. The process of claim 12, wherein the impact member is the ball and impacting the primary salt comprises ball milling the primary salt to make the superionic conducting salt.

14. The process of claim 12, wherein the impact member is the secondary salt that comprises:

a plurality of secondary cations that comprise: a cation of an alkali metal, an alkaline earth metal, a transition metal, a rare-earth metal, a polyatomic cation, or a combination comprising at least one of the foregoing; and a plurality of secondary anions.

15. The process of claim 14, wherein the secondary anions comprise:

a closo-borate anion of formula $B_nH_{(n-z)}R_z^{2-}$, wherein n is an integer greater than or equal to 10; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-carborate anion of formula $CB_nH_{(n+1)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-dicarborate anion of formula $C_2B_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a carborate anion of formula $CB_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a borate of the formula $B_{11}H_{(14-z)}R_z^{1-}$, wherein z is an integer from 0 to 11; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-ammonioborate anion of formula $((R'R''R''')NB_n Z_{n-1})^{1-}$, wherein n is an integer greater than or equal to 10, N is bonded to B; and R', R'', R''', and Z independently comprise a hydrogen, a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a monoatomic anion;

a polyatomic anion;

a halide; or a combination comprising at least one of the foregoing secondary anions.

16. A process for making a superionic conducting salt, the process comprising:

combining a primary salt and a secondary salt to form a drying composition that is a fluid and that comprises the primary salt and the secondary salt, the primary salt comprising an ordered phase and being an ionic conductor;

drying the drying composition; and converting the primary salt to the superionic conducting salt in response to drying the drying composition at a conversion temperature to make the superionic conducting salt, the conversion temperature optionally being less than a thermally activated transition temperature that thermally converts the primary salt to the superionic conducting salt in an absence of the secondary salt, and the superionic conducting salt comprising a superionic conducting phase in a solid state at less than the thermally activated transition temperature, wherein the superionic conducting salt comprises:

a plurality of salt cations;

a plurality of salt anions, the salt anions comprising:

a closo-borate anion of formula $B_nH_{(n-z)}R_z^{2-}$, wherein n is an integer greater than or equal to 10; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-carborate anion of formula $CB_nH_{(n+1)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-dicarborate anion of formula $C_2B_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a carborate anion of formula $CB_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a borate of the formula $B_{11}H_{(14-z)}R_z^{1-}$, wherein z is an integer from 0 to 11; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-ammonioborate anion of formula $((R'R''R''')NB_nZ_{n-1})^{1-}$, wherein n is an integer greater than or equal to 10, N is bonded to B; and R', R'', R''', and Z independently comprise a hydrogen, a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups; or a combination comprising at least one of the foregoing salt anions; and the superionic conductive phase is present in a solid state at ambient temperature.

17. The process of claim 16, wherein the drying composition further comprises a solvent.

18. The process of claim 16, wherein the salt cations comprises:

a cation of an alkali metal, an alkaline earth metal, a transition metal, a rare earth metal, or a combination comprising at least one of the foregoing metals.

19. The process of claim 16, wherein the primary salt comprises:

a plurality of primary cations that comprise a cation of an alkali metal, an alkaline earth metal, a transition metal, a rare earth metal, or a combination comprising at least one of the foregoing metals; and a plurality of primary anions.

20. The process of claim 19, wherein the primary anions comprise:

a closo-borate anion of formula $B_nH_{(n-z)}R_z^{2-}$, wherein n is an integer greater than or equal to 10; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-carborate anion of formula $CB_nH_{(n+1)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-dicarborate anion of formula $C_2B_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a carborate anion of formula $CB_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a borate of the formula $B_{11}H_{(14-z)}R_z^{1-}$, wherein z is an integer from 0 to 11; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-ammonioborate anion of formula $((R'R''R''')NB_nZ_{n-1})^{1-}$, wherein n is an integer greater than or equal to 10, N is bonded to B; and R', R'', R''', and Z independently comprise a hydrogen, a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups; or a combination comprising at least one of the foregoing primary anions.

21. The process of claim 16, wherein the secondary salt comprises:

a plurality of secondary cations that comprise a cation of an alkali metal, an alkaline earth metal, a transition metal, a rare-earth metal, a polyatomic cation, or a combination comprising at least one of the foregoing; and a plurality of secondary anions.

22. The process of claim 21, wherein the secondary anions comprise:

a closo-borate anion of formula $B_nH_{(n-z)}R_z^{2-}$, wherein n is an integer greater than or equal to 10; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-carborate anion of formula $CB_nH_{(n+1)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-dicarborate anion of formula $C_2B_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a carborate anion of formula $CB_nH_{(n+3)-z}R_z^{1-}$, wherein n is an integer greater than or equal to 9; z is an integer from 0 to n; and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a borate of the formula $B_{11}H_{(14-z)}R_z^{1-}$, wherein z is an integer from 0 to 11;

and each R independently comprises a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a closo-ammonioborate anion of formula $((R'R''R''')NB_nZ_{n-1})^{1-}$, wherein n is an integer greater than or equal to 10, N is bonded to B; and R', R'', R''', and Z independently comprise a hydrogen, a hydrocarbon substituent, a halogenated-hydrocarbon substituent, a halogen, an amine, a cyano, a hydroxyl, a thiol, a carbonyl, a carboxylate, a carboxylic acid, an epoxide, an ester, an amide, an ether, or a combination comprising at least one of the foregoing groups;

a monoatomic anion;

a polyatomic anion;

a halide; or a combination comprising at least one of the foregoing secondary anions.

* * * * *